United States Patent
Oka

(10) Patent No.: US 10,752,320 B2
(45) Date of Patent: Aug. 25, 2020

(54) BICYCLE REAR HUB ASSEMBLY

(71) Applicant: SHIMANO INC., Sakai (JP)

(72) Inventor: Tomonari Oka, Sakai (JP)

(73) Assignee: SHIMANO INC., Sakai (JP)

( * ) Notice: Subject to any disclaimer, the term of this patent is extended or adjusted under 35 U.S.C. 154(b) by 217 days.

(21) Appl. No.: 15/851,785

(22) Filed: Dec. 22, 2017

(65) Prior Publication Data

US 2019/0092426 A1 Mar. 28, 2019

Related U.S. Application Data

(63) Continuation-in-part of application No. 15/712,407, filed on Sep. 22, 2017, now abandoned.

(51) Int. Cl.
  *B62M 9/12* (2006.01)
  *B60B 27/02* (2006.01)
  *B60B 27/04* (2006.01)
  *B60B 27/00* (2006.01)

(52) U.S. Cl.
  CPC .......... *B62M 9/12* (2013.01); *B60B 27/0031* (2013.01); *B60B 27/023* (2013.01); *B60B 27/04* (2013.01); *B60B 27/047* (2013.01)

(58) Field of Classification Search
  CPC .... B62M 9/12; B60B 27/0031; B60B 27/047; B60B 27/04; B60B 27/023
  USPC ...................................................... 301/110.5
  See application file for complete search history.

(56) References Cited

U.S. PATENT DOCUMENTS

| | | | |
|---|---|---|---|
| 2,382,740 A | 8/1945 | Noffsinger et al. | |
| 3,732,626 A | 5/1973 | Miller, Jr. | |
| 4,175,404 A | 11/1979 | Schopf | |
| 4,261,452 A | 4/1981 | Barrows | |
| 4,473,317 A | 9/1984 | Bolang | |
| 4,869,710 A * | 9/1989 | Iwasaki | B62M 9/10 474/160 |
| 5,448,944 A | 9/1995 | Line et al. | |
| 5,480,357 A | 1/1996 | Liang | |
| 5,503,494 A | 4/1996 | Kamata et al. | |
| 5,664,655 A | 9/1997 | Oh | |
| 5,697,850 A | 12/1997 | Yaegashi et al. | |

(Continued)

FOREIGN PATENT DOCUMENTS

| | | |
|---|---|---|
| CN | 1746071 | 3/2006 |
| CN | 108725684 | 11/2018 |

(Continued)

OTHER PUBLICATIONS

Office Action issued by the United States Patent and Trademark Office for the co-pending U.S. Appl. No. 15/608,924, dated May 15, 2019

(Continued)

*Primary Examiner* — S. Joseph Morano
*Assistant Examiner* — Jean W Charleston
(74) *Attorney, Agent, or Firm* — Mori & Ward, LLP

(57) ABSTRACT

A bicycle rear hub assembly comprises a hub axle, a hub body, and a sprocket support body. The hub axle includes an axle through-bore that has a minimum inner diameter equal to or larger than 13 mm. The hub body is rotatably mounted on the hub axle about a rotational center axis of the bicycle rear hub assembly. The sprocket support body is rotatably mounted on the hub axle about the rotational center axis.

55 Claims, 62 Drawing Sheets

(56) References Cited

U.S. PATENT DOCUMENTS

| | | | |
|---|---|---|---|
| 5,704,859 A | 1/1998 | Feng et al. |
| 5,716,159 A | 2/1998 | Tomikawa |
| 5,738,603 A | 4/1998 | Schmidt et al. |
| 5,771,737 A | 6/1998 | Yaegashi |
| 5,851,152 A | 12/1998 | Ilzhofer et al. |
| 5,954,604 A | 9/1999 | Nakamura |
| 5,964,332 A | 10/1999 | King |
| 6,116,700 A | 9/2000 | Herrera |
| 6,322,158 B1 | 11/2001 | Herrera |
| 6,340,338 B1 | 1/2002 | Kamada |
| 6,382,381 B1 | 5/2002 | Okajima et al. |
| 6,428,437 B1 | 8/2002 | Schlanger |
| 6,488,603 B2 | 12/2002 | Lim et al. |
| 6,497,314 B2 | 12/2002 | Kanehisa |
| 6,587,741 B1 | 7/2003 | Chetta et al. |
| 6,644,452 B2 | 11/2003 | Lew et al. |
| 6,659,895 B2 | 12/2003 | Fukuda |
| 6,669,306 B1 | 12/2003 | Hara et al. |
| 6,866,604 B2 | 3/2005 | Kamada et al. |
| 6,923,741 B2 | 8/2005 | Wei |
| 6,958,026 B2 | 10/2005 | Wang et al. |
| 7,044,876 B2 | 5/2006 | Kamada et al. |
| 7,360,470 B2 | 4/2008 | Bonner |
| 7,475,758 B2 | 1/2009 | Dimsey et al. |
| 7,484,608 B2 | 2/2009 | Lew et al. |
| 7,846,047 B2 | 12/2010 | Nakano et al. |
| 8,057,338 B2 | 11/2011 | Kamada |
| 8,197,371 B2 | 6/2012 | D'Aluisio |
| 8,226,511 B2 | 7/2012 | Kamada |
| 8,375,827 B2 | 2/2013 | Kuroiwa et al. |
| 8,757,341 B2 | 6/2014 | Klieber |
| 8,820,852 B2 | 9/2014 | Van Hoek |
| 9,199,509 B2 | 12/2015 | Koshiyama |
| 9,334,910 B2 | 5/2016 | Watarai |
| 9,669,656 B2 | 6/2017 | Lim et al. |
| 9,855,794 B1 | 1/2018 | Nakajima et al. |
| 10,377,174 B2 | 8/2019 | Fujita et al. |
| 10,507,690 B2 | 12/2019 | Fujita et al. |
| 2001/0039224 A1 | 11/2001 | Lim et al. |
| 2001/0045140 A1 | 11/2001 | Kamminga et al. |
| 2002/0072446 A1 | 6/2002 | Kanehisa et al. |
| 2002/0086753 A1 | 7/2002 | Yahata |
| 2003/0040371 A1 | 2/2003 | Glowacki et al. |
| 2004/0142782 A1 | 7/2004 | Kamada et al. |
| 2005/0139444 A1 | 6/2005 | Kanehisa et al. |
| 2006/0014599 A1 | 1/2006 | Meggiolan |
| 2006/0128511 A1 | 6/2006 | Oishi et al. |
| 2008/0004143 A1 | 1/2008 | Kanehisa et al. |
| 2009/0181779 A1 | 7/2009 | Wagner et al. |
| 2009/0215543 A1 | 8/2009 | Brissette |
| 2009/0252549 A1 | 10/2009 | Takeuchi et al. |
| 2009/0317177 A1 | 12/2009 | Nakagawa et al. |
| 2010/0170762 A1 | 7/2010 | Schlanger |
| 2010/0239363 A1 | 9/2010 | Cerasi |
| 2010/0260544 A1 | 10/2010 | Chiang |
| 2010/0303537 A1 | 12/2010 | Brown et al. |
| 2011/0020078 A1 | 1/2011 | Katsuki |
| 2011/0092327 A1 | 4/2011 | Oishi |
| 2011/0120232 A1 | 5/2011 | Lassanske |
| 2012/0028723 A1 | 2/2012 | Ando et al. |
| 2013/0049322 A1* | 2/2013 | Rose ............... B60B 27/026 280/279 |
| 2013/0192419 A1 | 8/2013 | Mizuno et al. |
| 2013/0324354 A1 | 12/2013 | Phebus et al. |
| 2014/0193195 A1 | 7/2014 | Merz |
| 2014/0265539 A1 | 9/2014 | Thompson |
| 2015/0024884 A1 | 1/2015 | Braedt et al. |
| 2015/0125269 A1 | 5/2015 | Bois et al. |
| 2015/0202919 A1 | 7/2015 | Koshiyama |
| 2015/0210353 A1 | 7/2015 | Tokuyama et al. |
| 2015/0314641 A1 | 11/2015 | Koshiyama |
| 2016/0059930 A1 | 3/2016 | Fukunaga |
| 2016/0083045 A1 | 3/2016 | Lin |
| 2016/0096589 A1 | 4/2016 | Sato |
| 2016/0121965 A1 | 5/2016 | Tsai et al. |
| 2016/0167737 A1 | 6/2016 | Tokuyama et al. |
| 2016/0176477 A1 | 6/2016 | Bernardele |
| 2016/0200395 A1* | 7/2016 | Braedt ............... B62M 9/10 474/160 |
| 2016/0223033 A1 | 8/2016 | Fujita et al. |
| 2016/0280326 A1 | 9/2016 | Braedt et al. |
| 2016/0297465 A1 | 10/2016 | Miyawaki et al. |
| 2016/0347410 A1 | 12/2016 | Watarai et al. |
| 2017/0036690 A1 | 2/2017 | Jager et al. |
| 2017/0057598 A1 | 3/2017 | Thrash et al. |
| 2017/0096029 A1 | 4/2017 | Fujita et al. |
| 2017/0355226 A1 | 12/2017 | Cheng et al. |
| 2017/0356502 A1 | 12/2017 | Cheng et al. |
| 2018/0304965 A1 | 10/2018 | Fukumori |

FOREIGN PATENT DOCUMENTS

| | | |
|---|---|---|
| DE | 202016100725 U1 | 4/2016 |
| EP | 1043221 A2 | 10/2000 |
| EP | 2526011 B1 | 3/2014 |
| JP | 57-153092 U | 3/1982 |
| JP | 63-195991 U | 12/1988 |
| JP | 1-87993 U | 6/1989 |
| JP | 07-32803 | 2/1995 |
| JP | 10-181668 | 7/1998 |
| JP | 2000-314438 | 11/2000 |
| JP | 2002-104262 | 4/2002 |
| JP | 2002-193178 | 7/2002 |
| JP | 2002-205681 | 7/2002 |
| JP | 2004-090914 | 3/2004 |
| JP | 2004-142739 | 5/2004 |
| JP | 2005-186763 | 7/2005 |
| JP | 2006-168720 | 6/2006 |
| JP | 2008-175277 | 7/2008 |
| JP | 2011-500436 | 1/2011 |
| JP | 2016-117479 | 6/2016 |
| TW | M362767 U1 | 8/2009 |
| TW | 201529362 | 8/2015 |
| WO | WO 2017/011189 | 1/2017 |

OTHER PUBLICATIONS

Office Action issued by the U.S. Patent and Trademark Office for the U.S. Appl. No. 16/145,116, dated Jan. 6, 2020.

Office Action issued by the U.S. Patent and Trademark Office for the U.S. Appl. No. 15/608,915, dated Jan. 8, 2020.

Office Action issued by the U.S. Patent and Trademark Office for the U.S. Appl. No. 15/686,179, dated Dec. 12, 2019.

B1 Machine element design, tribology, JSME mechanical engineers' handbook, Apr. 15, 1996, The Japan Society of Mechanical Engineers.

Norton, Robert L. 2013, Machine Design An Integrated Approach 5$^{th}$ Edition, Pearson, See Cite No. 136.

Jones, Franklin et al., 1998, Machinerys Handbook, New York, NY Industrial Press, Inc., See Cite No. 136.

Robert L. Norton, Machine Design, An Integrated Approach, Third Edition, Prentice Hall, 2006, pp. 532, 533, 643-645 (Year: 2006).

Office Action issued by the United States Patent and Trademark Office for the co-pending U.S. Appl. No. 16/145,116, dated Jul. 16, 2019.

Office Action issued by the United States Patent and Trademark Office for the co-pending U.S. Appl. No. 15/686,177, dated Aug. 21, 2019.

Office Action issued by the United States Patent and Trademark Office for the co-pending U.S. Appl. No. 15/686,179, dated Aug. 21, 2019.

Office Action issued by the United States Patent and Trademark Office for the co-pending U.S. Appl. No. 15/608,915, dated Jul. 16, 2019.

Third-Party Submissions under 37 CFR 1.290 Concise Description of Relevance submitted in U.S. Appl. No. 15/608,915, notified to Applicant on Jul. 3, 2019.

Third-Party Submissions under 37 CFR 1.290 Concise Description of Relevance submitted in U.S. Appl. No. 15/608,915, notified to Applicant on Jul. 18, 2019.

(56) References Cited

OTHER PUBLICATIONS

Third-Party Submissions under 37 CFR 1.290 Concise Description of Relevance submitted in U.S. Appl. No. 15/686,177, notified to Applicant on Jul. 23, 2019.
Office Action issued by the United States Patent and Trademark Office for the co-pending U.S. Appl. No. 15/608,924, dated Sep. 26, 2019.
Office Action with PTO-892 issued by the U.S. Patent and Trademark Office for the U.S. Appl. No. 15/686,177, dated Feb. 20, 2020.
Zee Rear Freehub for Disc Brake, Model Number FH-M645, https://web.archive.org/web/20150905181629/http://bike.shimano.com/content/sac-bike/en/home/mtb1/wheels---hubs/rear-hubs/fh-m645.html, Sep. 5, 2015. (Year:2015).
Office Action issued by the U.S. Patent and Trademark Office for the U.S. Appl. No. 15/686,179, dated Mar. 19, 2020.
Office Action issued by the U.S. Patent and Trademark Office for the U.S Appl. No. 15/608,915, dated Apr. 7, 2020.
Office Action with Form PTO-892 Notice of References Cited issued by the U.S. Patent and Trademark Office for the U.S. Appl. No. 15/851,781, dated Apr. 20. 2020.
Office Action issued by the U.S. Patent and Trademark Office for the U.S. Appl. No. 15/608,924, dated Apr. 22, 2020.

\* cited by examiner

BICYCLE REAR HUB ASSEMBLY

CROSS-REFERENCE TO RELATED APPLICATIONS

The present application is a continuation-in-part application of the U.S. patent application Ser. No. 15/712,407 filed Sep. 22, 2017. The contents of this application are incorporated herein by reference in their entirety.

BACKGROUND OF THE INVENTION

Field of the Invention

The present invention relates to a bicycle rear hub assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a hub assembly.

SUMMARY OF THE INVENTION

In accordance with a first aspect of the present invention, a bicycle rear hub assembly comprises a hub axle, a hub body, and a sprocket support body. The hub axle includes an axle through-bore that has a minimum inner diameter equal to or larger than 13 mm. The hub body is rotatably mounted on the hub axle about a rotational center axis of the bicycle rear hub assembly. The sprocket support body is rotatably mounted on the hub axle about the rotational center axis.

With the bicycle rear hub assembly according to the first aspect, it is possible to improve strength of the bicycle drive train around a rear wheel because a wheel securing shaft having a larger outer diameter can be mounted within the axle-through bore of the hub axle of the bicycle rear hub assembly.

In accordance with a second aspect of the present invention, the bicycle rear hub assembly according to the first aspect is configured so that the minimum inner diameter of the axle through-bore is equal to or larger than 14 mm.

With the bicycle rear hub assembly according to the second aspect, it is possible to further improve strength of the bicycle drive train around a rear wheel because a wheel securing shaft having a larger outer diameter can be mounted within the axle-through bore of the hub axle of the bicycle rear hub assembly.

In accordance with a third aspect of the present invention, the bicycle rear hub assembly according to the first aspect or the second aspect is configured so that the minimum inner diameter of the axle through-bore is equal to or smaller than 21 mm.

With the bicycle rear hub assembly according to the third aspect, it is possible to obtain a necessary internal space between the sprocket support body and the hub axle and between the hub body and the hub axle and thereby to improve a degree of freedom of designing the bicycle rear hub assembly.

In accordance with a fourth aspect of the present invention, the bicycle rear hub assembly according to any one of the first to third aspects is configured so that the hub axle has a maximum outer diameter that is equal to or larger than 17 mm.

With the bicycle rear hub assembly according to the fourth aspect, it is possible to enlarge the minimum inner diameter of the axle-through bore of the hub axle so that strength of the bicycle drive train around a rear wheel is improved.

In accordance with a fifth aspect of the present invention, the bicycle rear hub assembly according to the fourth aspect is configured so that the maximum outer diameter of the hub axle is equal to or larger than 20 mm.

With the bicycle rear hub assembly according to the fifth aspect, it is possible to enlarge the minimum inner diameter of the axle-through bore of the hub axle so that strength of the bicycle drive train around a rear wheel is improved.

In accordance with a sixth aspect of the present invention, the bicycle rear hub assembly according to the fourth or fifth aspect is configured so that the maximum outer diameter of the hub axle is equal to or smaller than 23 mm.

With the bicycle rear hub assembly according to the sixth aspect, it is possible to obtain a necessary internal space between the sprocket support body and the hub axle and between the hub body and the hub axle and thereby to improve a degree of freedom of designing the bicycle rear hub assembly.

In accordance with a seventh aspect of the present invention, the bicycle rear hub assembly according to any one of the first to sixth aspects is configured so that the sprocket support body includes at least ten external spline teeth configured to engage with a bicycle rear sprocket assembly, each of the at least ten external spline teeth having an external-spline driving surface and an external-spline non-driving surface.

With the bicycle rear hub assembly according to the seventh aspect, the at least ten external spline teeth reduce a rotational force applied to each of the at least ten external spline teeth in comparison with a sprocket support body including nine or less external spline teeth. This improves durability of the sprocket support body and/or improves a degree of freedom of choosing a material of the sprocket support body without reducing durability of the sprocket support body.

In accordance with an eighth aspect of the present invention, the bicycle rear hub assembly according to the seventh aspect is configured so that a total number of the at least ten external spline teeth is equal to or larger than 20.

With the bicycle rear hub assembly according to the eighth aspect, it is possible to further improve durability of the sprocket support body and/or further improves a degree of freedom of choosing a material of the sprocket support body without reducing durability of the sprocket support body.

In accordance with a ninth aspect of the present invention, the bicycle rear hub assembly according to the seventh aspect is configured so that a total number of the at least ten external spline teeth is equal to or larger than 25.

With the bicycle rear hub assembly according to the ninth aspect, it is possible to further improve durability of the sprocket support body and/or further improves a degree of freedom of choosing a material of the sprocket support body without reducing durability of the sprocket support body.

In accordance with a tenth aspect of the present invention, the bicycle rear hub assembly according to the seventh aspect is configured so that a total number of the at least ten external spline teeth is equal to or larger than 28.

With the bicycle rear hub assembly according to the tenth aspect, it is possible to further improve durability of the sprocket support body and/or further improves a degree of freedom of choosing a material of the sprocket support body without reducing durability of the sprocket support body.

In accordance with an eleventh aspect of the present invention, the bicycle rear hub assembly according to any one of the seventh to tenth aspect is configured so that at least one of the at least ten external spline teeth has an axial spline-tooth length that is equal to or smaller than 27 mm.

With the bicycle rear hub assembly according to the eleventh aspect, it is possible to save a weight of the bicycle rear hub assembly.

In accordance with a twelfth aspect of the present invention, the bicycle rear hub assembly according to the eleventh aspect is configured so that the axial spline-tooth length is equal to or larger than 22 mm.

With the bicycle rear hub assembly according to the twelfth aspect, it is possible to increase a speed stage of the bicycle rear sprocket assembly.

In accordance with a thirteenth aspect of the present invention, the bicycle rear hub assembly according to any one of the seventh to twelfth aspects is configured so that the at least ten external spline teeth have a first external pitch angle and a second external pitch angle different from the first external pitch angle.

With the bicycle rear hub assembly according to the thirteenth aspect, it is possible to easily attach the bicycle rear sprocket assembly to the bicycle rear hub assembly in a correct circumferential position.

In accordance with a fourteenth aspect of the present invention, the bicycle rear hub assembly according to any one of the seventh to thirteenth aspects is configured so that at least two external spline teeth of the at least ten external spline teeth are circumferentially arranged at a first external pitch angle with respect to the rotational center axis. The first external pitch angle ranging from 5 degrees to 36 degrees.

With the bicycle rear hub assembly according to the fourteenth aspect, it is possible to further improve durability of the sprocket support body and/or further improves a degree of freedom of choosing a material of the sprocket support body without reducing durability of the sprocket support body.

In accordance with a fifteenth aspect of the present invention, the bicycle rear hub assembly according to the fourteenth aspect is configured so that the first external pitch angle ranges from 10 degrees to 20 degrees.

With the bicycle rear hub assembly according to the fifteenth aspect, it is possible to further improve durability of the sprocket support body and/or further improves a degree of freedom of choosing a material of the sprocket support body without reducing durability of the sprocket support body.

In accordance with a sixteenth aspect of the present invention, the bicycle rear hub assembly according to the fifteenth aspect is configured so that the first external pitch angle is equal to or smaller than 15 degrees.

With the bicycle rear hub assembly according to the sixteenth aspect, it is possible to further improve durability of the sprocket support body and/or further improves a degree of freedom of choosing a material of the sprocket support body without reducing durability of the sprocket support body.

In accordance with a seventeenth aspect of the present invention, the bicycle rear hub assembly according to any one of the first to sixteenth aspects is configured so that the sprocket support body includes at least one external spline tooth configured to engage with a bicycle rear sprocket assembly. The at least one external spline tooth has an external-spline major diameter that is equal to or smaller than 34 mm.

With the bicycle rear hub assembly according to the seventeenth aspect, it is possible to save a weight of the bicycle rear hub assembly.

In accordance with an eighteenth aspect of the present invention, the bicycle rear hub assembly according to the seventeenth aspect is configured so that the external-spline major diameter is equal to or smaller than 33 mm.

With the bicycle rear hub assembly according to the eighteenth aspect, it is possible to further save a weight of the bicycle rear hub assembly.

In accordance with a nineteenth aspect of the present invention, the bicycle rear hub assembly according to the seventeenth aspect is configured so that the external-spline major diameter is equal to or larger than 29 mm.

With the bicycle rear hub assembly according to the nineteenth aspect, it is possible to ensure strength of the sprocket support body.

In accordance with a twentieth aspect of the present invention, the bicycle rear hub assembly according to any one of the first to nineteenth aspects is configured so that the sprocket support body includes at least one external spline tooth configured to engage with a bicycle rear sprocket assembly. The at least one external spline tooth has an external-spline minor diameter that is equal to or smaller than 32 mm.

With the bicycle rear hub assembly according to the twentieth aspect, the external-spline minor diameter can increase a radial length of a driving surface of the at least one external spline tooth. This improves strength of the sprocket support body.

In accordance with a twenty-first aspect of the present invention, the bicycle rear hub assembly according to the twentieth aspect is configured so that the external-spline minor diameter is equal to or smaller than 31 mm.

With the bicycle rear hub assembly according to the twenty-first aspect, the external-spline minor diameter can increase a radial length of a driving surface of the at least one external spline tooth. This improves strength of the sprocket support body.

In accordance with a twenty-second aspect of the present invention, the bicycle rear hub assembly according to the twentieth or twenty-first aspect is configured so that the external-spline minor diameter is equal to or larger than 28 mm.

With the bicycle rear hub assembly according to the twenty-second aspect, it is possible to ensure strength of the sprocket support body.

In accordance with a twenty-third aspect of the present invention, the bicycle rear hub assembly according to any one of the first to twenty-second aspects is configured so that the sprocket support body includes at least one external spline tooth configured to engage with a bicycle rear sprocket assembly. The at least one external spline tooth includes a plurality of external spline teeth including a plurality of external-spline driving surfaces to receive a driving rotational force from the bicycle rear sprocket assembly during pedaling. The plurality of external-spline driving surfaces each includes a radially outermost edge, a radially innermost edge, and a radial length defined from the radially outermost edge to the radially innermost edge. A total of the radial lengths of the plurality of external-spline driving surfaces is equal to or larger than 7 mm.

With the bicycle rear hub assembly according to the twenty-third aspect, it is possible to increase the radial lengths of the plurality of external-spline driving surface. This improves strength of the sprocket support body.

In accordance with a twenty-fourth aspect of the present invention, the bicycle rear hub assembly according to the twenty-third aspect is configured so that the total of the radial lengths is equal to or larger than 10 mm.

With the bicycle rear hub assembly according to the twenty-fourth aspect, it is possible to further increase the radial lengths of the plurality of external-spline driving surface. This improves strength of the sprocket support body.

In accordance with a twenty-fifth aspect of the present invention, the bicycle rear hub assembly according to the twenty-third aspect is configured so that the total of the radial lengths is equal to or larger than 15 mm.

With the bicycle rear hub assembly according to the twenty-fifth aspect, it is possible to further increase the radial lengths of the plurality of external-spline driving surface. This improves strength of the sprocket support body.

In accordance with a twenty-sixth aspect of the present invention, the bicycle rear hub assembly according to any one of the twenty-third to twenty-fifth aspects is configured so that the total of the radial lengths is equal to or smaller than 36 mm.

With the bicycle rear hub assembly according to the twenty-sixth aspect, it is possible to improve productivity of the sprocket support body.

In accordance with a twenty-seventh aspect of the present invention, the bicycle rear hub assembly according to any one of the first to twenty-sixth aspects is configured so that the hub body includes a first spoke-mounting portion having a first axially outermost part, a second spoke-mounting portion having a second axially outermost part, and a first axial length defined between the first axially outermost part of the first spoke-mounting portion and the second axially outermost part of the second spoke-mounting portion in an axial direction with respect to the rotational center axis of the bicycle rear sprocket assembly. The first axial length is equal to or larger than 55 mm.

With the bicycle rear hub assembly according to the twenty-seventh aspect, the first axial length improves strength of a wheel including the bicycle rear hub assembly.

In accordance with a twenty-eighth aspect of the present invention, the bicycle rear hub assembly according to the twenty-seventh aspect is configured so that the first axial length is equal to or larger than 60 mm.

With the bicycle rear hub assembly according to the twenty-eighth aspect, the first axial length further improves strength of a wheel including the bicycle rear hub assembly.

In accordance with a twenty-ninth aspect of the present invention, the bicycle rear hub assembly according to the twenty-seventh aspect is configured so that the first axial length is equal to or larger than 65 mm.

With the bicycle rear hub assembly according to the twenty-ninth aspect, the first axial length further improves strength of a wheel including the bicycle rear hub assembly.

In accordance with a thirtieth aspect of the present invention, the bicycle rear hub assembly according to any one of the first to twenty-ninth aspects is configured so that the hub axle includes a first axial frame abutment surface, a second axial frame abutment surface, and a second axial length. The first axial frame abutment surface is configured to abut against a first part of a bicycle frame in an axial direction with respect to the rotational center axis of the bicycle rear sprocket assembly in a state where the bicycle rear hub assembly is mounted to the bicycle frame. The second axial frame abutment surface is configured to abut against a second part of the bicycle frame in the axial direction in the state where the bicycle rear hub assembly is mounted to the bicycle frame. The second axial length is defined between the first axial frame abutment surface and the second axial frame abutment surface in the axial direction. The second axial length is equal to or larger than 140 mm.

With the bicycle rear hub assembly according to the thirtieth aspect, the second axial length makes the bicycle rear hub assembly attachable to a variety type of bicycle frame with obtaining the effect of the first aspect.

In accordance with a thirty-first aspect of the present invention, the bicycle rear hub assembly according to the thirtieth aspect is configured so that the second axial length is equal to or larger than 145 mm.

With the bicycle rear hub assembly according to the thirty-first aspect, the second axial length improves a degree of freedom of choosing the first axial length and/or achieves a wider gear range of the bicycle rear sprocket assembly.

In accordance with a thirty-second aspect of the present invention, the bicycle rear hub assembly according to the thirtieth aspect is configured so that the second axial length is equal to or larger than 147 mm.

With the bicycle rear hub assembly according to the thirty-second aspect, the second axial length improves a degree of freedom of choosing the first axial length and/or achieves a wider gear range of the bicycle rear sprocket assembly.

In accordance with a thirty-third aspect of the present invention, the bicycle rear hub assembly according to any one of the first to thirty-second aspects further comprises a freewheel structure. The freewheel structure includes a first ratchet member including at least one first ratchet tooth, and a second ratchet member including at least one second ratchet tooth configured to engage with the at least one first ratchet tooth in a torque transmitting manner. The first ratchet member is configured to engage with one of the hub body and the sprocket support body in a torque transmitting manner. The second ratchet member is configured to engage with the other of the hub body and the sprocket support body in a torque transmitting manner. At least one of the first ratchet member and the second ratchet member is movable relative to the hub axle in an axial direction with respect to the rotational center axis.

With the bicycle rear hub assembly according to the thirty-third aspect, it is possible to improve drive efficiency of the bicycle rear hub assembly and to save a weight of the freewheel structure.

In accordance with a thirty-fourth aspect of the present invention, the bicycle rear hub assembly according to the thirty-third aspect is configured so that the at least one first ratchet tooth is disposed on an axial facing surface of the first ratchet member. The at least one second ratchet tooth is disposed on an axial facing surface of the second ratchet member. The axial facing surface of the second ratchet member faces the axial facing surface of the first ratchet member.

With the bicycle rear hub assembly according to the thirty-fourth aspect, it is possible to further improve drive efficiency of the bicycle rear hub assembly and to save a weight of the freewheel structure.

In accordance with a thirty-fifth aspect of the present invention, the bicycle rear hub assembly according to the thirty-third or thirty-fourth aspect is configured so that the sprocket support body has an outer peripheral surface having a first helical spline. The first ratchet member is configured to engage with the sprocket support body in a torque transmitting manner and includes a second helical spline mating with the first helical spline.

With the bicycle rear hub assembly according to the thirty-fifth aspect, it is possible to smooth engagement and/or disengagement between the first ratchet member and the second ratchet member.

In accordance with a thirty-sixth aspect of the present invention, the bicycle rear hub assembly according to the thirty-fifth aspect is configured so that the outer peripheral surface of the sprocket support body has a guiding portion configured to guide the first ratchet member toward the hub body during coasting.

With the bicycle rear hub assembly according to the thirty-sixth aspect, it is possible to reduce noise generated in the freewheel structure during coasting.

In accordance with a thirty-seventh aspect of the present invention, the bicycle rear hub assembly according to the thirty-sixth aspect is configured so that the guiding portion guides the first ratchet member toward the hub body to release a meshing engagement between the at least one first ratchet tooth and the at least one second ratchet tooth during coasting.

With the bicycle rear hub assembly according to the thirty-seventh aspect, it is possible to further reduce noise generated in the freewheel structure during coasting.

In accordance with a thirty-eighth aspect of the present invention, the bicycle rear hub assembly according to the thirty-sixth or thirty-seventh aspect is configured so that the guiding portion extends in at least a circumferential direction with respect to the sprocket support body.

With the bicycle rear hub assembly according to the thirty-eighth aspect, it is possible to further reduce noise generated in the freewheel structure during coasting.

In accordance with a thirty-ninth aspect of the present invention, the bicycle rear hub assembly according to any one of the thirty-sixth to thirty-eighth aspects is configured so that the guiding portion is arranged to define an obtuse angle with the first helical spline.

With the bicycle rear hub assembly according to the thirty-ninth aspect, it is possible to further reduce noise generated in the freewheel structure during coasting.

In accordance with a fortieth aspect of the present invention, the bicycle rear hub assembly according to any one of the thirty-third to thirty-ninth aspects is configured so that each of the first ratchet member and the second ratchet member has an annular shape.

With the bicycle rear hub assembly according to the fortieth aspect, it is possible to further improve drive efficiency of the bicycle rear hub assembly and to save a weight of the freewheel structure.

In accordance with a forty-first aspect of the present invention, the bicycle rear hub assembly according to any one of the first to fortieth aspects further comprises a brake-rotor support body including at least one additional external spline tooth configured to engage with a bicycle brake rotor. The at least one additional external spline tooth has an additional external-spline major diameter that is larger than the external-spline major diameter.

With the bicycle rear hub assembly according to the forty-first aspect, the brake-rotor support body improves braking performance with widening the gear range of the bicycle rear sprocket assembly mounted to the bicycle rear hub assembly with obtaining the effect of the first aspect. The brake-rotor support body also improves attaching and detaching property of a bicycle brake rotor.

In accordance with a forty-second aspect of the present invention, the bicycle rear hub assembly according to any one of the seventh to sixteenth aspects is configured so that at least one of the at least ten external spline teeth is circumferentially symmetric with respect to a reference line extending from the rotational center axis to a circumferential center point of a radially outermost end of the at least one of the at least ten external spline teeth in a radial direction with respect to the rotational center axis.

With the bicycle rear hub assembly according to the forty-second aspect, it is possible to improve productivity of the sprocket support body.

In accordance with a forty-third aspect of the present invention, the bicycle rear hub assembly according to the forty-second aspect is configured so that at least one surface of the plurality of external-spline driving surfaces has a first external-spline-surface angle defined between the external-spline driving surface and a first radial line extending from a rotational center axis of the bicycle rear hub assembly to a radially outermost edge of the external-spline driving surface. The first external-spline-surface angle is equal to or smaller than 6 degrees.

With the bicycle rear hub assembly according to the forty-third aspect, it is possible to improve strength of the external-spline driving surface.

In accordance with a forty-fourth aspect of the present invention, the bicycle rear hub assembly according to the forty-second or forty-third aspect is configured so that at least one of the external-spline non-driving surfaces has a second external-spline-surface angle defined between the external-spline non-driving surface and a second radial line extending from the rotational center axis of the bicycle rear hub assembly to a radially outermost edge of the external-spline non-driving surface. The second external-spline-surface angle is equal to or smaller than 6 degrees.

With the bicycle rear hub assembly according to the forty-fourth aspect, it is possible to improve productivity of the bicycle rear sprocket assembly due to symmetric configuration between the external-spline driving surface and the external-spline non-driving surface.

In accordance with a forty-fifth aspect of the present invention, a bicycle rear hub assembly comprises a hub axle, a hub body, and a sprocket support body. The hub body is rotatably mounted on the hub axle about a rotational center axis of the bicycle rear hub assembly. The sprocket support body is rotatably mounted on the hub axle about the rotational center axis. The sprocket support body includes at least ten external spline teeth configured to engage with a bicycle rear sprocket assembly. Each of the at least ten external spline teeth has an external-spline driving surface and an external-spline non-driving surface. At least one of the at least ten external spline teeth being circumferentially symmetric with respect to a reference line extending from the rotational center axis to a circumferential center point of a radially outermost end of the at least one of the at least ten external spline teeth in a radial direction with respect to the rotational center axis.

With the bicycle rear hub assembly according to the forty-fifth aspect, the at least ten external spline teeth reduce a rotational force applied to each of the at least ten external spline teeth in comparison with a sprocket support body including nine or less external spline teeth. This improves durability of the sprocket support body and/or improves a degree of freedom of choosing a material of the sprocket support body without reducing durability of the sprocket support body. Furthermore, the symmetric shape improves productivity of the sprocket support body. The forty-fifth aspect of the present invention can be combined with any one of the first to the forty-fourth aspects.

In accordance with a forty-sixth aspect of the present invention, the bicycle rear hub assembly according to the forty-fifth aspect is configured so that a total number of the at least ten external spline teeth is equal to or larger than 28.

With the bicycle rear hub assembly according to the forty-sixth aspect, it is possible to improve durability of the sprocket support body and/or improve a degree of freedom of choosing a material of the sprocket support body without reducing durability of the sprocket support body.

In accordance with a forty-seventh aspect of the present invention, the bicycle rear hub assembly according to the forty-fifth or forty-sixth aspect is configured so that at least one of the external-spline driving surfaces has a first external-spline-surface angle defined between the external-spline driving surface and a first radial line extending from a rotational center axis of the bicycle rear hub assembly to a radially outermost edge of the external-spline driving surface. The first external-spline-surface angle is equal to or smaller than 6 degrees.

With the bicycle rear hub assembly according to the forty-seventh aspect, it is possible to improve strength of the external-spline driving surface.

In accordance with a forty-eighth aspect of the present invention, the bicycle rear hub assembly according to the forty-seventh aspect is configured so that at least one of the external-spline non-driving surfaces has a second external-spline-surface angle defined between the external-spline non-driving surface and a second radial line extending from the rotational center axis of the bicycle rear hub assembly to a radially outermost edge of the external-spline non-driving surface. The second external-spline-surface angle is equal to or smaller than 6 degrees.

With the bicycle rear hub assembly according to the forty-eighth aspect, it is possible to improve productivity of the bicycle rear sprocket assembly due to symmetric configuration between the external-spline driving surface and the external-spline non-driving surface.

In accordance with a forty-ninth aspect of the present invention, the bicycle rear hub assembly according to any one of the forty-fifth to forty-eighth aspects is configured so that at least one of the at least ten external spline teeth has an axial spline-tooth length that is equal to or smaller than 27 mm.

With the bicycle rear hub assembly according to the forty-ninth aspect, it is possible to save a weight of the sprocket support body.

In accordance with a fiftieth aspect of the present invention, the bicycle rear hub assembly according to any one of the seventh to tenth aspects is configured so that at least one of the at least ten external spline teeth has an axial spline-tooth length that is equal to or smaller than 27 mm.

With the bicycle rear hub assembly according to the fiftieth aspect, it is possible to save a weight of the sprocket support body.

In accordance with a fifty-first aspect of the present invention, the bicycle rear hub assembly according to the seventh aspect is configured so that a total number of the at least ten external spline teeth ranges from 22 to 24.

With the bicycle rear hub assembly according to the fifty-first aspect, the total number of the at least ten external spline teeth improves durability of the sprocket support body with improving productivity of the bicycle rear hub assembly.

In accordance with a fifty-second aspect of the present invention, the bicycle rear hub assembly according to the thirteenth aspect is configured so that the first external pitch angle ranges from 13 degrees to 17 degrees. The second external pitch angle ranges from 28 degrees to 32 degrees.

With the bicycle rear hub assembly according to the fifty-second aspect, it is possible to easily attach a bicycle rear sprocket assembly to the bicycle rear hub assembly in a correct circumferential position with improving durability of the sprocket support body and productivity of the bicycle rear hub assembly.

In accordance with a fifty-third aspect of the present invention, the bicycle rear hub assembly according to the thirteenth aspect is configured so that the first external pitch angle is half of the second external pitch angle.

With the bicycle rear hub assembly according to the fifty-third aspect, it is possible to easily attach a bicycle rear sprocket assembly to the bicycle rear hub assembly in a correct circumferential position.

In accordance with a fifty-fourth aspect of the present invention, the bicycle rear hub assembly according to the fourteenth aspect is configured so that the first external pitch angle ranges from 13 degrees to 17 degrees.

With the bicycle rear hub assembly according to the fifty-fourth aspect, the first external pitch angle improves durability of the sprocket support body with improving productivity of the bicycle rear hub assembly.

In accordance with a fifty-fifth aspect of the present invention, the bicycle rear hub assembly according to the forty-fifth aspect is configured so that a total number of the at least ten external spline teeth ranges from 22 to 24.

With the bicycle rear hub assembly according to the fifty-fifth aspect, the total number of the at least ten external spline teeth improves durability of the sprocket support body with improving productivity of the bicycle rear hub assembly.

In accordance with a fifty-sixth aspect of the present invention, the bicycle rear hub assembly according to the twenty-third aspect is configured so that the total of the radial lengths of the plurality of external-spline driving surfaces ranges from 11 mm to 14 mm.

With the bicycle rear hub assembly according to the fifty-sixth aspect, the total of the radial lengths improves strength of the sprocket support body in a range where productivity of the bicycle rear hub assembly improves.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
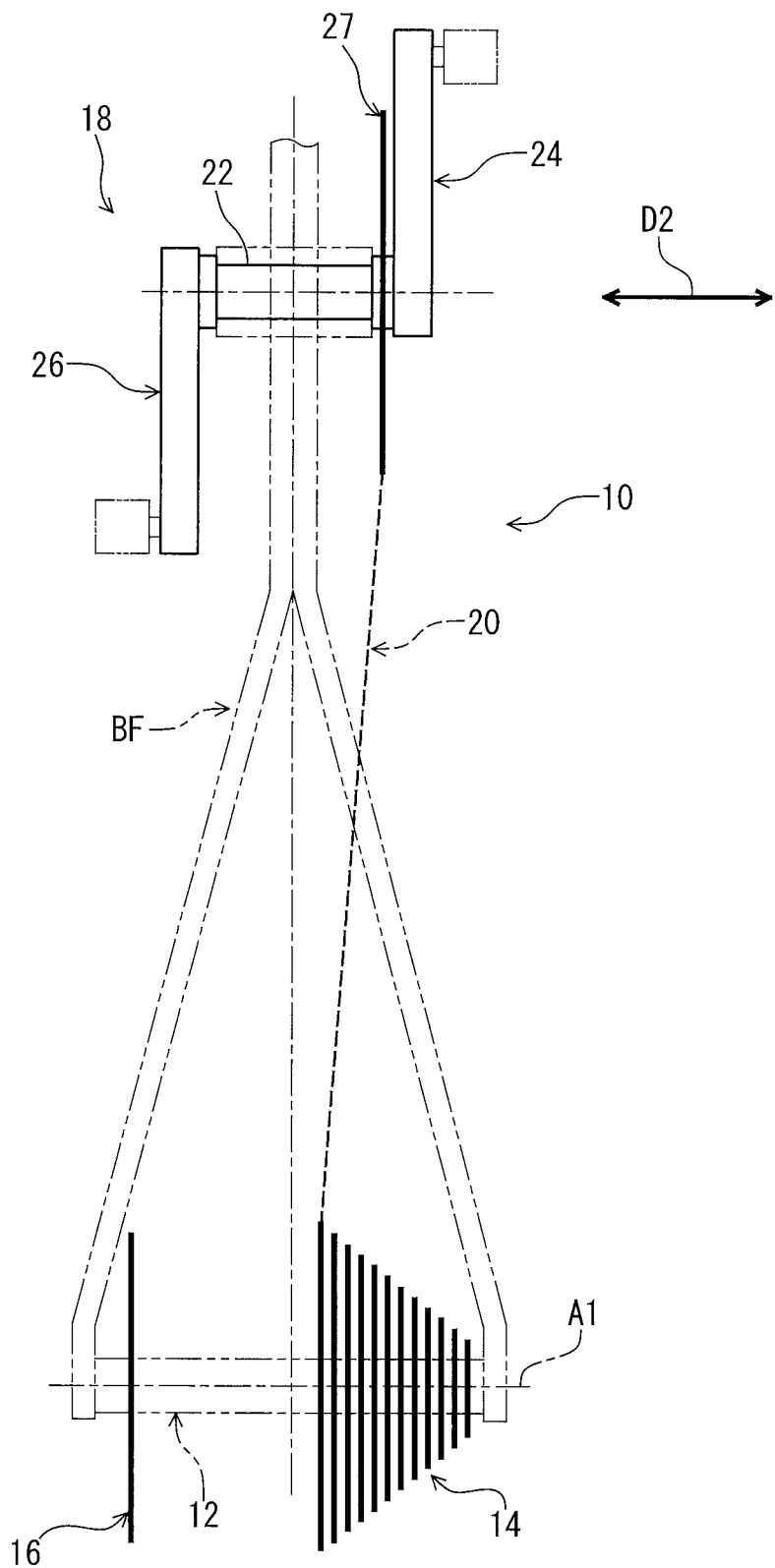
FIG. 1 is a schematic diagram of a bicycle drive train in accordance with an embodiment.

The embodiment(s) will now be described with reference to the accompanying drawings, wherein like reference numerals designate corresponding or identical elements throughout the various drawings.

Referring initially to FIG. 1, a bicycle drive train 10 in accordance with an embodiment comprises a bicycle rear hub assembly 12 and a bicycle rear sprocket assembly 14. The bicycle rear hub assembly 12 is secured to a bicycle frame BF. The bicycle rear sprocket assembly 14 is mounted on the bicycle rear hub assembly 12. A bicycle brake rotor 16 is mounted on the bicycle rear hub assembly 12.

The bicycle drive train 10 further comprises a crank assembly 18 and a bicycle chain 20. The crank assembly 18 includes a crank axle 22, a right crank arm 24, a left crank arm 26, and a front sprocket 27. The right crank arm 24 and the left crank arm 26 are secured to the crank axle 22. The front sprocket 27 is secured to at least one of the crank axle 22 and the right crank arm 24. The bicycle chain 20 is engaged with the front sprocket 27 and the bicycle rear sprocket assembly 14 to transmit a pedaling force from the front sprocket 27 to the bicycle rear sprocket assembly 14. The crank assembly 18 includes the front sprocket 27 as a single sprocket in the illustrated embodiment. However, the crank assembly 18 can include a plurality of front sprockets. The bicycle rear sprocket assembly 14 is a rear sprocket assembly. However, structures of the bicycle rear sprocket assembly 14 can be applied to the front sprocket.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle drive train 10, the bicycle rear hub assembly 12, or the bicycle rear sprocket assembly 14, should be interpreted relative to the bicycle equipped with the bicycle drive train 10, the bicycle rear hub assembly 12, or the bicycle rear sprocket assembly 14 as used in an upright riding position on a horizontal surface.

Figure 2:
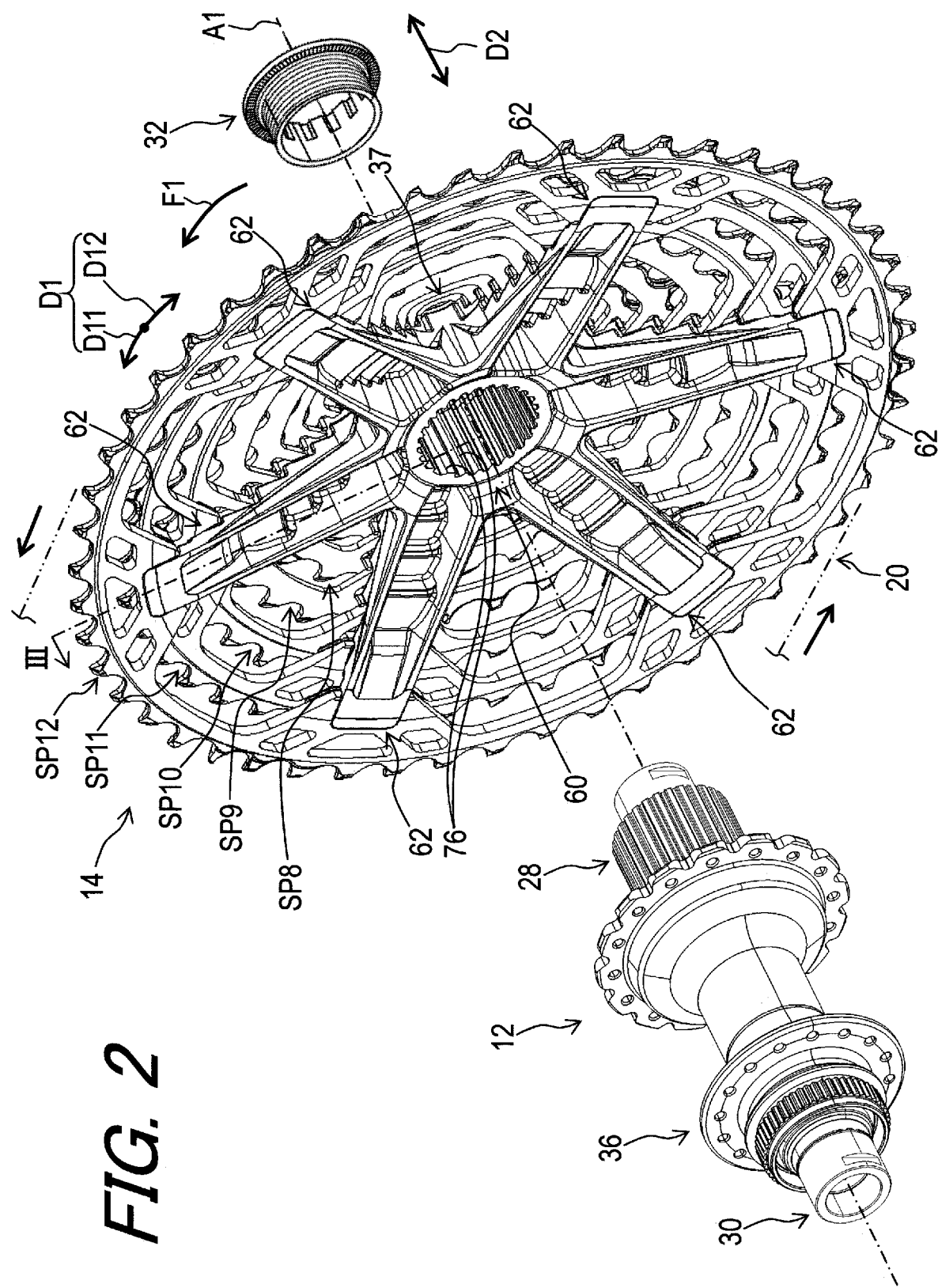
FIG. 2 is an exploded perspective view of the bicycle drive train illustrated in FIG. 1.

As seen in FIG. 2, the bicycle rear hub assembly 12 and the bicycle rear sprocket assembly 14 have a rotational center axis A1. The bicycle rear sprocket assembly 14 is rotatably supported by the bicycle rear hub assembly 12 relative to the bicycle frame BF (FIG. 1) about the rotational center axis A1. The bicycle rear sprocket assembly 14 is configured to be engaged with the bicycle chain 20 to transmit a driving rotational force F1 between the bicycle chain 20 and the bicycle rear sprocket assembly 14 during pedaling. The bicycle rear sprocket assembly 14 is rotated about the rotational center axis A1 in a driving rotational direction D11 during pedaling. The driving rotational direction D11 is defined along a circumferential direction D1 of the bicycle rear hub assembly 12 or the bicycle rear sprocket assembly 14. A reverse rotational direction D12 is an opposite direction of the driving rotational direction D11 and is defined along the circumferential direction D1.

As seen in FIG. 2, the bicycle rear hub assembly 12 comprises a sprocket support body 28. The bicycle rear sprocket assembly 14 is configured to be mounted to the sprocket support body 28 of the bicycle rear hub assembly 12. The bicycle rear sprocket assembly 14 is mounted on the sprocket support body 28 to transmit the driving rotational force F1 between the sprocket support body 28 and the bicycle rear sprocket assembly 14. The bicycle rear hub assembly 12 comprises a hub axle 30. The sprocket support body 28 is rotatably mounted on the hub axle 30 about the rotational center axis A1. The bicycle rear sprocket assembly 14 further comprises a lock member 32. The lock member 32 is secured to the sprocket support body 28 to hold the bicycle rear sprocket assembly 14 relative to the sprocket support body 28 in an axial direction D2 with respect to the rotational center axis A1.

Figure 3:
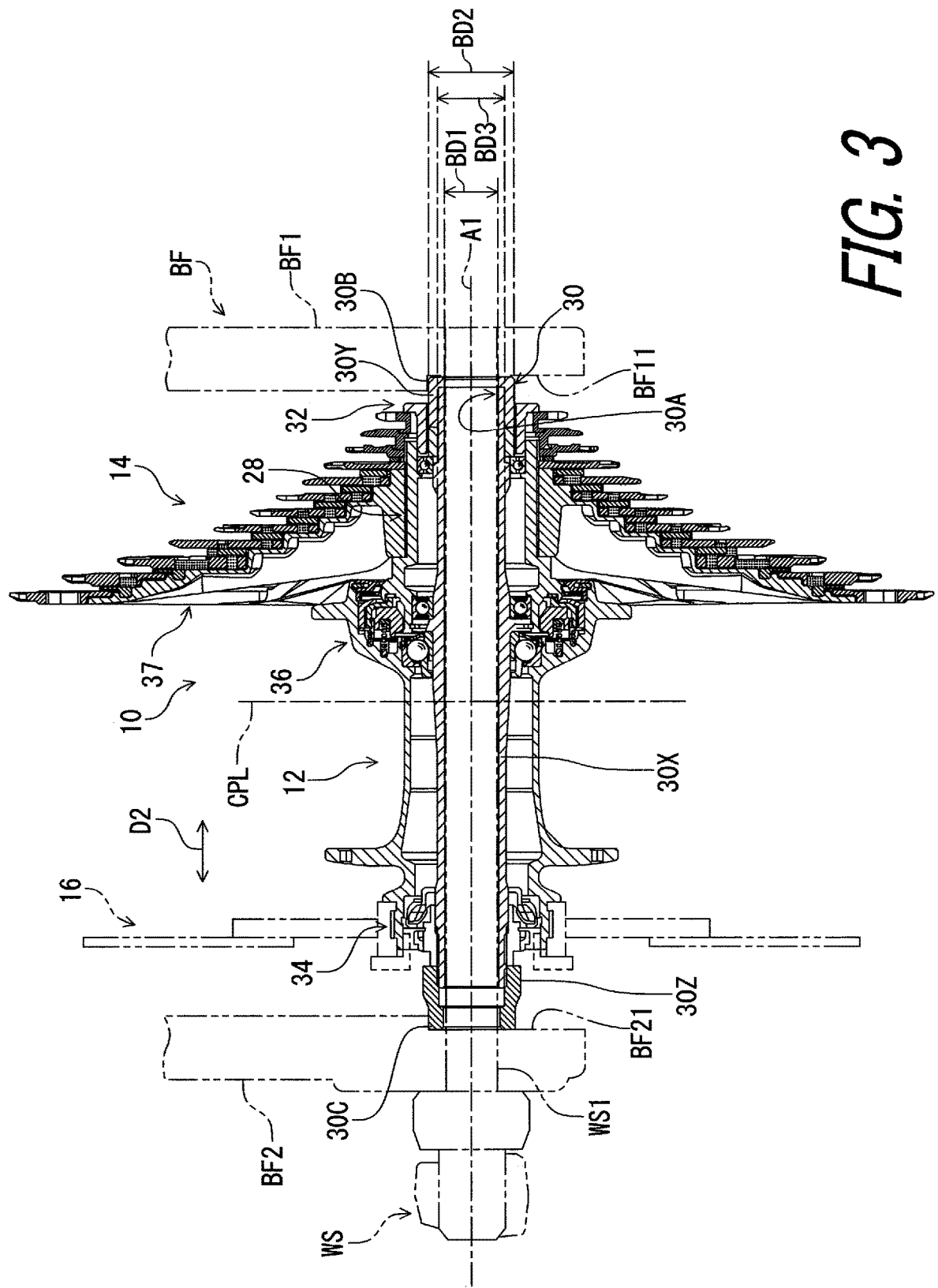
FIG. 3 is a cross-sectional view of the bicycle drive train taken along line of FIG. 2.

As seen in FIG. 3, the bicycle rear hub assembly 12 is secured to the bicycle frame BF with a wheel securing structure WS. The hub axle 30 includes an axle through-bore 30A. A securing rod WS1 of the wheel securing structure WS extends through the axle through-bore 30A of the hub axle 30. The hub axle 30 includes a first axle end 30B and a second axle end 30C. The hub axle 30 extends between the first axle end 30B and the second axle end 30C along the rotational center axis A1. The first axle end 30B is provided in a first recess BF11 of a first frame BF1 of the bicycle frame BF. The second axle end 30C is provided in a second recess BF21 of a second frame BF2 of the bicycle frame BF. The hub axle 30 is held between the first frame BF1 and the second frame BF2 with the wheel securing structure WS. The wheel securing structure WS includes a structure which has been known in the bicycle filed. Thus, it will not be described in detail here for the sake of brevity.

In this embodiment, the axle through-bore 30A has a minimum inner diameter BD1 equal to or larger than 13 mm. The minimum inner diameter BD1 of the axle through-bore 30A is preferably equal to or larger than 14 mm. The minimum inner diameter BD1 of the axle through-bore 30A is preferably equal to or smaller than 21 mm. In this embodiment, the minimum inner diameter BD1 of the axle through-bore 30A is 15 mm. However, the minimum inner diameter BD1 is not limited to this embodiment and the above ranges.

The hub axle 30 has a maximum outer diameter BD2 that is equal to or larger than 17 mm. The maximum outer diameter BD2 of the hub axle 30 is preferably equal to or larger than 20 mm. The maximum outer diameter BD2 of the hub axle 30 is preferably equal to or smaller than 23 mm. In this embodiment, the maximum outer diameter BD2 of the hub axle 30 is 21 mm. However, the maximum outer diameter BD2 of the hub axle 30 is not limited to this embodiment and the above ranges. The hub axle 30 has a minimum outer diameter BD3 that is equal to or larger than 15 mm. The minimum outer diameter BD3 is preferably equal to or larger than 17 mm. The minimum outer diameter BD3 is preferably equal to or smaller than 19 mm. In this embodiment, the minimum outer diameter BD3 of the hub axle 30 is 17.6 mm. However, the minimum outer diameter BD3 is not limited to this embodiment and the above ranges.

The hub axle 30 includes an axle tube 30X, a first axle part 30Y, and a second axle part 30Z. The axle tube 30X has a tubular shape and extend along the rotational center axis A1. The first axle part 30Y is secured to a first end of the axle tube 30X. The second axle part 30Z is secured to a second end of the axle tube 30X. At least one of the first axle part 30Y and the second axle part 30Z can be integrally provided with the axle tube 30X.

Figure 4:
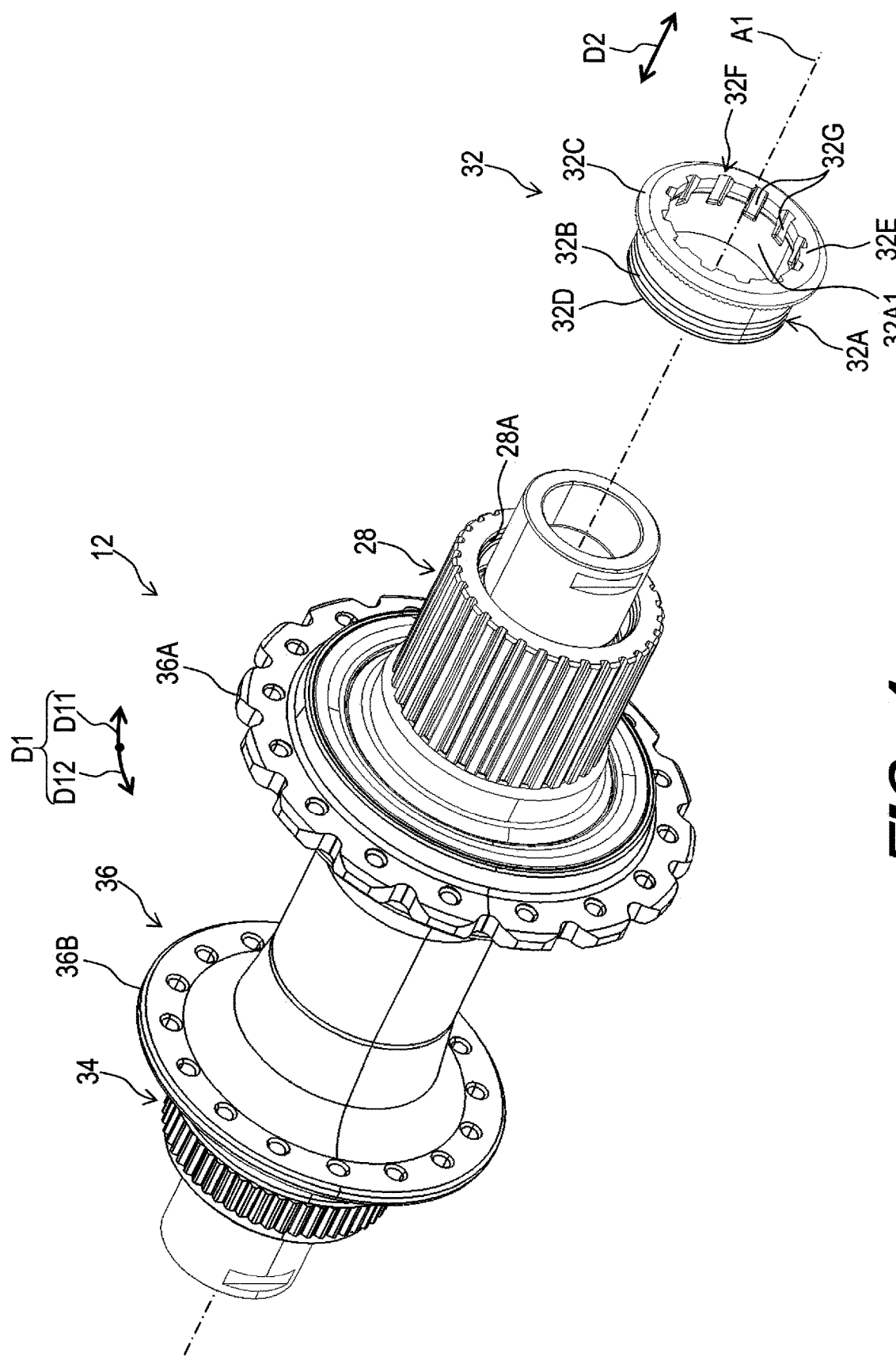
FIG. 4 is a perspective view of a bicycle rear hub assembly of the bicycle drive train illustrated in FIG. 2, with a lock member of a bicycle rear sprocket assembly.

As seen in FIGS. 3 and 4, the bicycle rear hub assembly 12 further comprises a brake-rotor support body 34. The brake-rotor support body 34 is rotatably mounted on the hub axle 30 about the rotational center axis A1. The brake-rotor support body 34 is coupled to the bicycle brake rotor 16 (FIG. 1) to transmit a braking rotational force from the bicycle brake rotor 16 to the brake-rotor support body 34.

As seen in FIG. 4, the bicycle rear hub assembly 12 comprises a hub body 36. The hub body 36 is rotatably mounted on the hub axle 30 about the rotational center axis A1 of the bicycle rear hub assembly 12. In this embodiment, the sprocket support body 28 is a separate member from the hub body 36. The brake-rotor support body 34 is integrally provided with the hub body 36 as a one-piece unitary member. However, the sprocket support body 28 can be integrally provided with the hub body 36. The brake-rotor support body 34 can be a separate member from the hub body 36. For example, the hub body 36 is made of a metallic material including aluminum.

Figure 5:
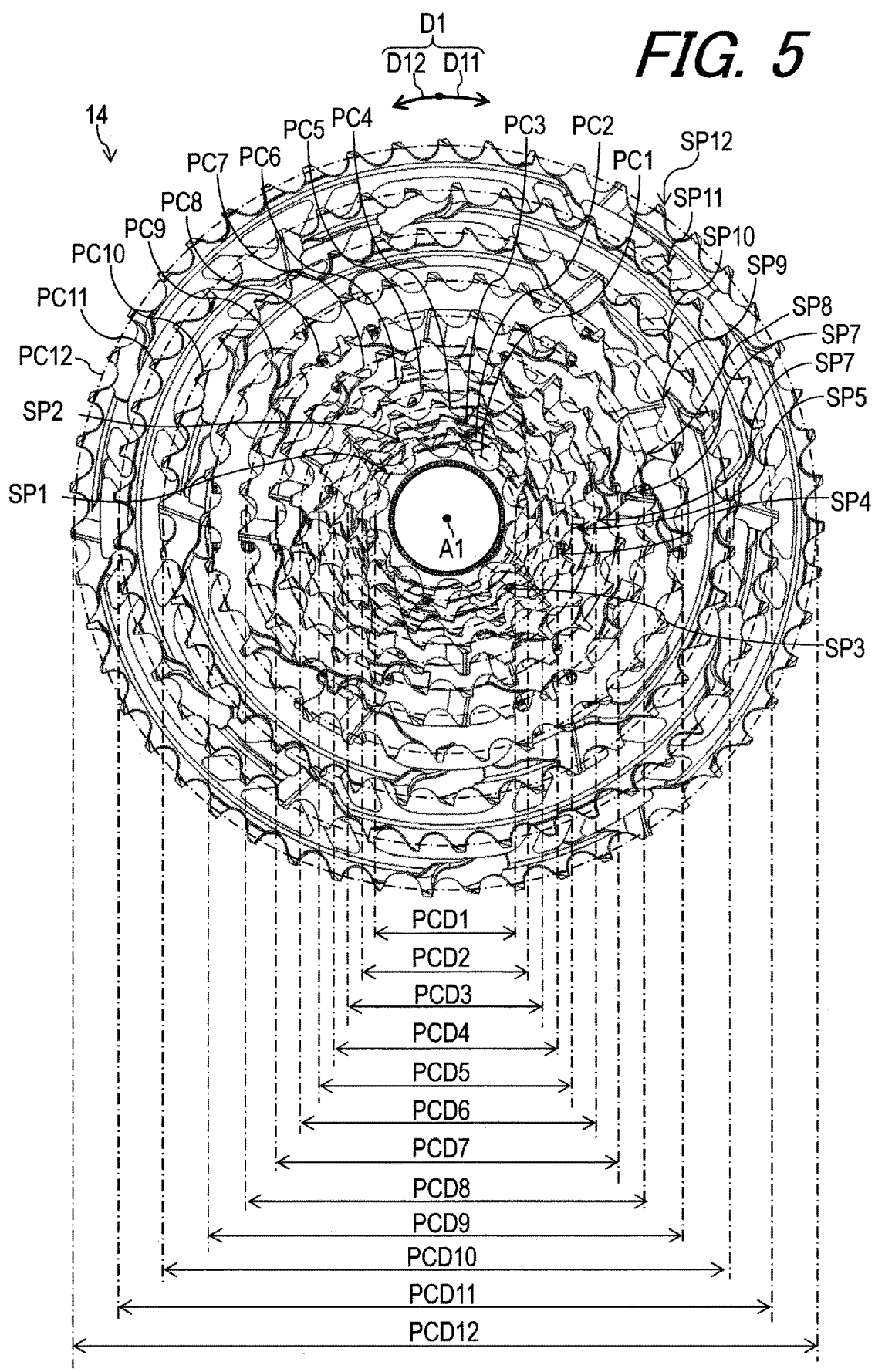
FIG. 5 is a side elevational view of the bicycle rear sprocket assembly of the bicycle drive train illustrated in FIG. 1.

As seen in FIG. 5, the bicycle rear sprocket assembly 14 comprises a plurality of bicycle sprockets. The plurality of bicycle sprockets comprises a first sprocket and a second sprocket. In this embodiment, the plurality of bicycle sprockets comprises a plurality of first sprockets SP1 and SP2 provided as the first sprocket. The plurality of bicycle sprockets also comprises a plurality of second sprockets SP3 and SP4 provided as the second sprocket. The plurality of bicycle sprockets comprises an additional sprocket. In this embodiment, the plurality of bicycle sprockets comprises a plurality of additional sprockets SP5 to SP12. However, a total number of the first sprockets is not limited to this embodiment. A total number of the second sprockets is not limited to this embodiment. A total number of the additional sprockets is not limited to this embodiment. Further, the first sprockets SP1 and SP2 can be integrally formed as a one-piece unitary member whereas the first sprocket SP1 is a separate sprocket from the first sprocket SP2 in this embodiment. In a similar way, the second sprockets SP3 and SP4 can be integrally formed as a one-piece unitary member whereas the second sprocket SP3 is a separate sprocket from the second sprocket SP4 in this embodiment.

For example, a total number of the plurality of bicycle sprockets is equal to or larger than 10. The total number of the plurality of bicycle sprockets can be equal to or larger than 11. The total number of the plurality of bicycle sprockets can be equal to or larger than 12. In this embodiment, the total number of the plurality of bicycle sprockets is 12. However, the total number of the plurality of bicycle sprockets is not limited to this embodiment. For example, the total number of the plurality of bicycle sprockets can be 13, 14, or equal to or larger than 15.

In this embodiment, the first sprocket SP1 is the smallest sprocket in the bicycle rear sprocket assembly 14. The additional sprocket SP12 is the largest sprocket in the bicycle rear sprocket assembly 14. The first sprocket SP2 corresponds to top gear in the bicycle rear sprocket assembly 14. The additional sprocket SP12 corresponds to low gear in the bicycle rear sprocket assembly 14.

As seen in FIG. 5, the first sprocket SP1 has a pitch-circle diameter PCD1. The first sprocket SP2 has a pitch-circle diameter PCD2. The second sprocket SP3 has a pitch-circle diameter PCD3. The second sprocket SP4 has a pitch-circle diameter PCD4. The additional sprocket SP5 has a pitch-circle diameter PCD5. The additional sprocket SP6 has a pitch-circle diameter PCD6. The additional sprocket SP7 has a pitch-circle diameter PCD7. The additional sprocket SP8 has a pitch-circle diameter PCD8. The additional sprocket SP9 has a pitch-circle diameter PCD9. The additional sprocket SP10 has a pitch-circle diameter PCD10. The additional sprocket SP11 has a pitch-circle diameter PCD11. The additional sprocket SP12 has a pitch-circle diameter PCD12.

The first sprocket SP1 has a pitch circle PC1 having the pitch-circle diameter PCD1. The first sprocket SP2 has a pitch circle PC2 having the pitch-circle diameter PCD2. The second sprocket SP3 has a pitch circle PC3 having the pitch-circle diameter PCD3. The second sprocket SP4 has a pitch circle PC4 having the pitch-circle diameter PCD4. The additional sprocket SP5 has a pitch circle PC5 having the pitch-circle diameter PCD5. The additional sprocket SP6 has a pitch circle PC6 having the pitch-circle diameter PCD6. The additional sprocket SP7 has a pitch circle PC7 having the pitch-circle diameter PCD7. The additional sprocket SP8 has a pitch circle PC8 having the pitch-circle diameter PCD8. The additional sprocket SP9 has a pitch circle PC9 having the pitch-circle diameter PCD9. The additional sprocket SP10 has a pitch circle PC10 having the pitch-circle diameter PCD10. The additional sprocket SP11 has a pitch circle PC11 having the pitch-circle diameter PCD11. The additional sprocket SP12 has a pitch circle PC12 having the pitch-circle diameter PCD12.

The pitch circle PC1 of the first sprocket SP1 is defined by center axes of pins of the bicycle chain 20 (FIG. 2) engaged with the first sprocket SP1. The pitch circles PC2 to PC12 are defined as well as the pitch circle PC1. Thus, they will not be descried in detail here for the sake of brevity.

In this embodiment, the pitch-circle diameter PCD1 is smaller than the pitch-circle diameter PCD2. The pitch-circle diameter PCD2 is smaller than the pitch-circle diameter PCD3. The pitch-circle diameter PCD3 is smaller than the pitch-circle diameter PCD4. The pitch-circle diameter PCD4 is smaller than the pitch-circle diameter PCD5. The pitch-circle diameter PCD5 is smaller than the pitch-circle diameter PCD6. The pitch-circle diameter PCD6 is smaller than the pitch-circle diameter PCD7. The pitch-circle diameter PCD7 is smaller than the pitch-circle diameter PCD8. The pitch-circle diameter PCD8 is smaller than the pitch-circle diameter PCD9. The pitch-circle diameter PCD9 is smaller than the pitch-circle diameter PCD10. The pitch-circle diameter PCD10 is smaller than the pitch-circle diameter PCD11. The pitch-circle diameter PCD11 is smaller than the pitch-circle diameter PCD12.

The pitch-circle diameter PCD1 is the smallest pitch-circle diameter in the bicycle rear sprocket assembly 14. The pitch-circle diameter PCD12 is the largest pitch-circle diameter in the bicycle rear sprocket assembly 14. The first sprocket SP1 corresponds to top gear in the bicycle rear sprocket assembly 14. The additional sprocket SP12 corresponds to low gear in the bicycle rear sprocket assembly 14. However, the first sprocket SP1 can correspond to another gear in the bicycle rear sprocket assembly 14. The additional sprocket SP12 can correspond to another gear in the bicycle rear sprocket assembly 14.

Figure 6:
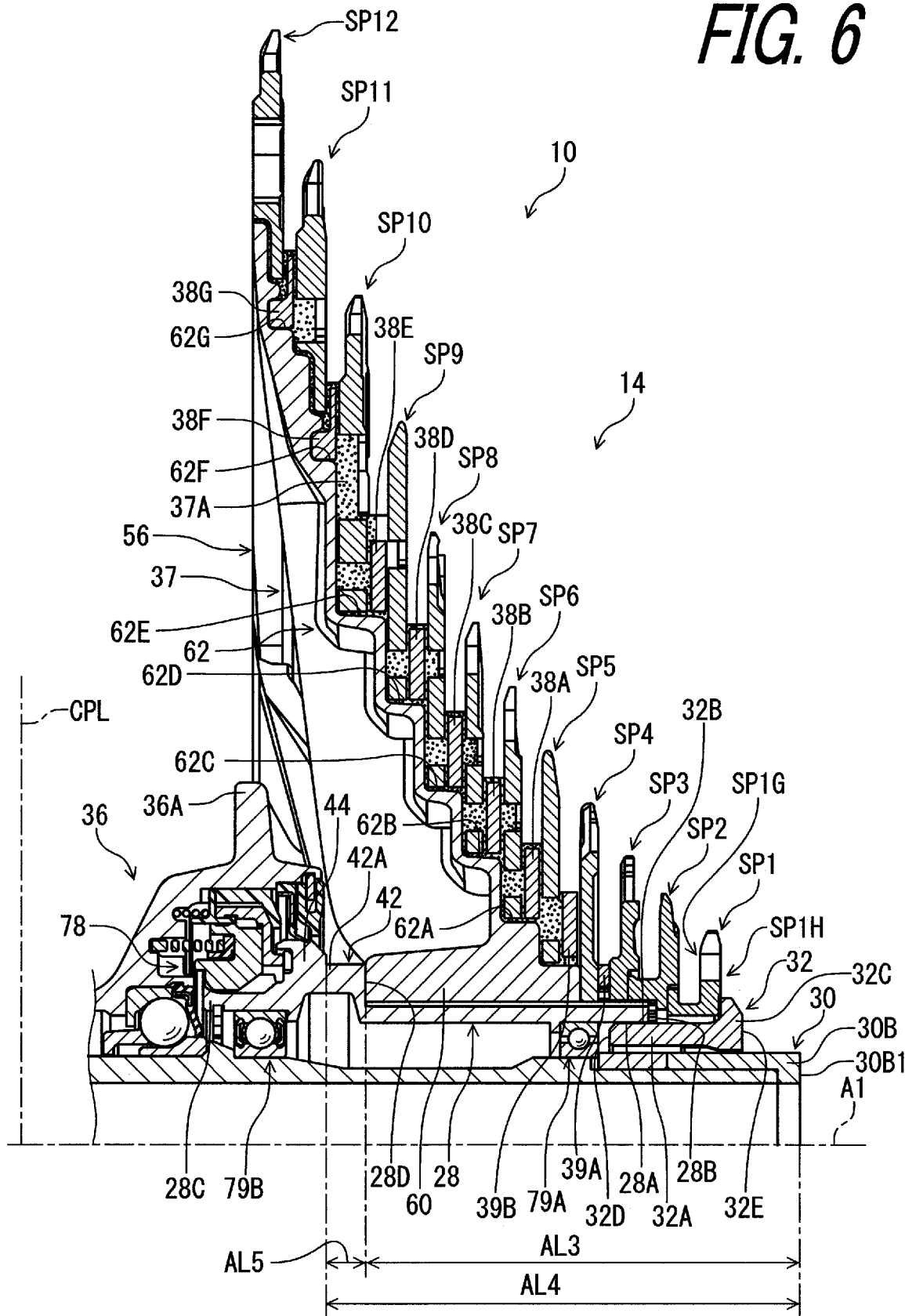
FIG. 6 is an enlarged cross-sectional view of the bicycle drive train illustrated in FIG. 4.

As seen in FIG. 6, the first sprocket SP2 is adjacent to the first sprocket SP1 without another sprocket between the first sprockets SP1 and SP2 in the axial direction D2 with respect to the rotational center axis A1 of the bicycle rear sprocket assembly 14. The second sprocket SP3 is adjacent to the first sprocket SP2 without another sprocket between the first sprocket SP2 and the second sprocket SP3 in the axial direction D2 with respect to the rotational center axis A1 of the bicycle rear sprocket assembly 14. The second sprocket SP4 is adjacent to the second sprocket SP3 without another sprocket between the second sprocket SP3 and the second sprocket SP4 in the axial direction D2 with respect to the rotational center axis A1 of the bicycle rear sprocket assembly 14. The first sprockets SP1 and SP2, the second sprocket SP3, the second sprocket SP4, and the additional sprockets SP5 to SP12 are arranged in the axial direction D2 in this order.

Figure 7:
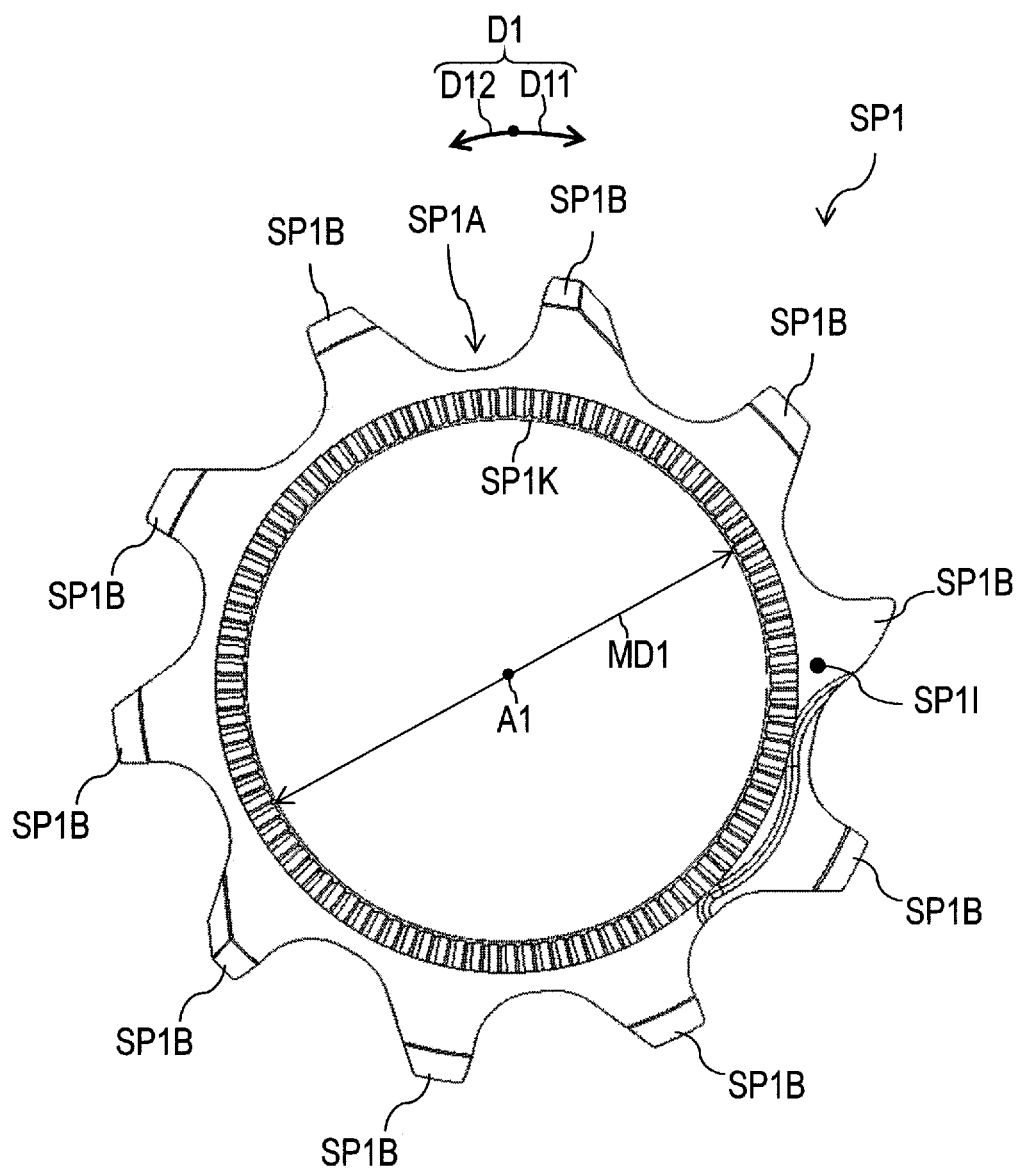
FIG. 7 is a side elevational view of a sprocket of the bicycle rear sprocket assembly illustrated in FIG. 5.

As seen in FIG. 7, the first sprocket SP1 includes a sprocket body SP1A and a plurality of sprocket teeth SP1B. The plurality of sprocket teeth SP1B extends radially outwardly from the sprocket body SP1A with respect to the rotational center axis A1 of the bicycle rear sprocket assembly 14. A total tooth number of the first sprocket SP1 (a total number of the at least one sprocket teeth SP1B) is equal to or smaller than 10. In this embodiment, the total number of the at least one sprocket tooth SP1B of the first sprocket SP1 is 10. However, the total number of the plurality of sprocket tooth SP1B of the first sprocket SP1 is not limited to this embodiment and the above range.

Figure 8:
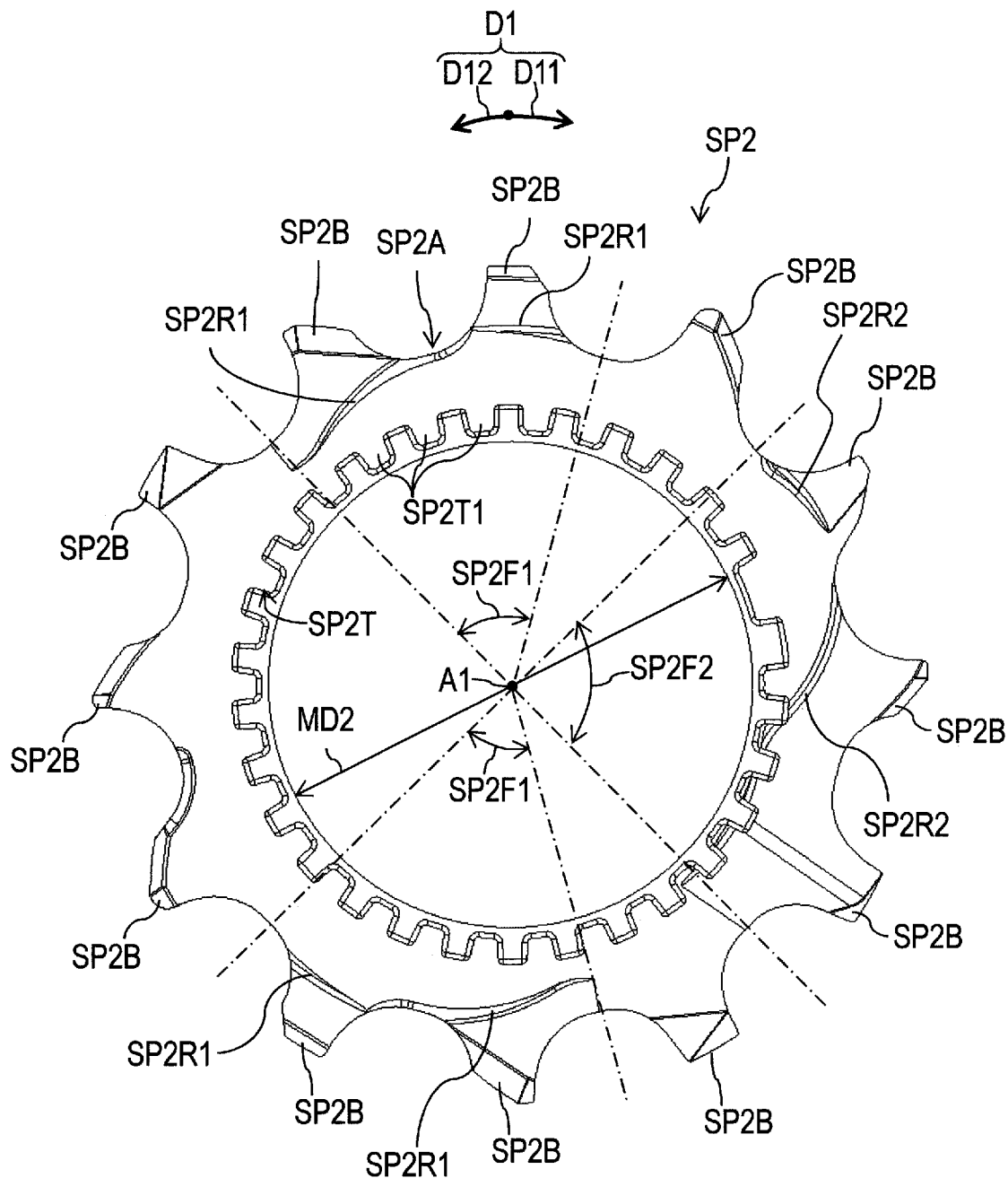
FIG. 8 is a side elevational view of a sprocket of the bicycle rear sprocket assembly illustrated in FIG. 5.

As seen in FIG. 8, the first sprocket SP2 includes a sprocket body SP2A and a plurality of sprocket teeth SP2B. The plurality of sprocket teeth SP2B extends radially outwardly from the sprocket body SP2A with respect to the rotational center axis A1 of the bicycle rear sprocket assembly 14. In this embodiment, a total number of the at least one sprocket tooth SP2B is 12. However, the total number of the plurality of sprocket tooth SP2B of the first sprocket SP2 is not limited to this embodiment.

The first sprocket SP2 includes at least one first shifting facilitation area SP2F1 to facilitate a first shifting operation in which the bicycle chain 20 shifts from the first sprocket SP2 to the first sprocket SP1. The first sprocket SP2 includes at least one second shifting facilitation area SP2F2 to facilitate a second shifting operation in which the bicycle chain 20 shifts from the first sprocket SP1 to the first sprocket SP2. In this embodiment, the first sprocket SP2 includes a plurality of first shifting facilitation areas SP2F1 to facilitate the first shifting operation. The first sprocket SP2 includes a second shifting facilitation area SP2F2 to facilitate the second shifting operation. However, a total number of the first shifting facilitation areas SP2F1 is not limited to this embodiment. A total number of the second shifting facilitation area SP2F2 is not limited to this embodiment. The term "shifting facilitation area", as used herein, is intended to be an area that is intentionally designed to facilitate a shifting operation of a bicycle chain from a sprocket to another axially adjacent sprocket in the area.

In this embodiment, the first sprocket SP2 includes a plurality of first shifting facilitation recesses SP2R1 to facilitate the first shifting operation. The first sprocket SP2 includes a plurality of second shifting facilitation recesses SP2R2 to facilitate the second shifting operation. The first shifting facilitation recess SP2R1 is provided in the first shifting facilitation area SP2F1. However, the first shifting facilitation area SP2F1 can include another structure instead of or in addition to the first shifting facilitation recess SP2R1. The second shifting facilitation area SP2F2 can include another structure instead of or in addition to the second shifting facilitation recess SP2R2.

Figure 9:
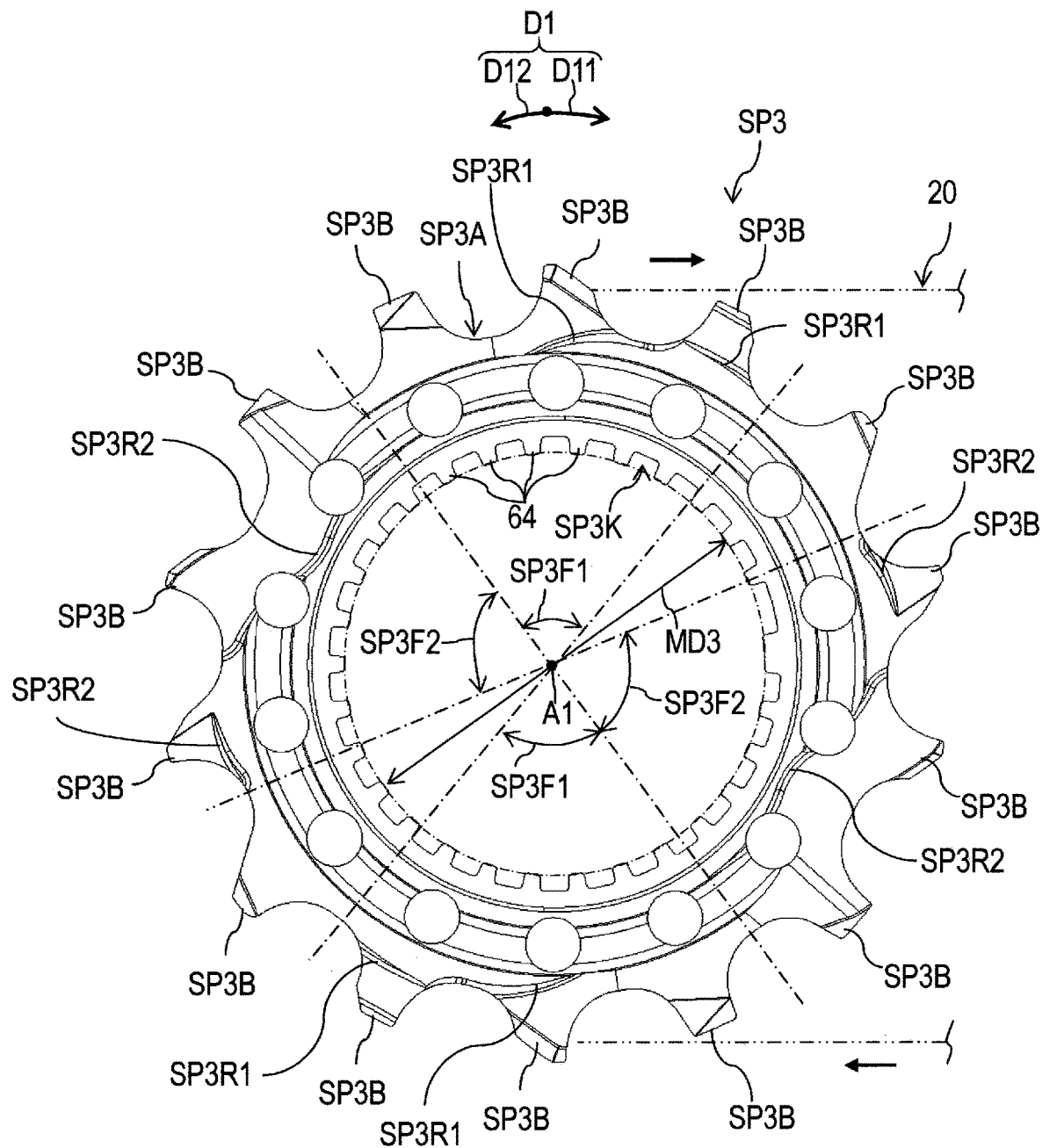
FIG. 9 is a side elevational view of a sprocket of the bicycle rear sprocket assembly illustrated in FIG. 5.

As seen in FIG. 9, the second sprocket SP3 includes a sprocket body SP3A and a plurality of sprocket teeth SP3B. The plurality of sprocket teeth SP3B extends radially outwardly from the sprocket body SP3A with respect to the rotational center axis A1 of the bicycle rear sprocket assembly 14. In this embodiment, a total number of the at least one sprocket tooth SP3B is 14. However, the total number of the plurality of sprocket tooth SP3B of the second sprocket SP3 is not limited to this embodiment.

The second sprocket SP3 includes at least one first shifting facilitation area SP3F1 to facilitate a first shifting operation in which the bicycle chain 20 shifts from the second sprocket SP3 to the first sprocket SP2 (FIG. 6). The second sprocket SP3 includes at least one second shifting facilitation area SP3F2 to facilitate a second shifting operation in which the bicycle chain 20 shifts from the first sprocket SP2 (FIG. 6) to the second sprocket SP3. In this embodiment, the second sprocket SP3 includes a plurality of first shifting facilitation areas SP3F1 to facilitate the first shifting operation. The second sprocket SP3 includes a second shifting facilitation area SP3F2 to facilitate the second shifting operation. However, a total number of the first shifting facilitation areas SP3F1 is not limited to this embodiment. A total number of the second shifting facilitation area SP3F2 is not limited to this embodiment.

In this embodiment, the second sprocket SP3 includes a plurality of first shifting facilitation recesses SP3R1 to facilitate the first shifting operation. The second sprocket SP3 includes a plurality of second shifting facilitation recesses SP3R2 to facilitate the second shifting operation. The first shifting facilitation recess SP3R1 is provided in the first shifting facilitation area SP3F1. However, the first shifting facilitation area SP3F1 can include another structure instead of or in addition to the first shifting facilitation recess SP3R1. The second shifting facilitation area SP3F2 can include another structure instead of or in addition to the second shifting facilitation recess SP3R2.

Figure 10:
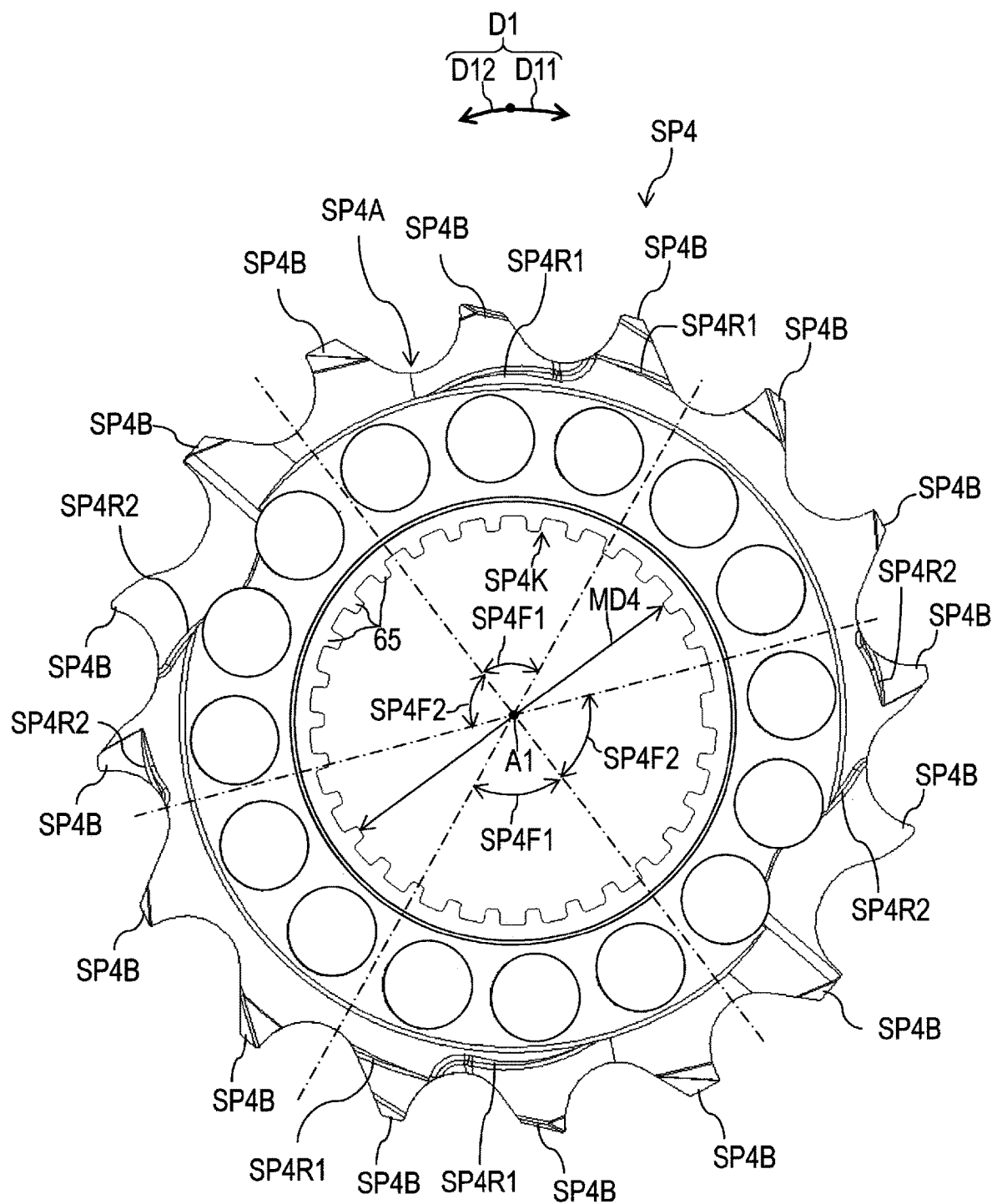
FIG. 10 is a side elevational view of a first sprocket of the bicycle rear sprocket assembly illustrated in FIG. 5.

As seen in FIG. 10, the second sprocket SP4 includes a sprocket body SP4A and a plurality of sprocket teeth SP4B. The plurality of sprocket teeth SP4B extends radially outwardly from the sprocket body SP4A with respect to the rotational center axis A1 of the bicycle rear sprocket assembly 14. In this embodiment, a total number of the at least one sprocket tooth SP4B is 16. However, the total number of the plurality of sprocket tooth SP4B of the second sprocket SP4 is not limited to this embodiment.

The second sprocket SP4 includes at least one first shifting facilitation area SP4F1 to facilitate a first shifting operation in which the bicycle chain 20 shifts from the second sprocket SP4 to the second sprocket SP3. The second sprocket SP4 includes at least one second shifting facilitation area SP4F2 to facilitate a second shifting operation in which the bicycle chain 20 shifts from the second sprocket SP3 to the second sprocket SP4. In this embodiment, the second sprocket SP4 includes a plurality of first shifting facilitation areas SP4F1 to facilitate the first shifting operation. The second sprocket SP4 includes a second shifting facilitation area SP4F2 to facilitate the second shifting operation. However, a total number of the first shifting facilitation areas SP4F1 is not limited to this embodiment. A total number of the second shifting facilitation area SP4F2 is not limited to this embodiment.

In this embodiment, the second sprocket SP4 includes a plurality of first shifting facilitation recesses SP4R1 to facilitate the first shifting operation. The second sprocket SP4 includes a plurality of second shifting facilitation recesses SP4R2 to facilitate the second shifting operation. The first shifting facilitation recess SP4R1 is provided in the first shifting facilitation area SP4F1. However, the first shifting facilitation area SP4F1 can include another structure instead of or in addition to the first shifting facilitation recess SP4R1. The second shifting facilitation area SP4F2 can include another structure instead of or in addition to the second shifting facilitation recess SP4R2.

Figure 11:
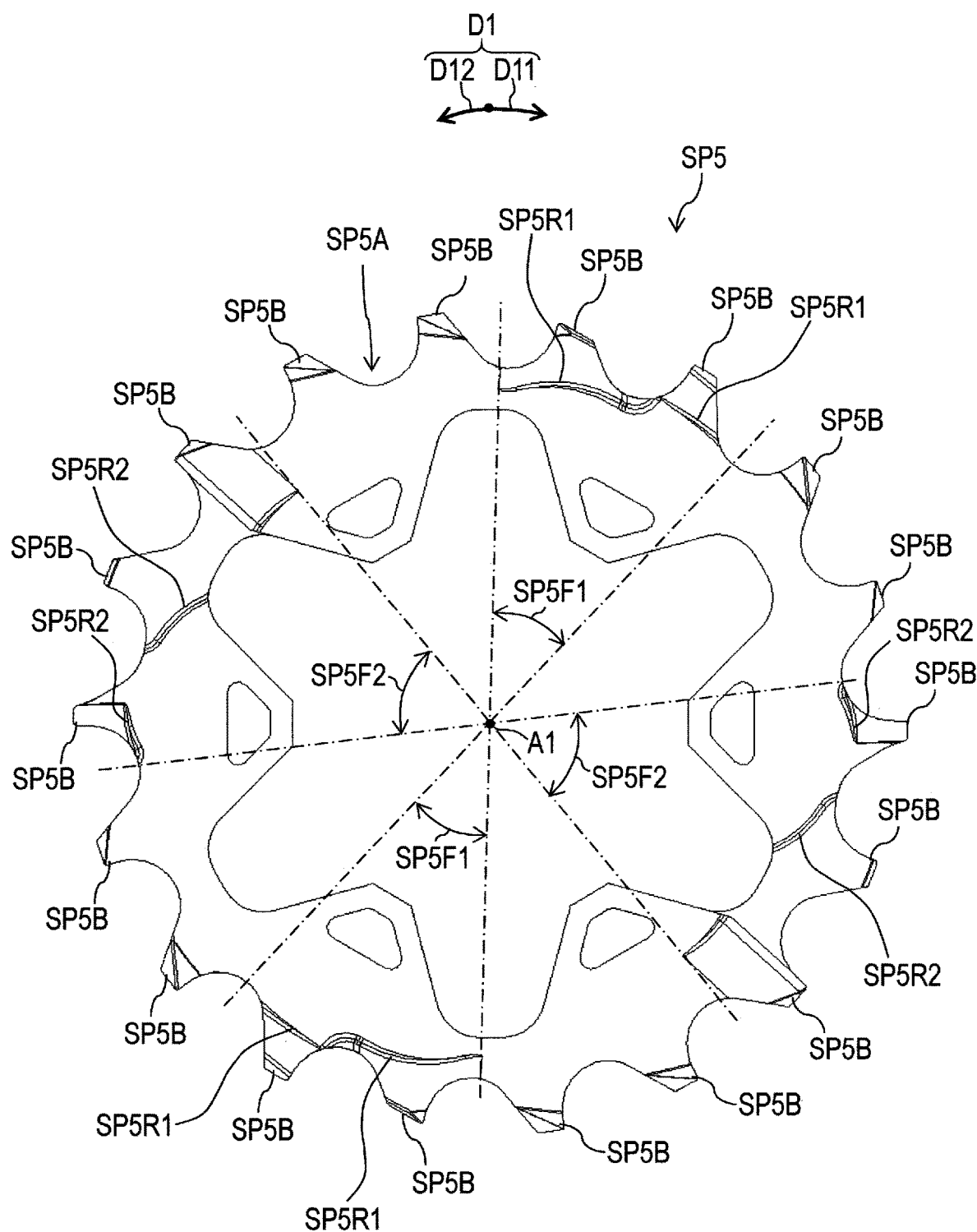
FIG. 11 is a side elevational view of a sprocket of the bicycle rear sprocket assembly illustrated in FIG. 5.

As seen in FIG. 11, the additional sprocket SP5 includes a sprocket body SP5A and a plurality of sprocket teeth SP5B. The plurality of sprocket teeth SP5B extends radially outwardly from the sprocket body SP5A with respect to the rotational center axis A1 of the bicycle rear sprocket assembly 14. In this embodiment, a total number of the at least one sprocket tooth SP5B is 18. However, the total number of the plurality of sprocket tooth SP5B of the additional sprocket SP5 is not limited to this embodiment.

The additional sprocket SP5 includes at least one first shifting facilitation area SP5F1 to facilitate a first shifting operation in which the bicycle chain 20 shifts from the additional sprocket SP5 to the neighboring smaller sprocket SP4. The additional sprocket SP5 includes at least one second shifting facilitation area SP5F2 to facilitate a second shifting operation in which the bicycle chain 20 shifts from the neighboring smaller sprocket SP4 to the additional sprocket SP5. The neighboring smaller sprocket SP4 is adjacent to the additional sprocket SP5 without another sprocket between the additional sprocket SP5 and the neighboring smaller sprocket SP4 in the axial direction D2 with respect to the rotational center axis A1 of the bicycle rear sprocket assembly 14. In this embodiment, the additional sprocket SP5 includes a plurality of first shifting facilitation areas SP5F1 to facilitate the first shifting operation. The additional sprocket SP5 includes a plurality of second shifting facilitation areas SP5F2 to facilitate the second shifting operation. However, a total number of the first shifting facilitation areas SP5F1 is not limited to this embodiment. A total number of the second shifting facilitation areas SP5F2 is not limited to this embodiment.

In this embodiment, the additional sprocket SP5 includes a plurality of first shifting facilitation recesses SP5R1 to facilitate the first shifting operation. The additional sprocket SP5 includes a plurality of second shifting facilitation recesses SP5R2 to facilitate the second shifting operation. The first shifting facilitation recess SP5R1 is provided in the first shifting facilitation area SP5F1. The second shifting facilitation recess SP5R2 is provided in the second shifting facilitation area SP5F2. However, the first shifting facilitation area SP5F1 can include another structure instead of or in addition to the first shifting facilitation recess SP5R1. The second shifting facilitation area SP5F2 can include another structure instead of or in addition to the second shifting facilitation recess SP5R2.

Figure 12:
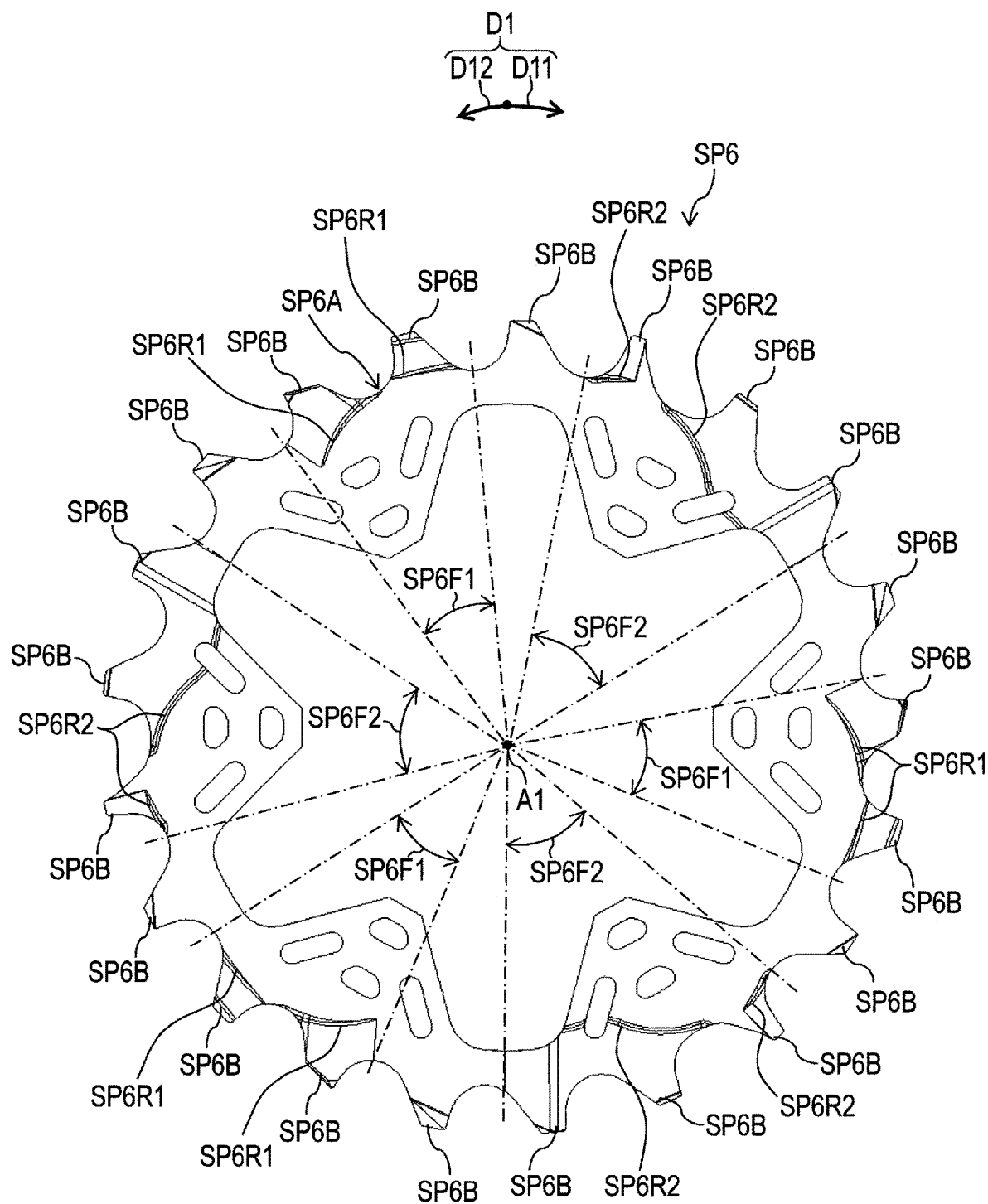
FIG. 12 is a side elevational view of a sprocket of the bicycle rear sprocket assembly illustrated in FIG. 5.

As seen in FIG. 12, the additional sprocket SP6 includes a sprocket body SP6A and a plurality of sprocket teeth SP6B. The plurality of sprocket teeth SP6B extends radially outwardly from the sprocket body SP6A with respect to the rotational center axis A1 of the bicycle rear sprocket assembly 14. In this embodiment, a total number of the at least one sprocket tooth SP6B is 21. However, the total number of the plurality of sprocket tooth SP6B of the additional sprocket SP6 is not limited to this embodiment.

The additional sprocket SP6 includes at least one first shifting facilitation area SP6F1 to facilitate a first shifting operation in which the bicycle chain 20 shifts from the additional sprocket SP6 to the neighboring smaller sprocket SP5. The additional sprocket SP6 includes at least one second shifting facilitation area SP6F2 to facilitate a second shifting operation in which the bicycle chain 20 shifts from the neighboring smaller sprocket SP5 to the additional sprocket SP6. The neighboring smaller sprocket SP5 is adjacent to the additional sprocket SP6 without another sprocket between the additional sprocket SP6 and the neighboring smaller sprocket SP5 in the axial direction D2 with respect to the rotational center axis A1 of the bicycle rear sprocket assembly 14. In this embodiment, the additional sprocket SP6 includes a plurality of first shifting facilitation areas SP6F1 to facilitate the first shifting operation. The additional sprocket SP6 includes a plurality of second shifting facilitation areas SP6F2 to facilitate the second shifting operation. However, a total number of the first shifting facilitation areas SP6F1 is not limited to this embodiment. A total number of the second shifting facilitation areas SP6F2 is not limited to this embodiment.

In this embodiment, the additional sprocket SP6 includes a plurality of first shifting facilitation recesses SP6R1 to facilitate the first shifting operation. The additional sprocket SP6 includes a plurality of second shifting facilitation recesses SP6R2 to facilitate the second shifting operation. The first shifting facilitation recess SP6R1 is provided in the first shifting facilitation area SP6F1. The second shifting facilitation recess SP6R2 is provided in the second shifting facilitation area SP6F2. However, the first shifting facilitation area SP6F1 can include another structure instead of or in addition to the first shifting facilitation recess SP6R1. The second shifting facilitation area SP6F2 can include another structure instead of or in addition to the second shifting facilitation recess SP6R2.

Figure 13:
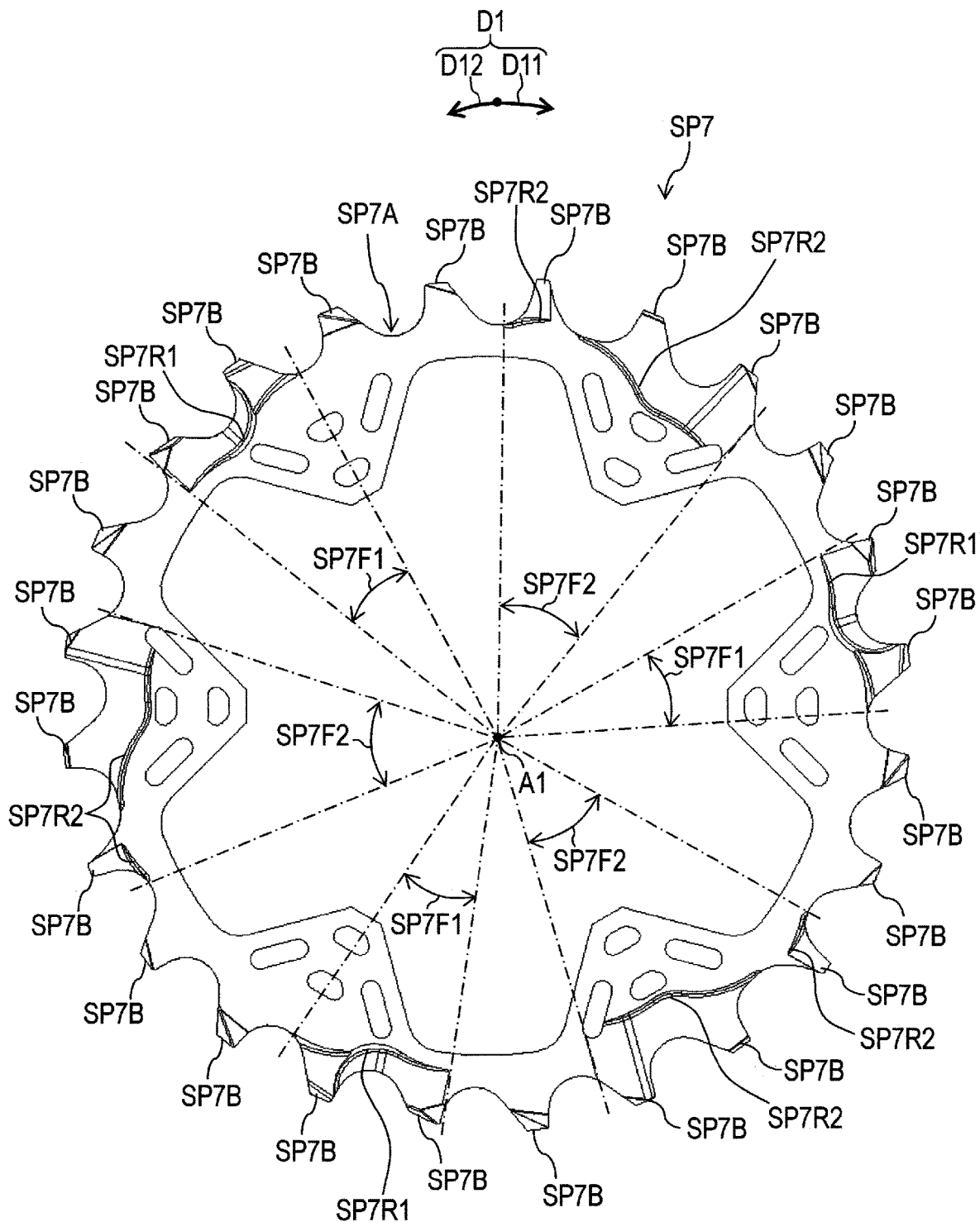
FIG. 13 is a side elevational view of a sprocket of the bicycle rear sprocket assembly illustrated in FIG. 5.

As seen in FIG. 13, the additional sprocket SP7 includes a sprocket body SP7A and a plurality of sprocket teeth SP7B. The plurality of sprocket teeth SP7B extends radially outwardly from the sprocket body SP7A with respect to the rotational center axis A1 of the bicycle rear sprocket assembly 14. In this embodiment, a total number of the at least one sprocket tooth SP7B is 24. However, the total number of the plurality of sprocket tooth SP7B of the additional sprocket SP7 is not limited to this embodiment.

The additional sprocket SP7 includes at least one first shifting facilitation area SP7F1 to facilitate a first shifting operation in which the bicycle chain 20 shifts from the additional sprocket SP7 to the neighboring smaller sprocket SP6. The additional sprocket SP7 includes at least one second shifting facilitation area SP7F2 to facilitate a second shifting operation in which the bicycle chain 20 shifts from the neighboring smaller sprocket SP6 to the additional sprocket SP7. The neighboring smaller sprocket SP6 is adjacent to the additional sprocket SP7 without another sprocket between the additional sprocket SP7 and the neighboring smaller sprocket SP6 in the axial direction D2 with respect to the rotational center axis A1 of the bicycle rear sprocket assembly 14. In this embodiment, the additional sprocket SP7 includes a plurality of first shifting facilitation areas SP7F1 to facilitate the first shifting operation. The additional sprocket SP7 includes a plurality of second shifting facilitation areas SP7F2 to facilitate the second shifting operation. However, a total number of the first shifting facilitation areas SP7F1 is not limited to this embodiment. A total number of the second shifting facilitation areas SP7F2 is not limited to this embodiment.

In this embodiment, the additional sprocket SP7 includes a plurality of first shifting facilitation recesses SP7R1 to facilitate the first shifting operation. The additional sprocket SP7 includes a plurality of second shifting facilitation recesses SP7R2 to facilitate the second shifting operation. The first shifting facilitation recess SP7R1 is provided in the first shifting facilitation area SP7F1. The second shifting facilitation recess SP7R2 is provided in the second shifting facilitation area SP7F2. However, the first shifting facilitation area SP7F1 can include another structure instead of or in addition to the first shifting facilitation recess SP7R1. The second shifting facilitation area SP7F2 can include another structure instead of or in addition to the second shifting facilitation recess SP7R2.

Figure 14:
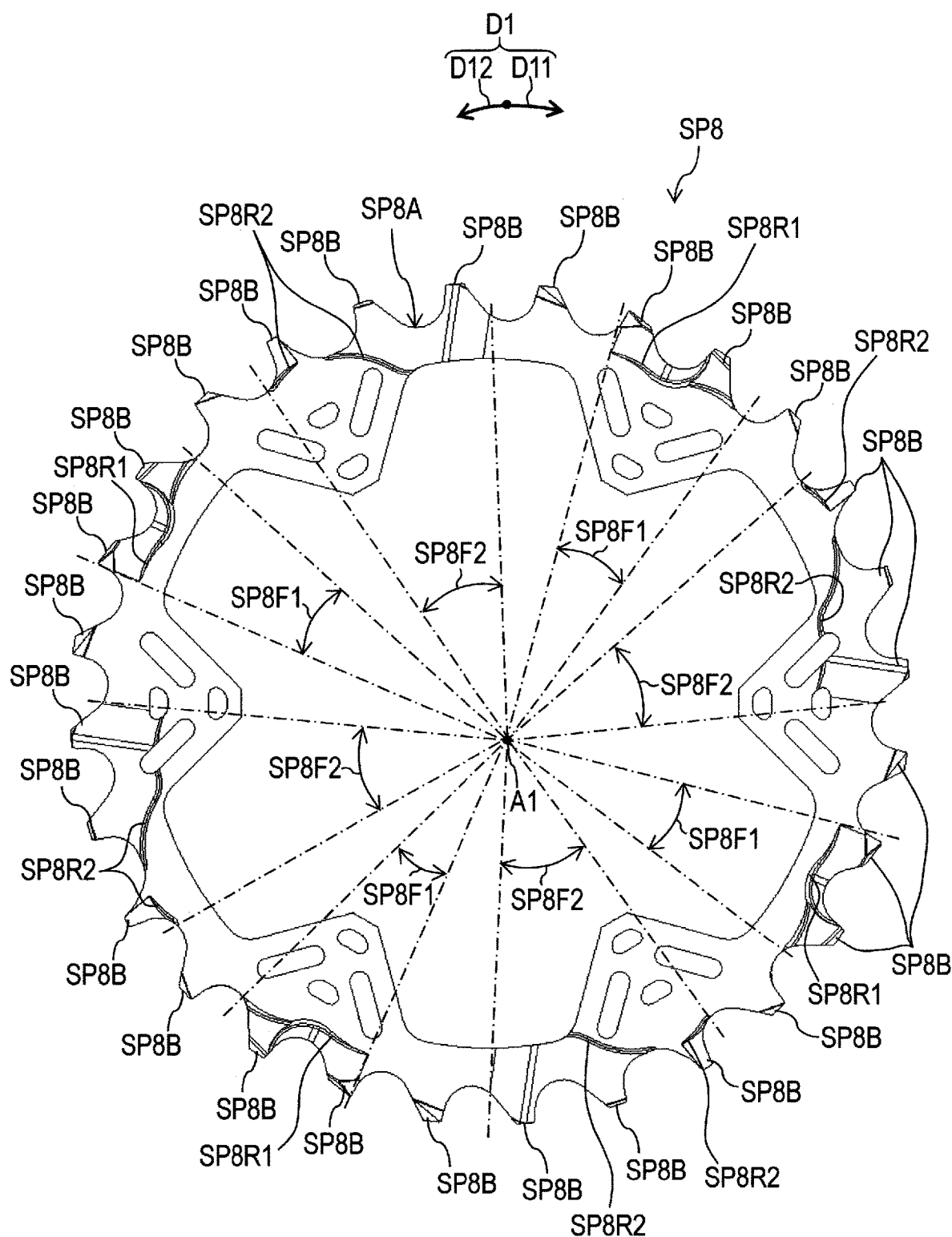
FIG. 14 is a side elevational view of a sprocket of the bicycle rear sprocket assembly illustrated in FIG. 5.

As seen in FIG. 14, the additional sprocket SP8 includes a sprocket body SP8A and a plurality of sprocket teeth SP8B. The plurality of sprocket teeth SP8B extends radially outwardly from the sprocket body SP8A with respect to the rotational center axis A1 of the bicycle rear sprocket assembly 14. In this embodiment, a total number of the at least one sprocket tooth SP8B is 28. However, the total number of the plurality of sprocket tooth SP8B of the additional sprocket SP8 is not limited to this embodiment.

The additional sprocket SP8 includes at least one first shifting facilitation area SP8F1 to facilitate a first shifting operation in which the bicycle chain 20 shifts from the additional sprocket SP8 to the neighboring smaller sprocket SP7. The additional sprocket SP8 includes at least one second shifting facilitation area SP8F2 to facilitate a second shifting operation in which the bicycle chain 20 shifts from the neighboring smaller sprocket SP7 to the additional sprocket SP8. The neighboring smaller sprocket SP7 is adjacent to the additional sprocket SP8 without another sprocket between the additional sprocket SP8 and the neighboring smaller sprocket SP7 in the axial direction D2 with respect to the rotational center axis A1 of the bicycle rear sprocket assembly 14. In this embodiment, the additional sprocket SP8 includes a plurality of first shifting facilitation areas SP8F1 to facilitate the first shifting operation. The additional sprocket SP8 includes a plurality of second shifting facilitation areas SP8F2 to facilitate the second shifting operation. However, a total number of the first shifting facilitation areas SP8F1 is not limited to this embodiment. A total number of the second shifting facilitation areas SP8F2 is not limited to this embodiment.

In this embodiment, the additional sprocket SP8 includes a plurality of first shifting facilitation recesses SP8R1 to facilitate the first shifting operation. The additional sprocket SP8 includes a plurality of second shifting facilitation recesses SP8R2 to facilitate the second shifting operation. The first shifting facilitation recess SP8R1 is provided in the first shifting facilitation area SP8F1. The second shifting facilitation recess SP8R2 is provided in the second shifting facilitation area SP8F2. However, the first shifting facilitation area SP8F1 can include another structure instead of or in addition to the first shifting facilitation recess SP8R1. The second shifting facilitation area SP8F2 can include another structure instead of or in addition to the second shifting facilitation recess SP8R2.

Figure 15:
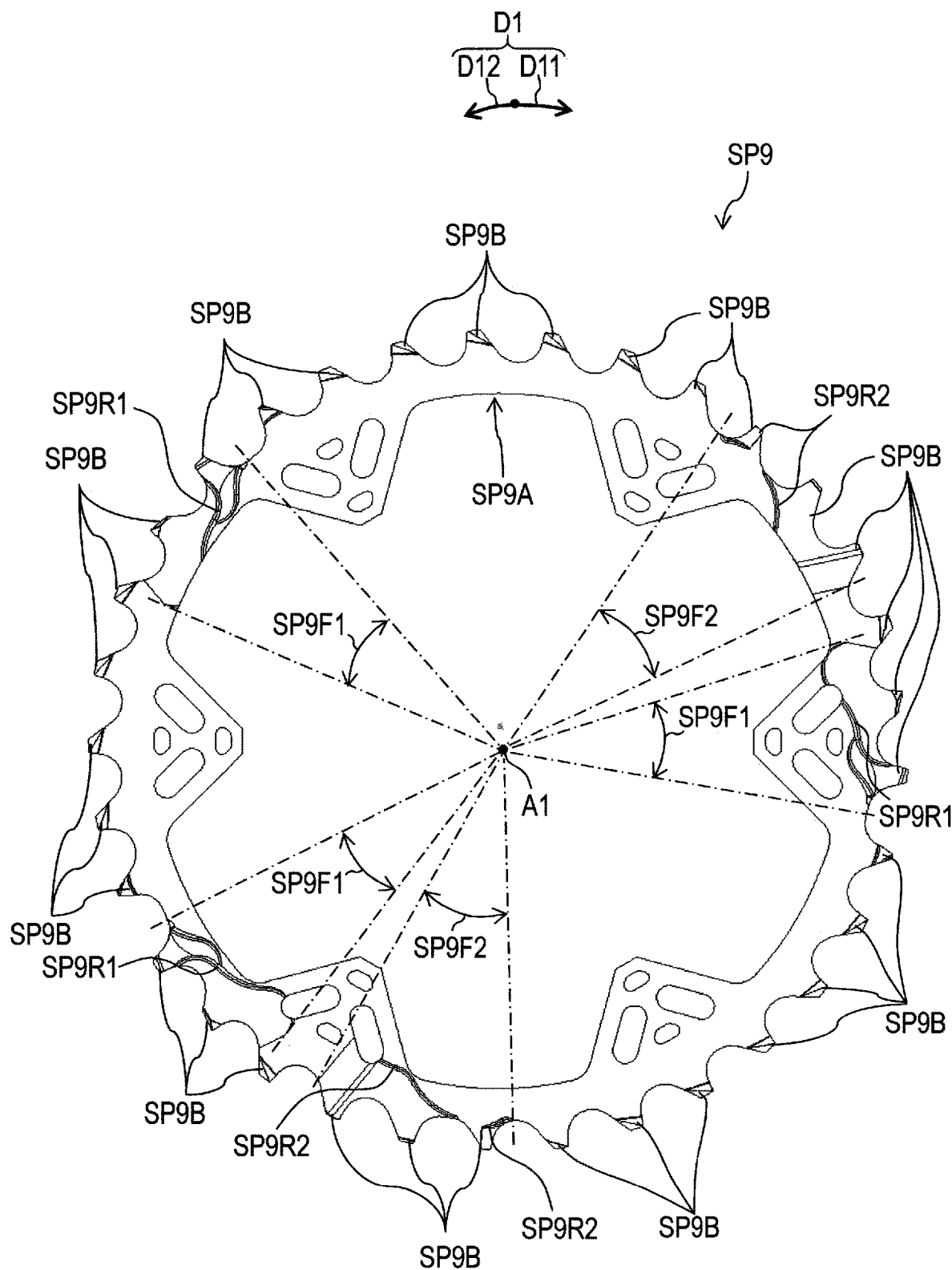
FIG. 15 is a side elevational view of a sprocket of the bicycle rear sprocket assembly illustrated in FIG. 5.

As seen in FIG. 15, the additional sprocket SP9 includes a sprocket body SP9A and a plurality of sprocket teeth SP9B. The plurality of sprocket teeth SP9B extends radially outwardly from the sprocket body SP9A with respect to the rotational center axis A1 of the bicycle rear sprocket assembly 14. In this embodiment, a total number of the at least one sprocket tooth SP9B is 33. However, the total number of the plurality of sprocket tooth SP9B of the additional sprocket SP9 is not limited to this embodiment.

The additional sprocket SP9 includes at least one first shifting facilitation area SP9F1 to facilitate a first shifting operation in which the bicycle chain 20 shifts from the additional sprocket SP9 to the neighboring smaller sprocket SP8. The additional sprocket SP9 includes at least one second shifting facilitation area SP9F2 to facilitate a second shifting operation in which the bicycle chain 20 shifts from the neighboring smaller sprocket SP8 to the additional sprocket SP9. The neighboring smaller sprocket SP8 is adjacent to the additional sprocket SP9 without another sprocket between the additional sprocket SP9 and the neighboring smaller sprocket SP8 in the axial direction D2 with respect to the rotational center axis A1 of the bicycle rear sprocket assembly 14. In this embodiment, the additional sprocket SP9 includes a plurality of first shifting facilitation areas SP9F1 to facilitate the first shifting operation. The additional sprocket SP9 includes a plurality of second shifting facilitation areas SP9F2 to facilitate the second shifting operation. However, a total number of the first shifting facilitation areas SP9F1 is not limited to this embodiment. A total number of the second shifting facilitation areas SP9F2 is not limited to this embodiment.

In this embodiment, the additional sprocket SP9 includes a plurality of first shifting facilitation recesses SP9R1 to facilitate the first shifting operation. The additional sprocket SP9 includes a plurality of second shifting facilitation recesses SP9R2 to facilitate the second shifting operation. The first shifting facilitation recess SP9R1 is provided in the first shifting facilitation area SP9F1. The second shifting facilitation recess SP9R2 is provided in the second shifting facilitation area SP9F2. However, the first shifting facilitation area SP9F1 can include another structure instead of or in addition to the first shifting facilitation recess SP9R1. The second shifting facilitation area SP9F2 can include another structure instead of or in addition to the second shifting facilitation recess SP9R2.

Figure 16:
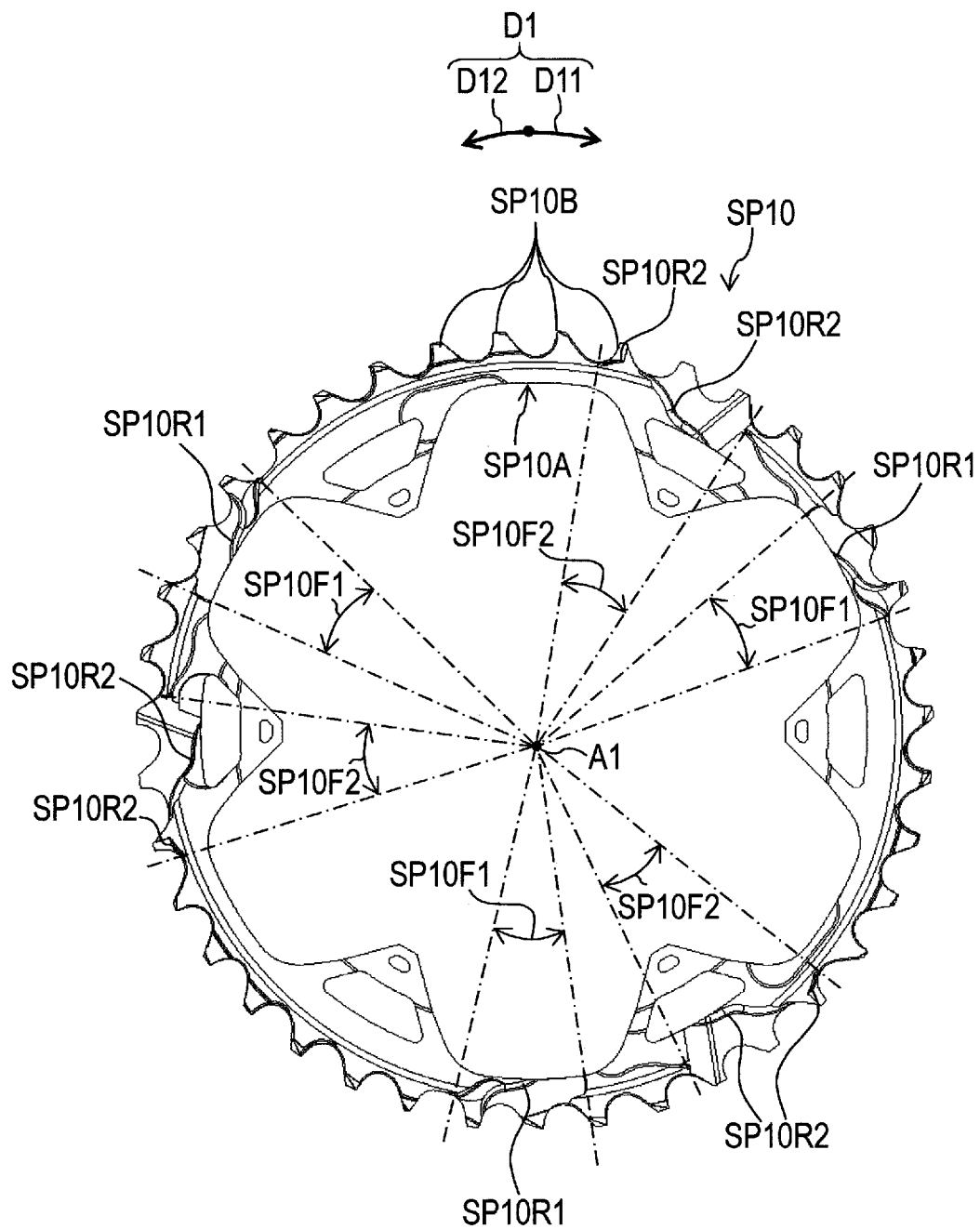
FIG. 16 is a side elevational view of a sprocket of the bicycle rear sprocket assembly illustrated in FIG. 5.

As seen in FIG. 16, the additional sprocket SP10 includes a sprocket body SP10A and a plurality of sprocket teeth SP10B. The plurality of sprocket teeth SP10B extends radially outwardly from the sprocket body SP10A with respect to the rotational center axis A1 of the bicycle rear sprocket assembly 14. In this embodiment, a total number of the at least one sprocket tooth SP10B is 39. However, the total number of the plurality of sprocket tooth SP10B of the additional sprocket SP10 is not limited to this embodiment.

The additional sprocket SP10 includes at least one first shifting facilitation area SP10F1 to facilitate a first shifting operation in which the bicycle chain 20 shifts from the additional sprocket SP10 to the neighboring smaller sprocket SP9. The additional sprocket SP10 includes at least one second shifting facilitation area SP10F2 to facilitate a second shifting operation in which the bicycle chain 20 shifts from the neighboring smaller sprocket SP9 to the additional sprocket SP10. The neighboring smaller sprocket SP9 is adjacent to the additional sprocket SP10 without another sprocket between the additional sprocket SP10 and the neighboring smaller sprocket SP9 in the axial direction D2 with respect to the rotational center axis A1 of the bicycle rear sprocket assembly 14. In this embodiment, the additional sprocket SP10 includes a plurality of first shifting facilitation areas SP10F1 to facilitate the first shifting operation. The additional sprocket SP10 includes a plurality of second shifting facilitation areas SP10F2 to facilitate the second shifting operation. However, a total number of the first shifting facilitation areas SP10F1 is not limited to this embodiment. A total number of the second shifting facilitation areas SP10F2 is not limited to this embodiment.

In this embodiment, the additional sprocket SP10 includes a plurality of first shifting facilitation recesses SP10R1 to facilitate the first shifting operation. The additional sprocket SP10 includes a plurality of second shifting facilitation recesses SP10R2 to facilitate the second shifting operation. The first shifting facilitation recess SP10R1 is provided in the first shifting facilitation area SP10F1. The second shifting facilitation recess SP10R2 is provided in the second shifting facilitation area SP10F2. However, the first shifting facilitation area SP10F1 can include another structure instead of or in addition to the first shifting facilitation recess SP10R1. The second shifting facilitation area SP10F2 can include another structure instead of or in addition to the second shifting facilitation recess SP10R2.

Figure 17:
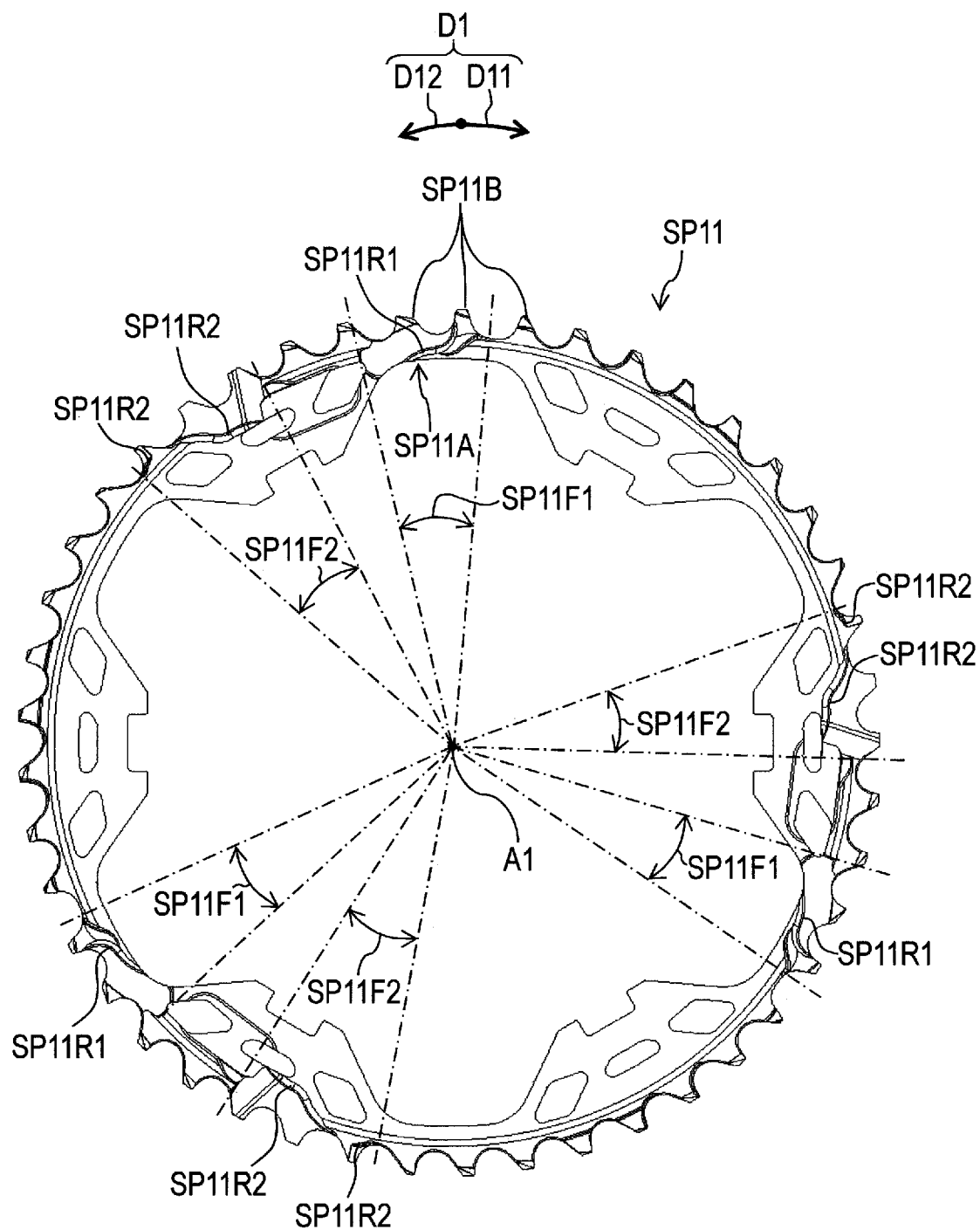
FIG. 17 is a side elevational view of a sprocket of the bicycle rear sprocket assembly illustrated in FIG. 5.

As seen in FIG. 17, the additional sprocket SP11 includes a sprocket body SP11A and a plurality of sprocket teeth SP11B. The plurality of sprocket teeth SP11B extends radially outwardly from the sprocket body SP11A with respect to the rotational center axis A1 of the bicycle rear sprocket assembly 14. In this embodiment, a total number of the at least one sprocket tooth SP11B is 45. However, the total number of the plurality of sprocket tooth SP11B of the additional sprocket SP11 is not limited to this embodiment.

The additional sprocket SP11 includes at least one first shifting facilitation area SP11F1 to facilitate a first shifting operation in which the bicycle chain 20 shifts from the additional sprocket SP11 to the neighboring smaller sprocket SP10. The additional sprocket SP11 includes at least one second shifting facilitation area SP11F2 to facilitate a second shifting operation in which the bicycle chain 20 shifts from the neighboring smaller sprocket SP10 to the additional sprocket SP11. The neighboring smaller sprocket SP10 is adjacent to the additional sprocket SP11 without another sprocket between the additional sprocket SP11 and the neighboring smaller sprocket SP10 in the axial direction D2 with respect to the rotational center axis A1 of the bicycle rear sprocket assembly 14. In this embodiment, the additional sprocket SP11 includes a plurality of first shifting facilitation areas SP to facilitate the first shifting operation. The additional sprocket SP11 includes a plurality of second shifting facilitation areas SP11F2 to facilitate the second shifting operation. However, a total number of the first shifting facilitation areas SP11F1 is not limited to this embodiment. A total number of the second shifting facilitation areas SP11F2 is not limited to this embodiment.

In this embodiment, the additional sprocket SP11 includes a plurality of first shifting facilitation recesses SP11R1 to facilitate the first shifting operation. The additional sprocket SP11 includes a plurality of second shifting facilitation recesses SP11R2 to facilitate the second shifting operation. The first shifting facilitation recess SP11R1 is provided in the first shifting facilitation area SP11F1. The second shifting facilitation recess SP11R2 is provided in the second shifting facilitation area SP11F2. However, the first shifting facilitation area SP11F1 can include another structure instead of or in addition to the first shifting facilitation recess SP11R1. The second shifting facilitation area SP11F2 can include another structure instead of or in addition to the second shifting facilitation recess SP11R2.

Figure 18:
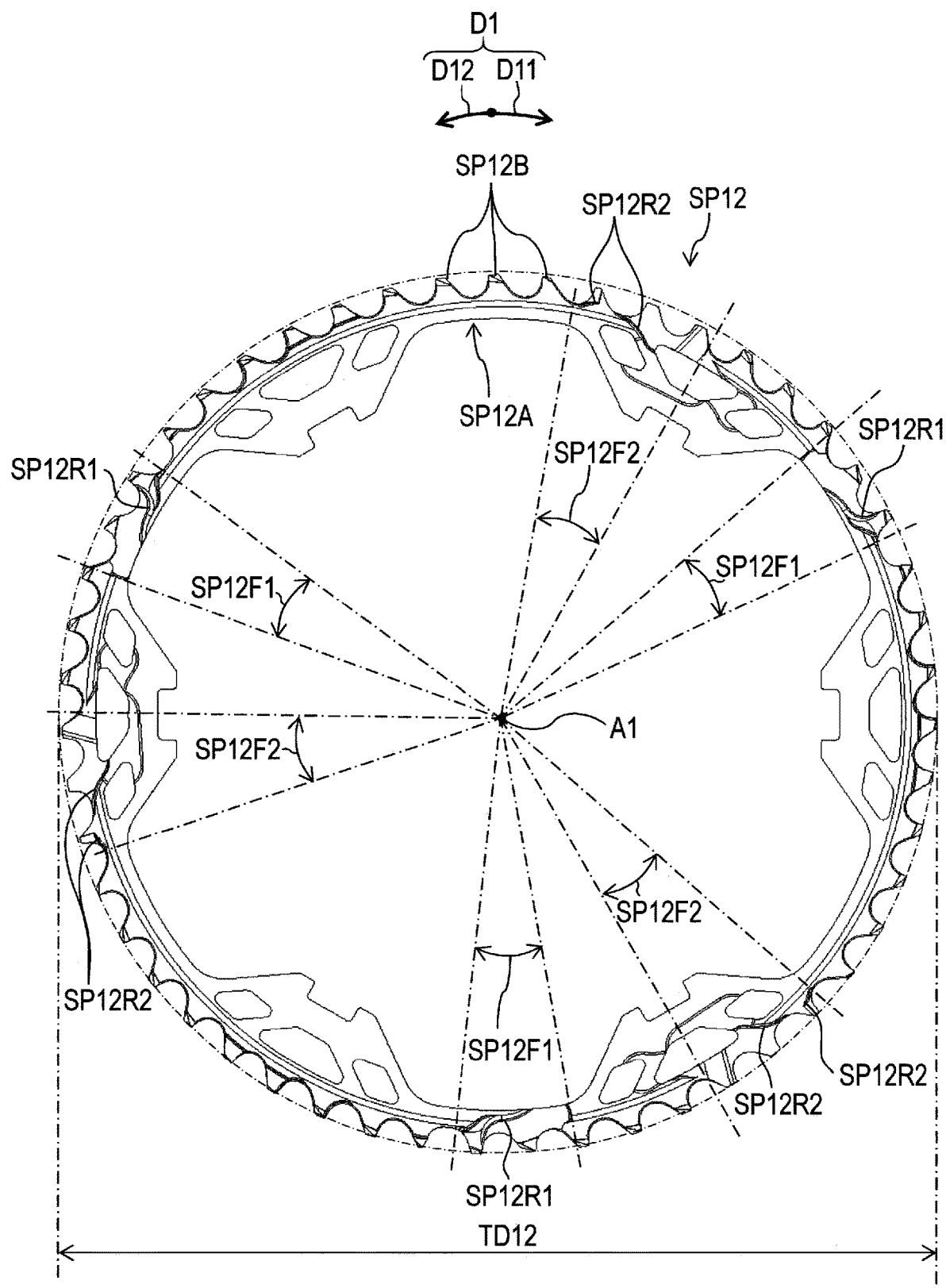
FIG. 18 is a side elevational view of a sprocket of the bicycle rear sprocket assembly illustrated in FIG. 5.

As seen in FIG. 18, the additional sprocket SP12 includes a sprocket body SP12A and a plurality of sprocket teeth SP12B. The plurality of sprocket teeth SP12B extends radially outwardly from the sprocket body SP12A with respect to the rotational center axis A1 of the bicycle rear sprocket assembly 14. A total tooth number of the additional sprocket SP12 is equal to or larger than 46. The total tooth number of the additional sprocket SP12 can also be equal to or larger than 50. The total tooth number of the additional sprocket SP12 is 51 in this embodiment. However, the total number of the at least one sprocket tooth SP12B of the additional sprocket SP12 is not limited to this embodiment and the above ranges.

The additional sprocket SP12 includes at least one first shifting facilitation area SP12F1 to facilitate a first shifting operation in which the bicycle chain 20 shifts from the additional sprocket SP12 to a neighboring smaller sprocket SP11. The additional sprocket SP12 includes at least one second shifting facilitation area SP12F2 to facilitate a second shifting operation in which the bicycle chain 20 shifts from the neighboring smaller sprocket SP11 to the additional sprocket SP12. The neighboring smaller sprocket SP11 is adjacent to the additional sprocket SP12 without another sprocket between the additional sprocket SP12 and the neighboring smaller sprocket SP11 in the axial direction D2 with respect to the rotational center axis A1 of the bicycle rear sprocket assembly 14. In this embodiment, the additional sprocket SP12 includes a plurality of first shifting facilitation areas SP to facilitate the first shifting operation. The additional sprocket SP12 includes a plurality of second shifting facilitation areas SP12F2 to facilitate the second shifting operation. However, a total number of the first shifting facilitation areas SP12F1 is not limited to this embodiment. A total number of the second shifting facilitation areas SP12F2 is not limited to this embodiment.

In this embodiment, the additional sprocket SP12 includes a plurality of first shifting facilitation recesses SP12R1 to facilitate the first shifting operation. The additional sprocket SP12 includes a plurality of second shifting facilitation recesses SP12R2 to facilitate the second shifting operation. The first shifting facilitation recess SP12R1 is provided in the first shifting facilitation area SP12F1. The second shifting facilitation recess SP12R2 is provided in the second shifting facilitation area SP12F2. However, the first shifting facilitation area SP can include another structure instead of or in addition to the first shifting facilitation recess SP12R1. The second shifting facilitation area SP12F2 can include another structure instead of or in addition to the second shifting facilitation recess SP12R2.

Figure 19:
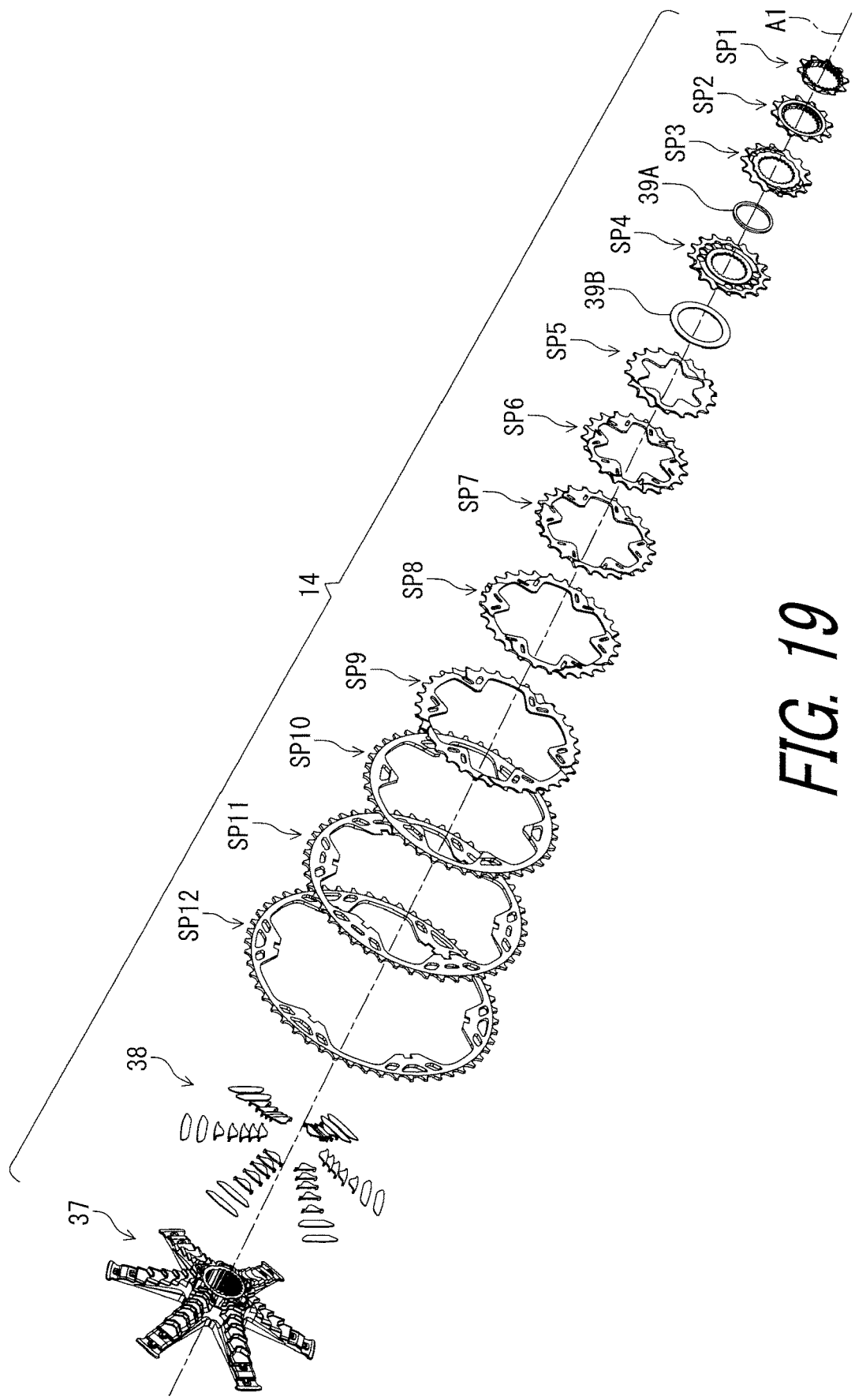
FIG. 19 is an exploded perspective view of the bicycle rear sprocket assembly illustrated in FIG. 5.

As seen in FIG. 19, the sprockets SP1 to SP12 are separate members from each other. However, at least one of the sprockets SP1 to SP12 can be at least partly provided integrally with another of the sprockets SP1 to SP12. All of the sprockets SP1 to SP12 can be integrally formed with each other as a one-piece unitary unit. In such a case, at least one of the sprockets SP3 to SP 12 can include at least ten internal spline teeth.

The bicycle rear sprocket assembly 14 further comprises a sprocket support member 37, a plurality of spacers 38, a first ring 39A, and a second ring 39B. The first ring 39A is provided between the second sprocket SP3 and the second sprocket SP4 in the axial direction D2. The second ring 39B is provided between the second sprocket SP4 and the additional sprocket SP5 in the axial direction D2. The additional sprocket is configured to be attached to the sprocket support member 37. In this embodiment, the additional sprocket SP5 to SP12 are configured to be attached to the sprocket support member 37.

As seen in FIG. 6, for example, the additional sprocket is attached to the sprocket support member 37 by adhesive 37A. In this embodiment, the additional sprockets SP5 to SP12 are attached to the sprocket support member 37 by the adhesive 37A. Thus, it is possible to save a weight of the bicycle rear sprocket assembly 14 by reducing or eliminating metallic fasteners. However, at least one of the additional sprockets SP5 to SP12 can be attached to the sprocket support member 37 with another structure (including a metallic fastener) other than the adhesive 37A. At least one of the additional sprockets SP5 to SP12 can be engaged with the sprocket support body 28 without the sprocket support member 37. The sprocket support member 37 can be omitted from the bicycle rear sprocket assembly 14. Further, at least one of the second sprockets SP3 and SP4 can be attached to the sprocket support member 37.

As seen in FIG. 4, the lock member 32 includes a tubular body 32A, a male thread portion 32B, and a radial projection 32C. The tubular body 32A includes a first axial end 32D and a second axial end 32E. The second axial end 32E is opposite to the first axial end 32D in the axial direction D2 with respect to the rotational center axis A1 of the bicycle rear sprocket assembly 14. As seen in FIG. 6, the first axial end 32D is positioned closer to an axial center plane CPL of the bicycle rear hub assembly 12 than the second axial end 32E in a state where the bicycle rear sprocket assembly 14 is mounted to the bicycle rear hub assembly 12. The axial center plane CPL is perpendicular to the rotational center axis A1. As seen in FIG. 3, the axial center plane CPL is defined to bisect an axial length of the bicycle rear hub assembly 12 in the axial direction D2.

As seen in FIG. 6, the male thread portion 32B is provided to the first axial end 32D to engage with a female thread portion 28A of the sprocket support body 28 of the bicycle rear hub assembly 12 in the state where the bicycle rear sprocket assembly 14 is mounted to the bicycle rear hub assembly 12. The radial projection 32C extends radially outwardly from the second axial end 32E with respect to the rotational center axis A1 to restrict an axial movement of the first sprocket SP2 relative to the sprocket support body 28 of the bicycle rear hub assembly 12 in the state where the bicycle rear sprocket assembly 14 is mounted to the bicycle rear hub assembly 12.

The first sprocket SP1 includes a first inward facing side SP and a first outward facing side SP1H. The first outward facing side SP1H is opposite to the first inward facing side SP1G in the axial direction D2. The radial projection 32C is configured to abut against the first sprocket SP1 in the first outward facing side SP1H. The first sprockets SP1 and SP2 are disposed between the radial projection 32C and the second sprocket SP3 in the axial direction. The first sprockets SP1 and SP2, the second sprocket SP3, the second sprocket SP4, and the first ring 39A are held between the radial projection 32C and the sprocket support member 37 in the axial direction D2.

As seen in FIG. 4, the lock member 32 has a tool engagement portion 32F. The tool engagement portion 32F is provided on an inner peripheral surface 32A1 of the tubular body 32A to be engaged with a securing tool (not shown). In this embodiment, the tool engagement portion 32F includes a plurality of engagement grooves 32G to be engaged with the securing tool when the lock member 32 is threadedly attached to the sprocket support body 28 with the male thread portion 32B and the female thread portion 28A.

Figure 20:
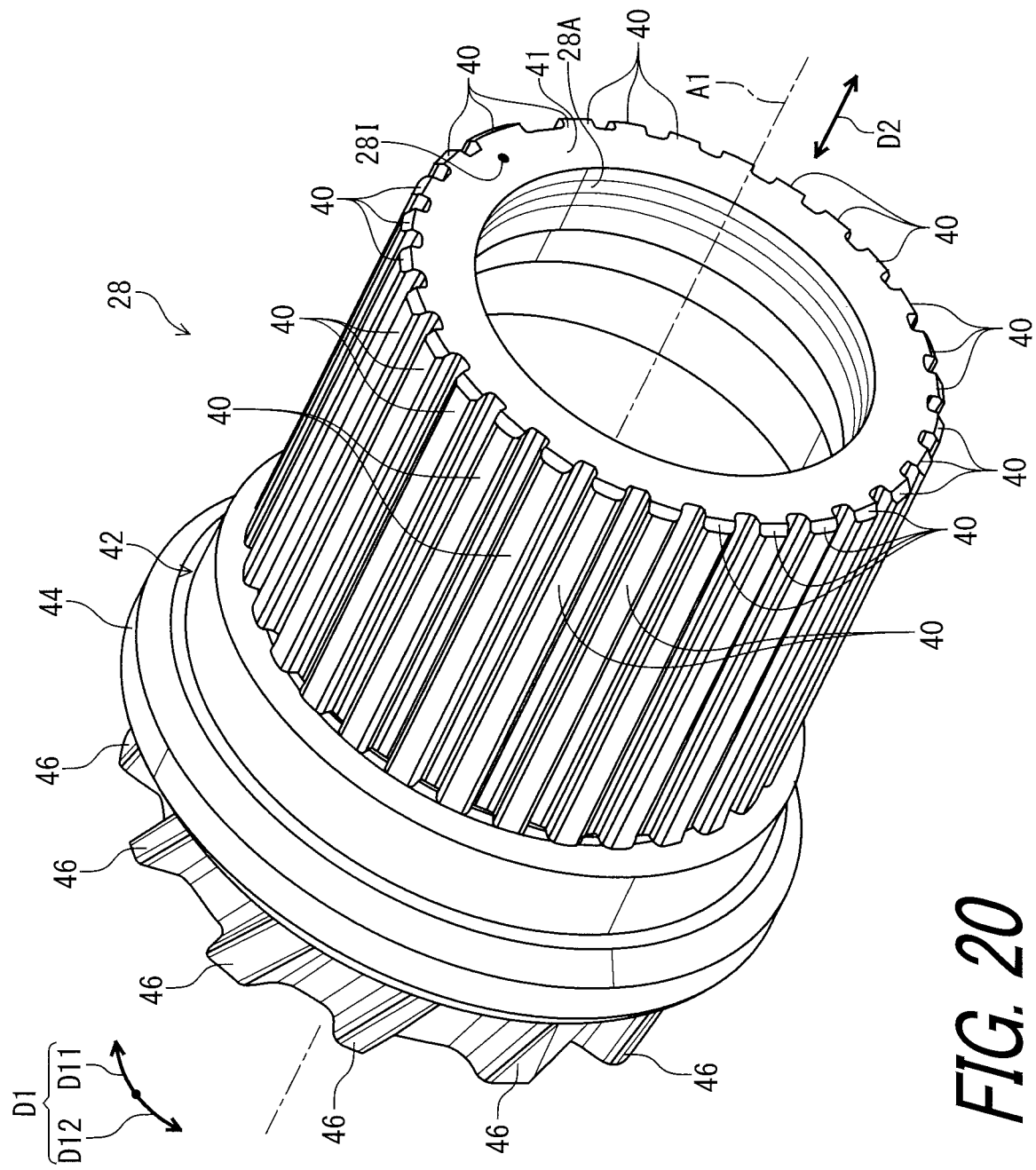
FIG. 20 is a perspective view of a sprocket support body of the bicycle rear hub assembly illustrated in FIG. 4.
Figure 21:
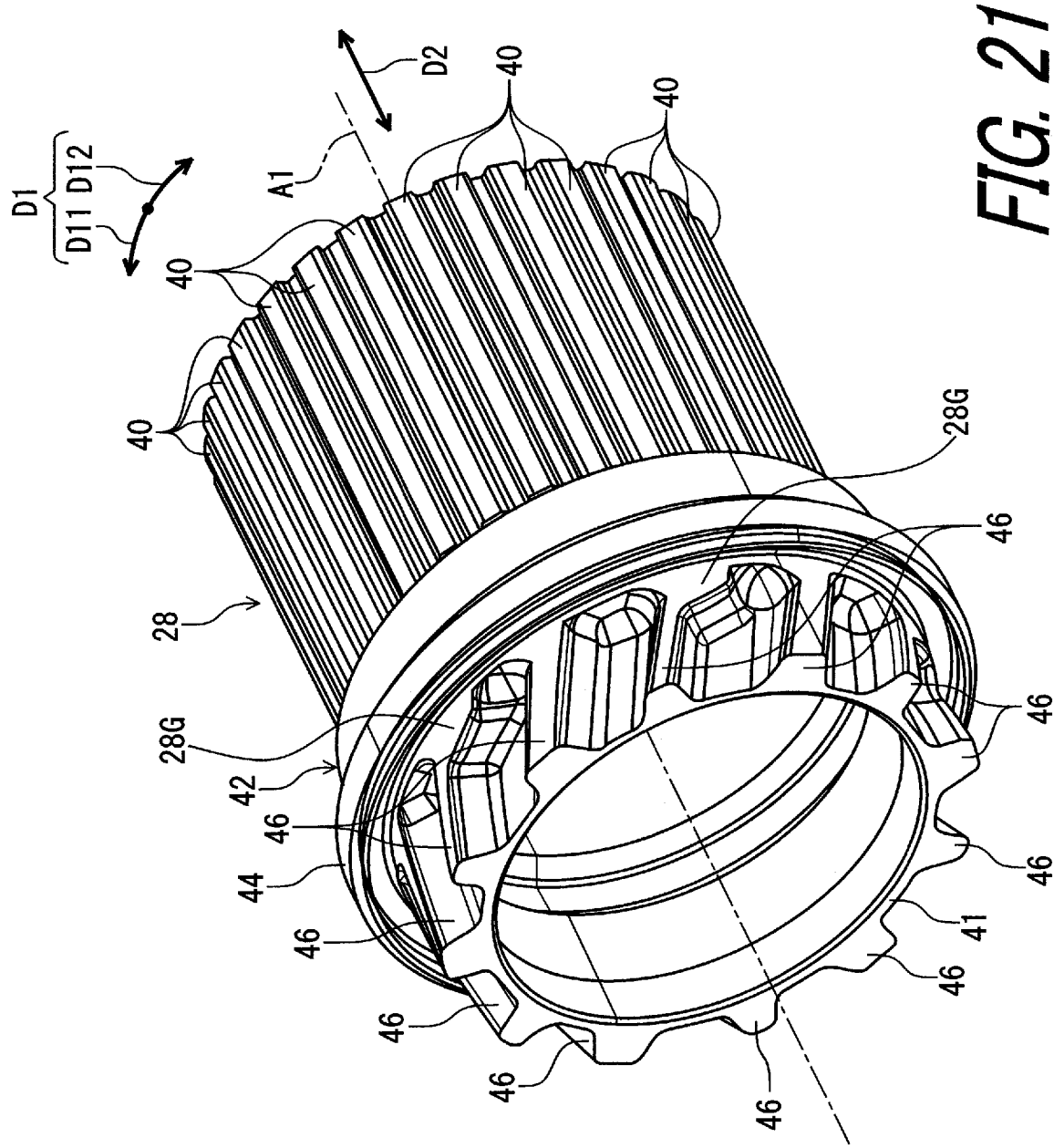
FIG. 21 is another perspective view of the sprocket support body of the bicycle rear hub assembly illustrated in FIG. 4.

As seen in FIGS. 20 and 21, the sprocket support body 28 includes at least one external spline tooth 40 configured to engage with the bicycle rear sprocket assembly 14 (FIG. 6). The sprocket support body 28 includes at least ten external spline teeth 40 configured to engage with the bicycle rear sprocket assembly 14 (FIG. 6). Namely, the at least one external spline tooth 40 includes a plurality of external spline teeth 40.

The sprocket support body 28 includes a base support 41 having a tubular shape. The base support 41 extends along the rotational center axis A1. The external spline tooth 40 extends radially outwardly from the base support 41. The sprocket support body 28 includes a larger-diameter part 42, a flange 44, and a plurality of helical external spline teeth 46. The larger-diameter part 42 and the flange 44 extend radially outwardly from the base support 41. The larger-diameter part 42 is provided between the plurality of external spline teeth 40 and the flange 44 in the axial direction D2. The larger-diameter part 42 and the flange 44 are provided between the plurality of external spline teeth 40 and the plurality of helical external spline teeth 46 in the axial direction D2. As seen in FIG. 6, the bicycle rear sprocket assembly 14 is held between the larger-diameter part 42 and the radial projection 32C of the lock member 32 in the axial direction D2. The larger-diameter part 42 may have an interior cavity so that a drive structure such as a one-way clutch structure can be contained within the interior cavity. The larger-diameter part 42 can be omitted from the bicycle rear hub assembly 12 according to need.

Figure 22:
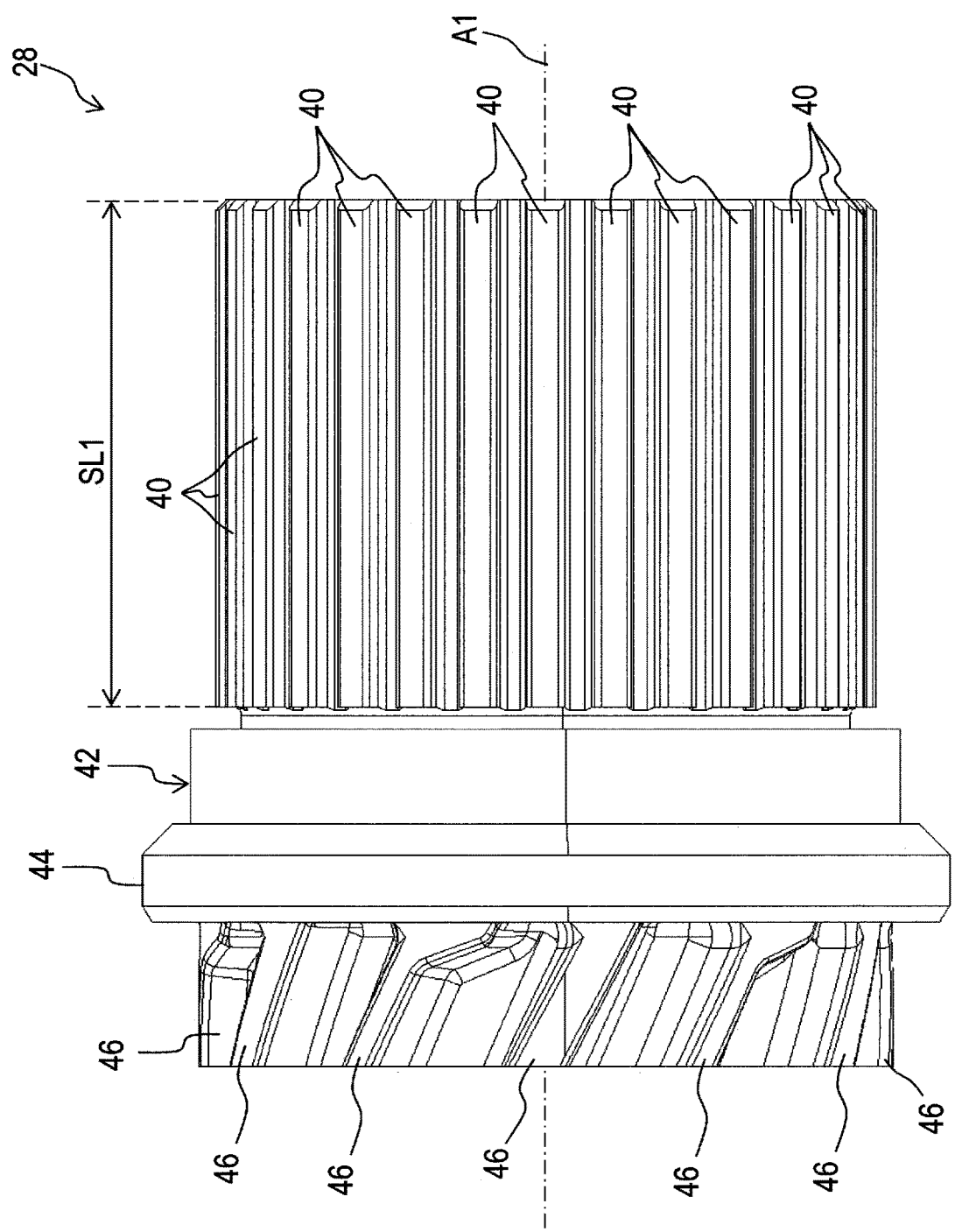
FIG. 22 is a rear view of the sprocket support body of the bicycle rear hub assembly illustrated in FIG. 4.

As seen in FIG. 22, at least one of the at least ten external spline teeth 40 has an axial spline-tooth length SL1. Each of the external spline teeth 40 has the axial spline-tooth length SL1. The axial spline-tooth length SL1 is equal to or smaller than 27 mm. The axial spline-tooth length SL1 is equal to or larger than 22 mm. In this embodiment, the axial spline-tooth length SL1 is 24.9 mm. However, the axial spline-tooth length SL1 is not limited to this embodiment and the above range.

Figure 23:
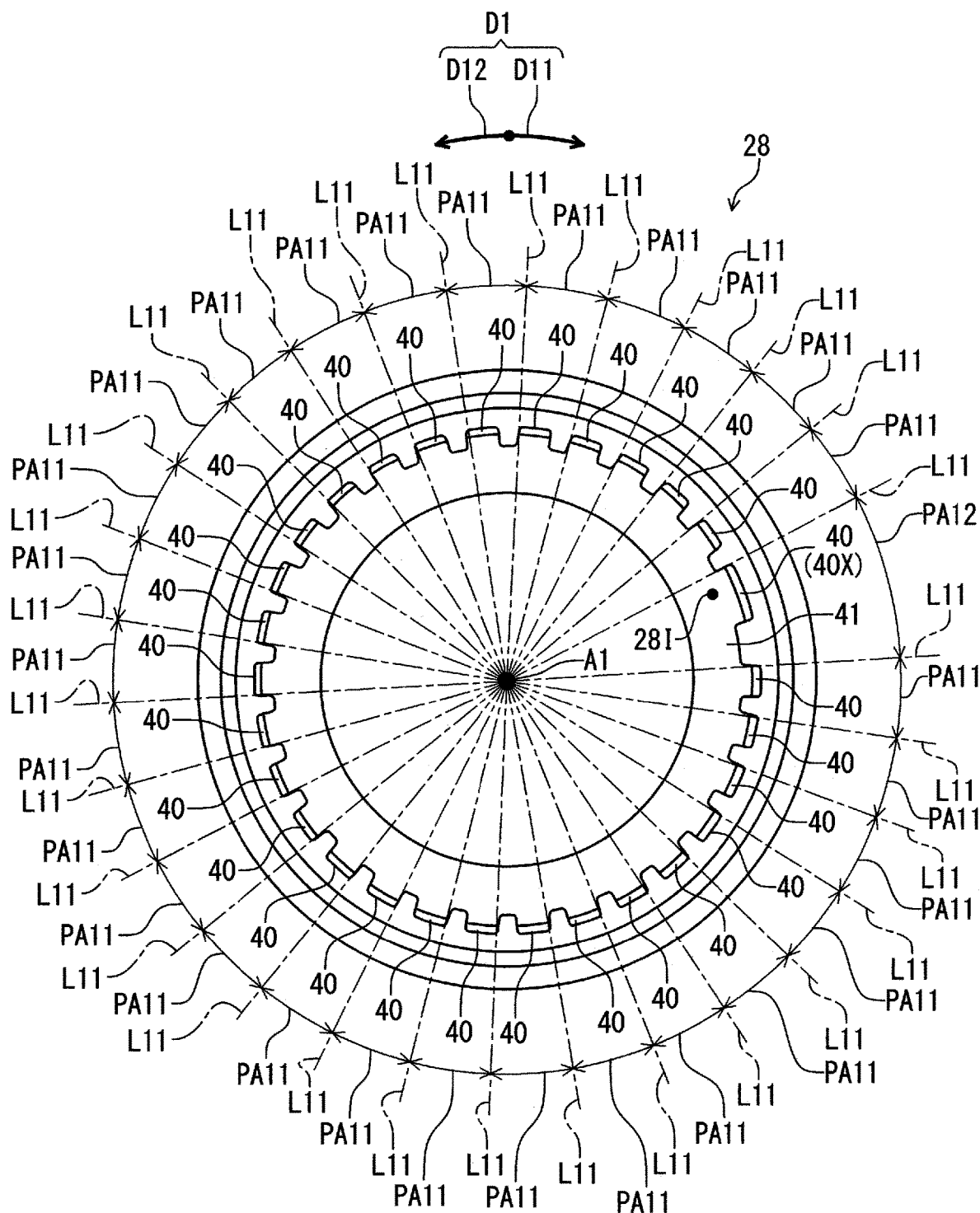
FIG. 23 is a side elevational view of the sprocket support body of the bicycle rear hub assembly illustrated in FIG. 4.

As seen in FIG. 23, a total number of the at least ten external spline teeth 40 is equal to or larger than 20. The total number of the at least ten external spline teeth 40 is preferably equal to or larger than 25. The total number of the at least ten external spline teeth 40 is preferably equal to or larger than 28. The total number of the external spline teeth 40 is preferably equal to or smaller than 72. In this embodiment, the total number of the external spline teeth 40 is 29. However, the total number of the external spline teeth 40 is not limited to this embodiment and the above ranges.

The at least ten external spline teeth 40 have a first external pitch angle PA11 and a second external pitch angle PA12. At least two external spline teeth of the at least ten external spline teeth 40 are circumferentially arranged at the first external pitch angle PA11 with respect to the rotational center axis A1. In other words, at least two of the plurality of external spline teeth 40 are circumferentially arranged at the first external pitch angle PA11 with respect to the rotational center axis A1 of the bicycle rear hub assembly 12. At least two external spline teeth of the at least ten external spline teeth 40 are circumferentially arranged at the second external pitch angle PA12 with respect to the rotational center axis A1 of the bicycle rear hub assembly 12. In other words, at least two of the plurality of external spline teeth 40 are circumferentially arranged at the second external pitch angle PA12 with respect to the rotational center axis A1 of the bicycle rear hub assembly 12. In this embodiment, the second external pitch angle PA12 is different from the first external pitch angle PA11. However, the second external pitch angle PA12 can be substantially equal to the first external pitch angle PA11.

In this embodiment, the external spline teeth 40 are arranged at the first external pitch angle PA11 in the circumferential direction D1. Two external spline teeth of the external spline teeth 40 are arranged at the second external pitch angle PA12 in the circumferential direction D1. However, at least two external spline teeth of the external spline teeth 40 can be arranged at another external pitch angle in the circumferential direction D1.

The first external pitch angle PA11 ranges from 5 degrees to 36 degrees. The first external pitch angle PA11 preferably ranges from 10 degrees to 20 degrees. The first external pitch angle PA11 is preferably equal to or smaller than 15 degrees. In this embodiment, the first external pitch angle PA11 is 12 degrees. However, the first external pitch angle PA11 is not limited to this embodiment and the above ranges.

The second external pitch angle PA12 ranges from 5 degrees to 36 degrees. In this embodiment, the second external pitch angle PA12 is 24 degrees. However, the second external pitch angle PA12 is not limited to this embodiment and the above range.

Figure 24:
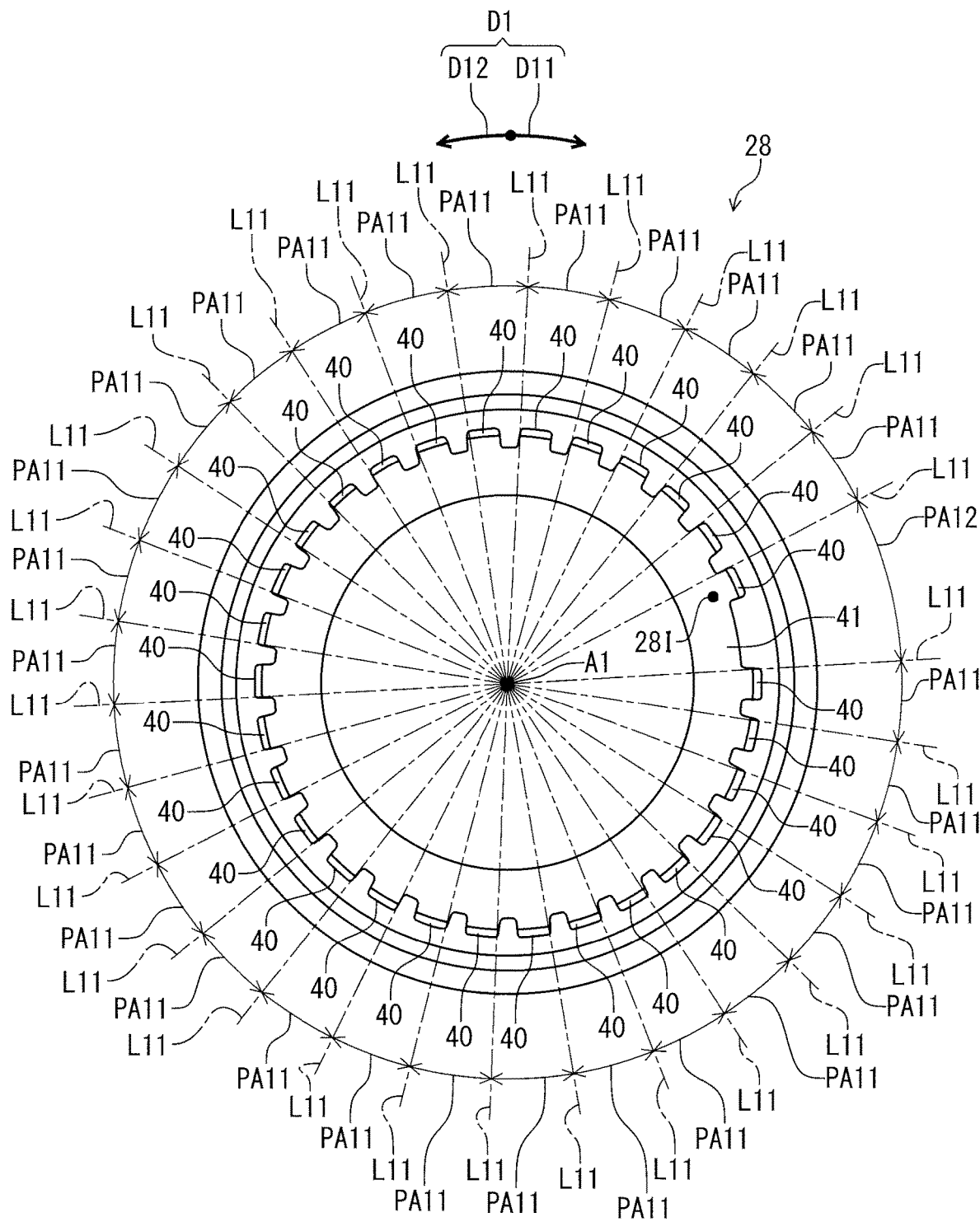
FIG. 24 is a side elevational view of the sprocket support body of the bicycle rear hub assembly in accordance with a modification.

At least one of the external spline teeth 40 can have a first spline shape different from a second spline shape of another of the external spline teeth 40. At least one of the at least ten external spline teeth 40 can have a first spline size different from a second spline size of another of the at least ten external spline teeth 40. At least one of the external spline teeth 40 has a profile different from a profile of another of the external spline teeth 40 when viewed along the rotational center axis A1. In this embodiment, the external spline tooth 40X has the first spline shape different from the second spline shape of another of the external spline teeth 40. The external spline tooth 40X has the first spline size different from the second spline size of another of the external spline teeth 40. As seen in FIG. 24, however, the at least ten external spline teeth 40 can have the same spline shape as each other. The at least ten external spline teeth 40 can have the same spline size as each other. The at least ten external spline teeth 40 can have the same profile as each other.

Figure 25:
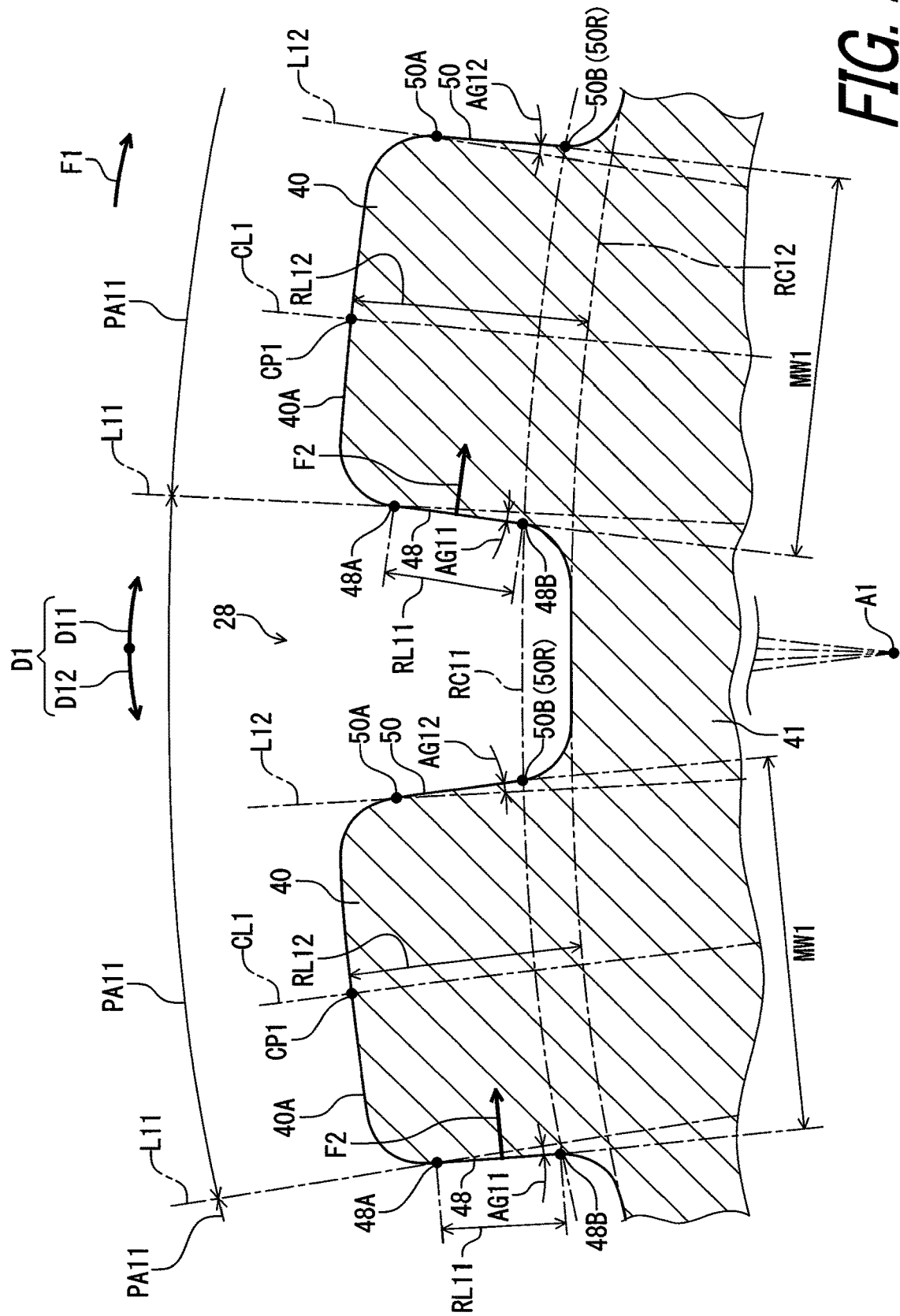
FIG. 25 is an enlarged cross-sectional view of the sprocket support body illustrated in FIG. 23.

As seen in FIG. 25, each of the at least ten external spline teeth 40 has an external-spline driving surface 48 and an external-spline non-driving surface 50. The plurality of external spline teeth 40 includes a plurality of external-spline driving surfaces 48 to receive the driving rotational force F1 from the bicycle rear sprocket assembly 14 (FIG. 6) during pedaling. The plurality of external spline teeth 40 includes a plurality of external-spline non-driving surfaces 50. The external-spline driving surface 48 is contactable with the bicycle rear sprocket assembly 14 to receive the driving rotational force F1 from the bicycle rear sprocket assembly 14 (FIG. 6) during pedaling. The external-spline driving surface 48 faces in the reverse rotational direction D12. The external-spline driving surface 48 faces an internal-spline driving surface 66 of the bicycle rear sprocket assembly 14 in a state where the bicycle rear sprocket assembly 14 is mounted to the bicycle rear hub assembly 12. The external-spline non-driving surface 50 is provided on a reverse side of the external-spline driving surface 48 in the circumferential direction D1. The external-spline non-driving surface 50 faces in the driving rotational direction D11 not to receive the driving rotational force F1 from the bicycle rear sprocket assembly 14 during pedaling. The external-spline non-driving surface 50 faces an internal-spline non-driving surface 68 of the bicycle rear sprocket assembly 14 in a state where the bicycle rear sprocket assembly 14 is mounted to the bicycle rear hub assembly 12.

The at least ten external spline teeth 40 respectively have circumferential maximum widths MW1. The external spline teeth 40 respectively have circumferential maximum widths MW1. The circumferential maximum width MW1 is defined as a maximum width to receive a thrust force F2 applied to the external spline tooth 40. The circumferential maximum width MW1 is defined as a straight distance based on the external-spline driving surface 48.

The plurality of external-spline driving surfaces 48 each includes a radially outermost edge 48A and a radially innermost edge 48B. The external-spline driving surface 48 extends from the radially outermost edge 48A to the radially innermost edge 48B. A first reference circle RC11 is defined on the radially innermost edge 48B and is centered at the rotational center axis A1. The first reference circle RC11 intersects with the external-spline non-driving surface 50 at a reference point 50R. The circumferential maximum width MW1 extends straight from the radially innermost edge 48B to the reference point 50R in the circumferential direction D1.

The plurality of external-spline non-driving surfaces 50 each includes a radially outermost edge 50A and a radially innermost edge 50B. The external-spline non-driving surface 50 extends from the radially outermost edge 50A to the radially innermost edge 50B. In this embodiment, the reference point 50R is coincident with the radially innermost edge 50B. However, the reference point 50R can be offset from the radially innermost edge 50B.

A total of the circumferential maximum widths MW1 is equal to or larger than 55 mm. The total of the circumferential maximum widths MW1 is preferably equal to or larger than 60 mm. The total of the circumferential maximum widths MW1 is preferably equal to or smaller than 70 mm. In this embodiment, the total of the circumferential maximum widths MW1 is 60.1 mm. However, the total of the circumferential maximum widths MW1 is not limited to this embodiment and the above ranges.

Figure 26:
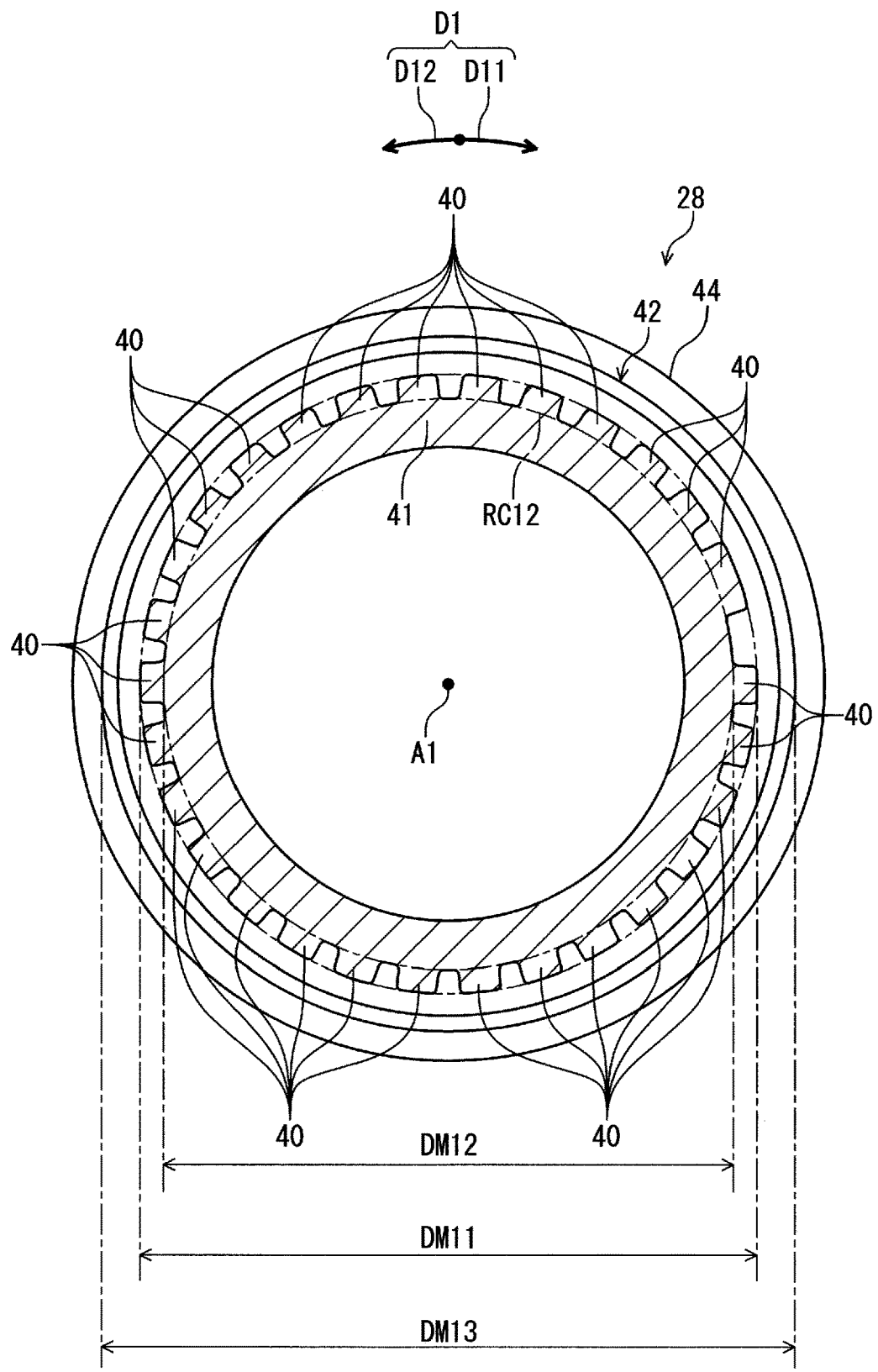
FIG. 26 is a cross-sectional view of the sprocket support body illustrated in FIG. 23.

As seen in FIG. 26, the at least one external spline tooth 40 has an external-spline major diameter DM11 that is equal to or smaller than 34 mm. The external-spline major diameter DM11 is equal to or smaller than 33 mm. The external-spline major diameter DM11 is equal to or larger than 29 mm. In this embodiment, the external-spline major diameter DM11 is 32.6 mm. However, the external-spline major diameter DM11 is not limited to this embodiment and the above ranges.

The at least one external spline tooth 40 has an external-spline minor diameter DM12. The at least one external spline tooth 40 has an external-spline root circle RC12 having the external-spline minor diameter DM12. However, the external-spline root circle RC12 can have another diameter different from the external-spline minor diameter DM12. The external-spline minor diameter DM12 is equal to or smaller than 32 mm. The external-spline minor diameter DM12 is equal to or smaller than 31 mm. The external-spline minor diameter DM12 is equal to or larger than 28 mm. In this embodiment, the external-spline minor diameter DM12 is 30.2 mm. However, the external-spline minor diameter DM12 is not limited to this embodiment and the above ranges.

The larger-diameter part 42 has an outer diameter DM13 larger than the external-spline major diameter DM11. The outer diameter DM13 ranges from 32 mm to 40 mm. In this embodiment, the outer diameter DM13 is 35 mm. However, the outer diameter DM13 is not limited to this embodiment.

As seen in FIG. 25, the plurality of external-spline driving surfaces 48 each includes a radial length RL11 defined from the radially outermost edge 48A to the radially innermost edge 48B. A total of the radial lengths RL11 of the plurality of external-spline driving surfaces 48 is equal to or larger than 7 mm. The total of the radial lengths RL11 is equal to or larger than 10 mm. The total of the radial lengths RL11 is equal to or larger than 15 mm. The total of the radial lengths RL11 is equal to or smaller than 36 mm. In this embodiment, the total of the radial lengths RL11 is 16.6 mm. However, the total of the radial lengths RL11 is not limited to this embodiment.

The plurality of external spline tooth 40 has an additional radial length RL12. The additional radial lengths RL12 are respectively defined from the external-spline root circle RC12 to radially outermost ends 40A of the plurality of external spline teeth 40. A total of the additional radial lengths RL12 is equal to or larger than 20 mm. In this embodiment, the total of the additional radial lengths RL12 is 31.2 mm. However, the total of the additional radial lengths RL12 is not limited to this embodiment.

At least one of the at least ten external spline teeth 40 is circumferentially symmetric with respect to a reference line CL1. The reference line CL1 extends from the rotational center axis A1 to a circumferential center point CP1 of a radially outermost end 40A of the at least one of the at least ten external spline teeth 40 in a radial direction with respect to the rotational center axis A1. However, at least one of the external spline teeth 40 can have an asymmetric shape with respect to the reference line CL1. The at least one of the at least ten external spline teeth 40 comprises the external-spline driving surface 48 and the external-spline non-driving surface 50.

At least one surface of the plurality of external-spline driving surfaces 48 has a first external-spline-surface angle AG11. The first external-spline-surface angle AG11 is defined between the external-spline driving surface 48 and a first radial line L11. The first radial line L11 extends from the rotational center axis A1 of the bicycle rear hub assembly 12 to the radially outermost edge 48A of the external-spline driving surface 48. The first external pitch angle PA11 or the second external pitch angle PA12 is defined between the adjacent first radial lines L11 (see, e.g., FIG. 23).

At least one of the external-spline non-driving surfaces 50 has a second external-spline-surface angle AG12. The second external-spline-surface angle AG12 is defined between the external-spline non-driving surface 50 and a second radial line L12. The second radial line L12 extends from the rotational center axis A1 of the bicycle rear hub assembly 12 to the radially outermost edge 50A of the external-spline non-driving surface 50.

In this embodiment, the second external-spline-surface angle AG12 is equal to the first external-spline-surface angle AG11. However, the first external-spline-surface angle AG11 can be different from the second external-spline-surface angle AG12.

The first external-spline-surface angle AG11 is equal to or smaller than 6 degrees. The first external-spline-surface angle AG11 is equal to or larger than 0 degree. The second external-spline-surface angle AG12 is equal to or smaller than 6 degrees. The second external-spline-surface angle AG12 is equal to or larger than 0 degree. In this embodiment, the first external-spline-surface angle AG11 is 5 degrees. The second external-spline-surface angle AG12 is 5 degrees. However, the first external-spline-surface angle AG11 and the second external-spline-surface angle AG12 are not limited to this embodiment and the above ranges.

Figure 27:
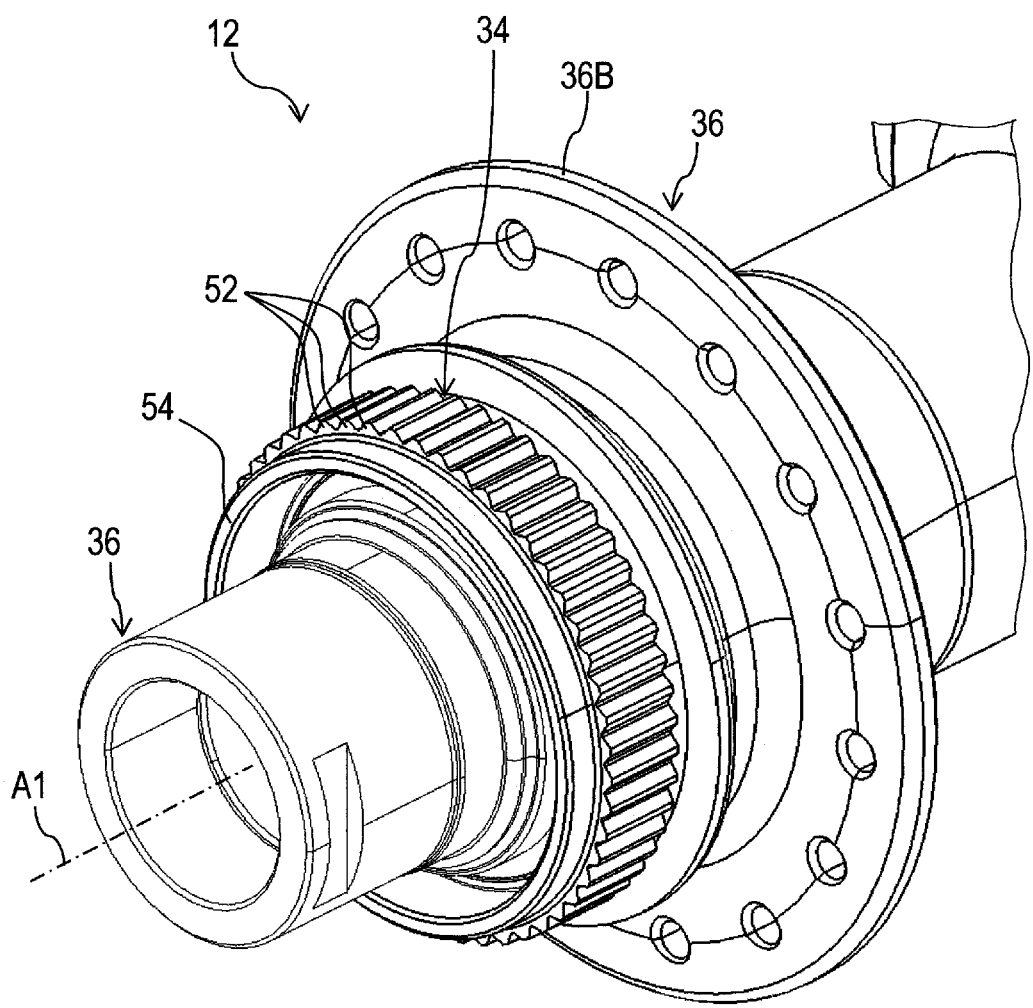
FIG. 27 is a perspective view of the bicycle rear hub assembly illustrated in FIG. 4.
Figure 28:
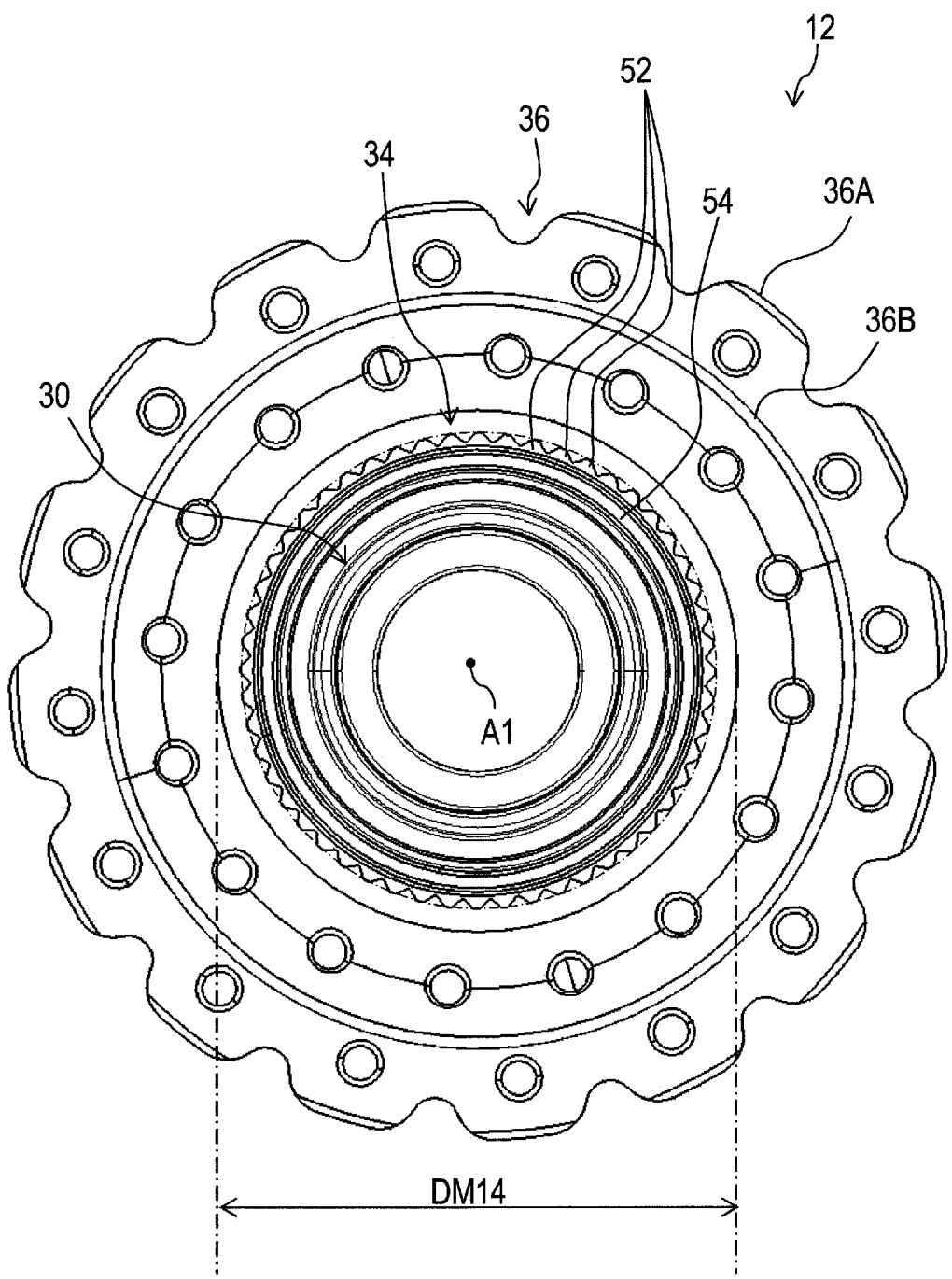
FIG. 28 is a side elevational view of the bicycle rear hub assembly illustrated in FIG. 4.

As seen in FIGS. 27 and 28, the brake-rotor support body 34 includes at least one additional external spline tooth 52 configured to engage with the bicycle brake rotor 16 (FIG. 1). In this embodiment, the brake-rotor support body 34 includes an additional base support 54 and a plurality of additional external spline teeth 52. The additional base support 54 has a tubular shape and extends from the hub body 36 along the rotational center axis A1. The additional external spline tooth 52 extends radially outwardly from additional base support 54. A total number of the additional external spline teeth 52 is 52. However, the total number of the additional external spline teeth 52 is not limited to this embodiment.

Figure 29:
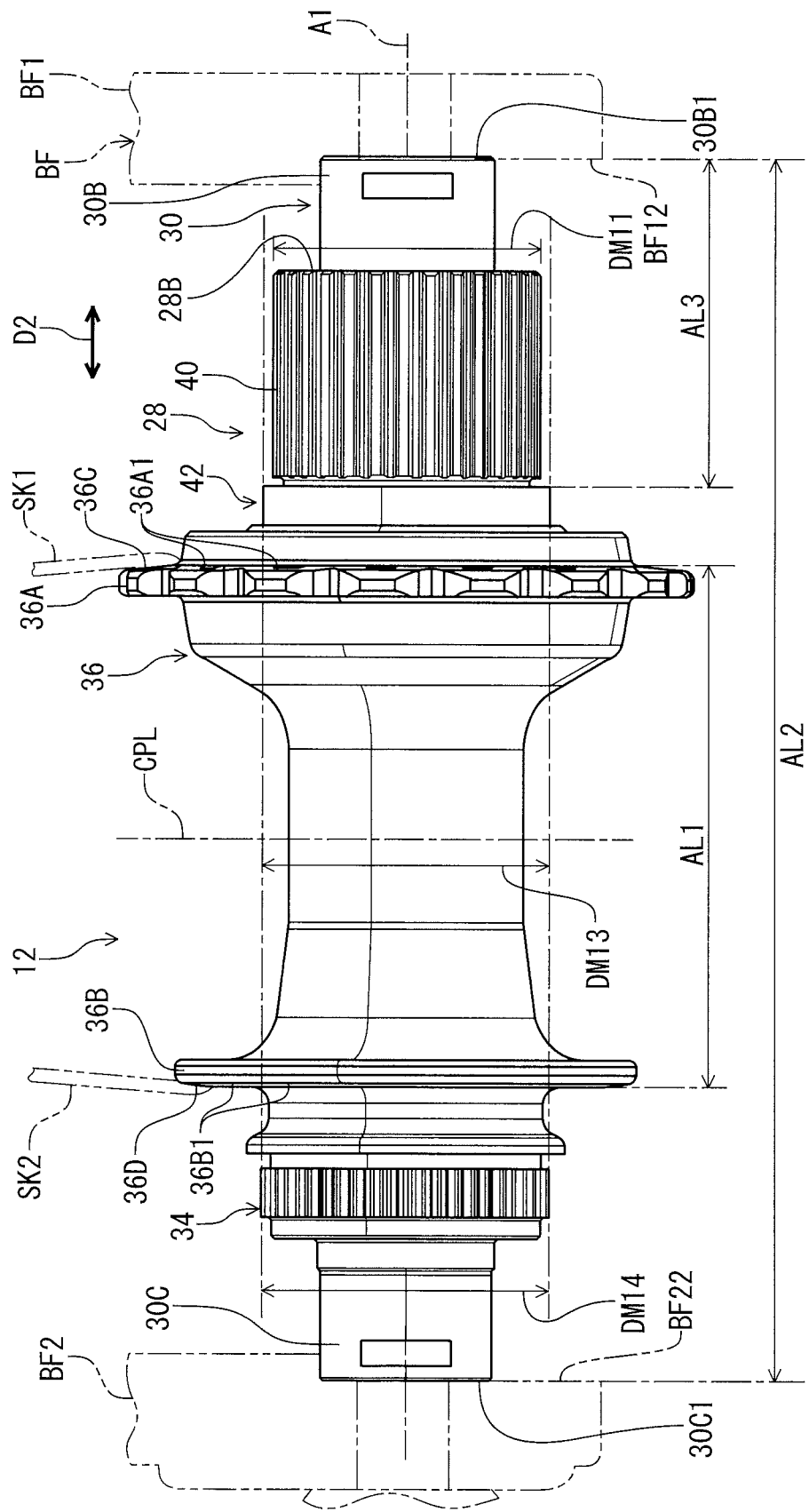
FIG. 29 is a rear view of the bicycle rear hub assembly illustrated in FIG. 4.

As seen in FIG. 28, the at least one additional external spline tooth 52 has an additional external-spline major diameter DM14. As seen in FIG. 29, the additional external-spline major diameter DM14 is larger than the external-spline major diameter DM11. The additional external-spline major diameter DM14 is substantially equal to the outer diameter DM13 of the larger-diameter part 42. However, the additional external-spline major diameter DM14 can be equal to or smaller than the external-spline major diameter DM11. The additional external-spline major diameter DM14 can be different from the outer diameter DM13 of the larger-diameter part 42.

As seen in FIG. 29, the hub body 36 includes a first spoke-mounting portion 36A and a second spoke-mounting portion 36B. A plurality of first spokes SK1 are coupled to the first spoke-mounting portion 36A. A plurality of second spokes SK2 are coupled to the second spoke-mounting portion 36B. In this embodiment, the first spoke-mounting portion 36A includes a plurality of first attachment holes 36A1. The first spoke SK1 extends through the first attachment hole 36A1. The second spoke-mounting portion 36B includes a plurality of second attachment holes 36B1. The second spoke SK2 extends through the second attachment hole 36B1. The term "spoke-mounting portion", as used herein, encompasses configurations in which the spoke-mounting opening has a flange-like shape so that the spoke mounting portion extends radially outwardly with respect to the rotational center axis of the bicycle rear hub assembly as seen in FIG. 29, and configurations in which the spoke mounting portion is an opening directly formed on a radially outer peripheral surface of the hub body.

The second spoke-mounting portion 36B is spaced apart from the first spoke-mounting portion 36A in the axial direction D2. The first spoke-mounting portion 36A is provided between the sprocket support body 28 and the second spoke-mounting portion 36B in the axial direction D2. The second spoke-mounting portion 36B is provided between the first spoke-mounting portion 36A and the brake-rotor support body 34 in the axial direction D2.

The first spoke-mounting portion 36A has a first axially outermost part 36C. The second spoke-mounting portion 36B has a second axially outermost part 36D. The first axially outermost part 36C includes a surface facing toward the first frame BF1 in the axial direction D2 in a state where the bicycle rear hub assembly 12 is mounted to the bicycle frame BF. The second axially outermost part 36D includes a surface facing toward the second frame BF2 in the axial direction D2 in a state where the bicycle rear hub assembly 12 is mounted to the bicycle frame BF.

The hub body 36 includes a first axial length AL1. The first axial length AL1 is defined between the first axially outermost part 36C of the first spoke-mounting portion 36A and the second axially outermost part 36D of the second spoke-mounting portion 36B in the axial direction D2 with respect to the rotational center axis A1 of the bicycle rear sprocket assembly 14. The first axial length AL1 can be equal to or larger than 55 mm. The first axial length AL1 can be equal to or larger than 60 mm. The first axial length AL1 can be equal to or larger than 65 mm. In this embodiment, the first axial length AL1 can be 67 mm. However, the first axial length AL1 is not limited to this embodiment and the above ranges. Examples of the first axial length AL1 include 55.7 mm, 62.3 mm, and 67 mm.

As seen in FIG. 29, the hub axle 30 includes a first axial frame abutment surface 30B1 and a second axial frame abutment surface 30C1. The first axial frame abutment surface 30B1 is configured to abut against a first part BF12 of the bicycle frame BF in the axial direction D2 with respect to the rotational center axis A1 of the bicycle rear sprocket assembly 14 in a state where the bicycle rear hub assembly 12 is mounted to the bicycle frame BF. The second axial frame abutment surface 30C1 is configured to abut against a second part BF22 of the bicycle frame BF in the axial direction D2 in the state where the bicycle rear hub assembly 12 is mounted to the bicycle frame BF. The first axial frame abutment surface 30B1 is positioned closer to the sprocket support body 28 than the second axial frame abutment surface 30C1 in the axial direction D2. The sprocket support body 28 is provided between the first axial frame abutment surface 30B1 and the second axial frame abutment surface 30C1 in the axial direction D2.

The hub axle 30 includes a second axial length AL2 defined between the first axial frame abutment surface 30B1 and the second axial frame abutment surface 30C1 in the axial direction D2. The second axial length AL2 can be equal to or larger than 140 mm. The second axial length AL2 can be equal to or larger than 145 mm. The second axial length AL2 can be equal to or larger than 147 mm. The second axial length AL2 can be 148 mm. However, the second axial length AL2 is not limited to this embodiment and the above ranges. Examples of the second axial length AL2 include 142 mm, 148 mm, and 157 mm.

A ratio of the first axial length AL1 to the second axial length AL2 can be equal to or larger than 0.3. The ratio of the first axial length AL1 to the second axial length AL2 can be equal to or larger than 0.4. The ratio of the first axial length AL1 to the second axial length AL2 can be equal to or smaller than 0.5. For example, the ratio of the first axial length AL1 (67 mm) to the second axial length AL2 (148 mm) is approximately 0.45. However, the ratio of first axial length AL1 to the second axial length AL2 is not limited to this embodiment and the above ranges. Examples of the ratio of the first axial length AL1 to the second axial length AL2 include approximately 0.42 (AL1 is 62.3 mm and AL2 is 148 mm), or include approximately 0.39 (AL1 is 55.7 mm and AL2 is 142 mm).

As seen in FIG. 6, the sprocket support body 28 includes a first axial end 28B, a second axial end 28C, and an axially sprocket abutment surface 28D. The second axial end 28C is opposite to the first axial end 28B in the axial direction D2. The axial center plane CPL bisects the second axial length AL2 in the axial direction D2. The axially sprocket abutment surface 28D is positioned closer to the axial center plane CPL of the bicycle rear hub assembly 12 than the first axial end 28B in the axial direction D2. The second axial end 28C is positioned closer to the axial center plane CPL of the bicycle rear hub assembly 12 than axially sprocket abutment surface 28D in the axial direction D2. The axially sprocket abutment surface 28D is provided on the larger-diameter part 42 in this embodiment whereas the axially sprocket abutment surface 28D can be provided on other parts of the bicycle rear hub assembly 12 according to need. The axially sprocket abutment surface 28D is in contact with the bicycle rear sprocket assembly 14 in a state where the bicycle rear sprocket assembly 14 is mounted on the sprocket support body 28. The axially sprocket abutment surface 28D faces the first axial end 28B in the axial direction D2.

As seen in FIG. 6, a sprocket-arranging axial length AL3 is defined between the first axial frame abutment surface 30B1 and the axially sprocket abutment surface 28D of the sprocket support body 28 in the axial direction D2. In this embodiment, the sprocket-arranging axial length AL3 ranges from 35 mm to 45 mm. For example, the sprocket-arranging axial length AL3 is 39.64 mm. The sprocket-arranging axial length AL3 can also be extended up to 44.25 mm, for example, by omitting the larger-diameter part 42. However, the sprocket-arranging axial length AL3 is not limited to this embodiment and the above range.

The larger-diameter part 42 has an axial end 42A which is the farthest from the first axial frame abutment surface 30B1 in the axial direction D2. An additional axial length AL4 is defined from the first axial frame abutment surface 30B1 to the axial end 42A in the axial direction D2. The additional axial length AL4 ranges from 38 mm to 47 mm. The additional axial length AL4 can range from 44 mm to 45 mm. The additional axial length AL4 can also range from 40 mm to 41 mm. In this embodiment, the additional axial length AL4 is 44.25 mm. However, the additional axial length AL4 is not limited to this embodiment and the above ranges.

A larger-diameter axial length AL5 of the larger-diameter part 42 ranges from 3 mm to 6 mm. In this embodiment, the larger-diameter axial length AL5 is 4.61 mm. However, the larger-diameter axial length AL5 is not limited to this embodiment and the above ranges.

A ratio of the first axial length AL1 to the sprocket-arranging axial length AL3 ranges from 1.2 to 1.7. For example, the ratio of the first axial length AL1 to the sprocket-arranging axial length AL3 is 1.4 if the first axial length AL1 is 55.7 mm and the sprocket-arranging axial length AL3 is 39.64 mm. However, the ratio of the first axial length AL1 to the sprocket-arranging axial length AL3 is not limited to this embodiment and the above range. For example, the ratio of the first axial length AL1 to the sprocket-arranging axial length AL3 can be 1.57 if the first axial length AL1 is 62.3 mm and the sprocket-arranging axial length AL3 is 39.64 mm, or the ratio of the first axial length AL1 to the sprocket-arranging axial length AL3 can be 1.69 if the first axial length AL1 is 67 mm and the sprocket-arranging axial length AL3 is 39.64 mm.

Figure 30:
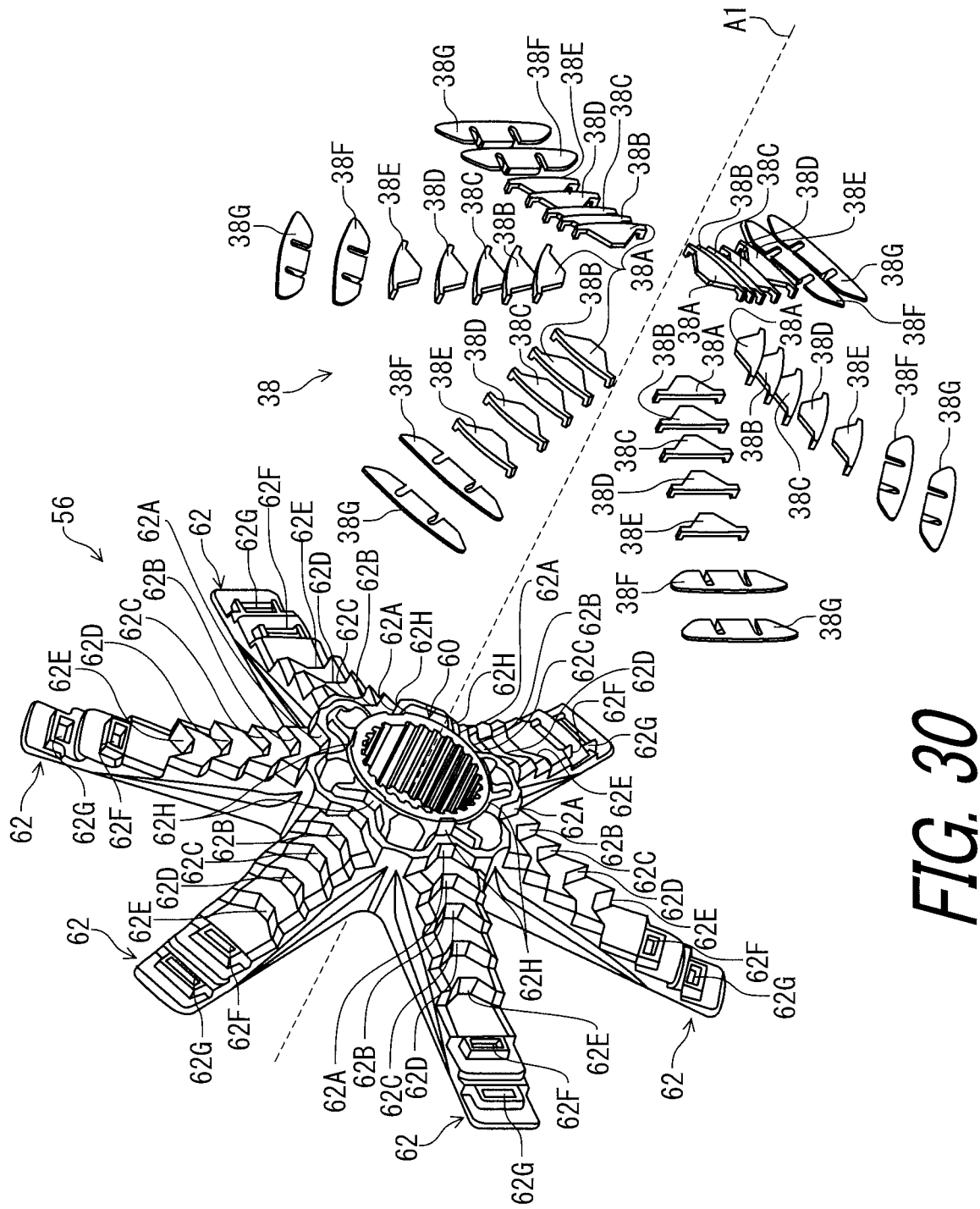
FIG. 30 is an exploded perspective view of a sprocket support body and a plurality of spacers of the bicycle rear hub assembly illustrated in FIG. 4.

As seen in FIG. 30, the sprocket support member 37 includes a hub engagement part 60 and a plurality of support arms 62. The plurality of support arms 62 extends radially outwardly from the hub engagement part 60. The support arm 62 includes first to eighth attachment parts 62A to 62H. The plurality of spacers 38 includes a plurality of first spacers 38A, a plurality of second spacers 38B, a plurality of third spacers 38C, a plurality of fourth spacers 38D, a plurality of fifth spacers 38E, a plurality of sixth spacers 38F, and a plurality of seventh spacers 38G.

As seen in FIG. 6, the first spacers 38A are provided between the additional sprockets SP5 and SP6. The second spacers 38B are provided between the additional sprockets SP6 and SP7. The third spacers 38C are provided between the additional sprockets SP7 and SP8. The fourth spacers 38D are provided between the additional sprockets SP8 and SP9. The fifth spacers 38E are provided between the additional sprockets SP9 and SP10. The sixth spacers 38F are provided between the additional sprockets SP10 and SP11. The seventh spacers 38G are provided between the additional sprockets SP11 and SP12.

The additional sprocket SP6 and the first spacer 38A are attached to the first attachment part 62A with the adhesive 37A. The additional sprocket SP7 and the second spacer 38B are attached to the second attachment part 62B with the adhesive 37A. The additional sprocket SP8 and the third spacer 38C are attached to the third attachment part 62C with the adhesive 37A. The additional sprocket SP9 and the fourth spacer 38D are attached to the fourth attachment part 62D with the adhesive 37A. The additional sprocket SP10 and the fifth spacer 38E are attached to the fifth attachment part 62E with the adhesive 37A. The additional sprocket SP11 and the sixth spacer 38F are attached to the sixth attachment part 62F with the adhesive 37A. The additional sprocket SP12 and the seventh spacer 38G are attached to the seventh attachment part 62G with the adhesive 37A. The additional sprocket SP5 and the second ring 39B are attached to the eighth attachment part 62H with the adhesive 37A. The hub engagement part 60, the sprockets SP1 to SP4, the first ring 39A, and the second ring 39B are held between the larger-diameter part 42 and the radial projection 32C of the lock member 32 in the axial direction D2.

In this embodiment, each of the sprockets SP1 to SP12 is made of a metallic material such as aluminum, iron, or titanium. The sprocket support member 37 is made of a non-metallic material including a resin material. Each of the first to seventh spacers 38A and to 38G, the first ring 39A, and the second ring 39B is made of a non-metallic material such as a resin material. However, at least one of the sprockets SP1 to SP12 can be at least partly made of a non-metallic material. At least one of the sprocket support member 37, the first to seventh spacers 38A and to 38G, the first ring 39A, and the second ring 39B can be at least partly made of a metallic material such as aluminum, iron, or titanium.

Figure 31:
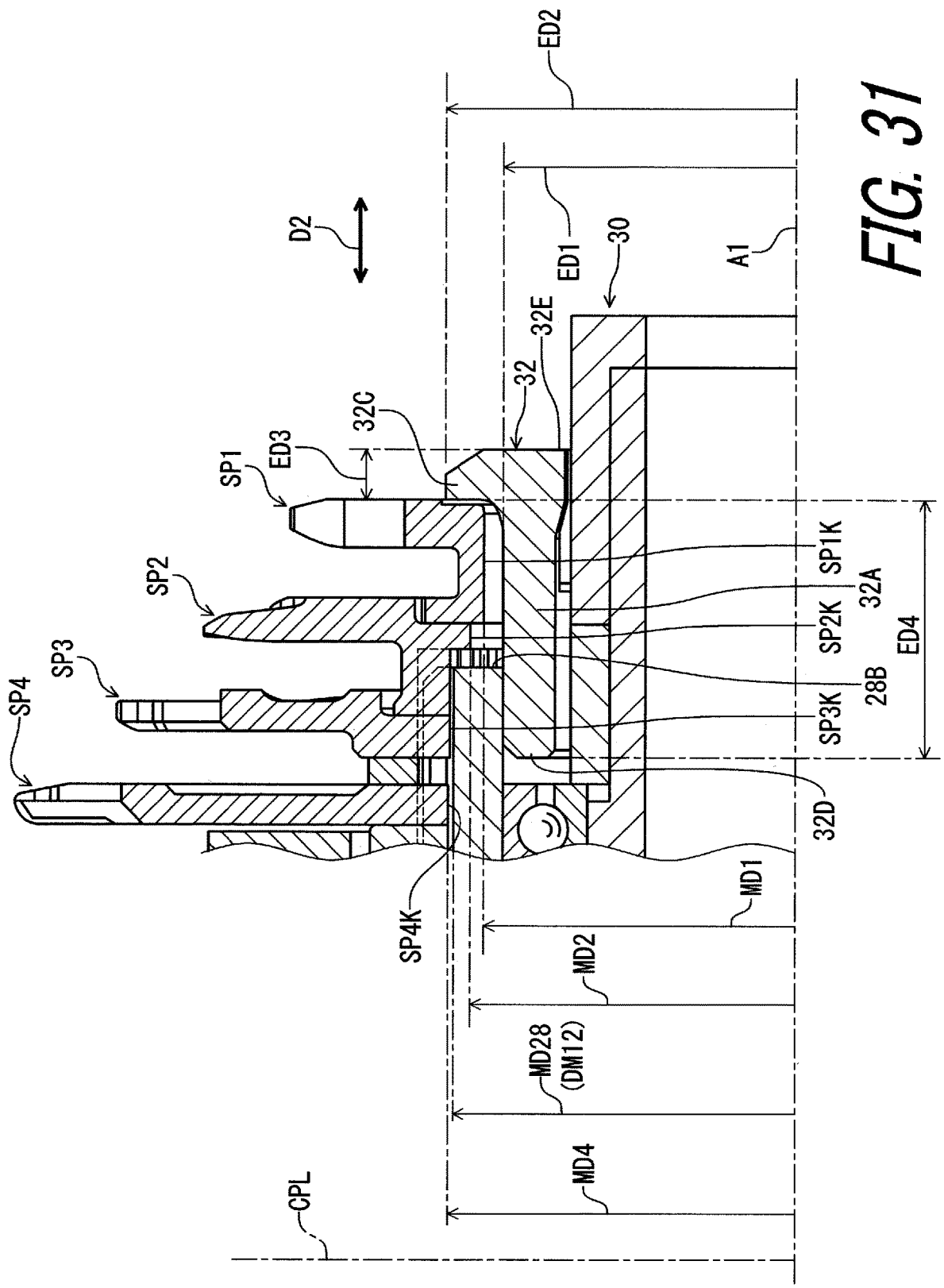
FIG. 31 is a partial enlarged cross-sectional view of the bicycle drive train illustrated in FIG. 4.

As seen in FIG. 7, the first sprocket SP1 includes a first opening SP1K. The first opening SP1K has a first minimum diameter MD1. As seen in FIG. 31, the tubular body 32A of the lock member 32 extends through the first opening SP1K of the first sprocket SP1 in the state where the bicycle rear sprocket assembly 14 is mounted to the sprocket support body 28. The first opening SP1K of the first sprocket SP1 is configured so that the first axial end 32D of the tubular body 32A of the lock member 32 passes through the first opening SP1K of the first sprocket SP1 in the state where the bicycle rear sprocket assembly 14 is mounted to the sprocket support body 28. The first axial end 28B of the sprocket support body 28 is spaced apart from the first opening SP1K of the first sprocket SP1 without extending through the first opening SP1K. The first minimum diameter MD1 is smaller than a minimum outer diameter MD28 of the sprocket support body 28 of the bicycle rear hub assembly 12. In this embodiment, the minimum outer diameter MD28 is equal to the external-spline minor diameter DM12 (FIG. 26) of the plurality of external spline teeth 40 of the sprocket support body 28.

As seen in FIG. 31, the tubular body 32A has a first external diameter ED1 that is equal to or smaller than 27 mm. The first external diameter ED1 is equal to or larger than 26 mm. The radial projection 32C has a second external diameter ED2 that is equal to or smaller than 32 mm. The second external diameter ED2 is equal to or larger than 30 mm. In this embodiment, the first external diameter ED1 is 26.2 mm. The second external diameter ED2 is 30.8 mm. However, at least one of the first external diameter ED1 and the second external diameter ED2 is not limited to this embodiment and the above ranges.

The radial projection 32C has an axial width ED3 defined in the axial direction D2. For example, the axial width ED3 of the radial projection 32C is 2 mm. However, the axial width ED3 is not limited to this embodiment.

The lock member 32 has an axial length ED4 defined from the radial projection 32C to the first axial end 32D in the axial direction D2. The axial length ED4 of the lock member 32 is 10 mm. However, the axial length ED4 is not limited to this embodiment.

As seen in FIG. 8, the first sprocket SP2 includes a first opening SP2K. Namely, the plurality of first sprockets SP1 and SP2 each includes the first opening. The first opening SP2K has a first minimum diameter MD2. As seen in FIG. 31, the tubular body 32A of the lock member 32 extends through the first opening SP2K of the first sprocket SP2 in the state where the bicycle rear sprocket assembly 14 is mounted to the sprocket support body 28. The first axial end 28B of the sprocket support body 28 is spaced apart from the first opening SP2K of the first sprocket SP2 without extending through the first opening SP2K. The first minimum diameter MD2 is smaller than the minimum outer diameter MD28 of the sprocket support body 28 of the bicycle rear hub assembly 12.

As seen in FIG. 9, the second sprocket SP3 includes a second opening SP3K. The second opening SP3K has a second minimum diameter MD3. As seen in FIG. 31, the tubular body 32A of the lock member 32 and the sprocket support body 28 extend through the second opening SP3K of the second sprocket SP3 in the state where the bicycle rear sprocket assembly 14 is mounted to the sprocket support body 28. The first axial end 28B of the sprocket support body 28 is provided between the second opening SP3K and the first opening SP1K in the axial direction D2. The first axial end 28B of the sprocket support body 28 is provided between the second opening SP3K and the first opening SP2K in the axial direction D2. The second minimum diameter MD3 is equal to or larger than the minimum outer diameter MD28 of the sprocket support body 28 of the bicycle rear hub assembly 12.

As seen in FIG. 10, the second sprocket SP4 includes a second opening SP4K. Namely, the plurality of second sprockets SP3 and SP4 each includes the second opening. The second opening SP4K has a second minimum diameter MD4. As seen in FIG. 31, the sprocket support body 28 extend through the second opening SP4K of the second sprocket SP4 in the state where the bicycle rear sprocket assembly 14 is mounted to the sprocket support body 28. The first axial end 28B of the sprocket support body 28 is provided between the second opening SP4K and the first opening SP1K in the axial direction D2. The second minimum diameter MD4 is equal to or larger than the minimum outer diameter MD28 of the sprocket support body 28 of the bicycle rear hub assembly 12.

Figure 32:
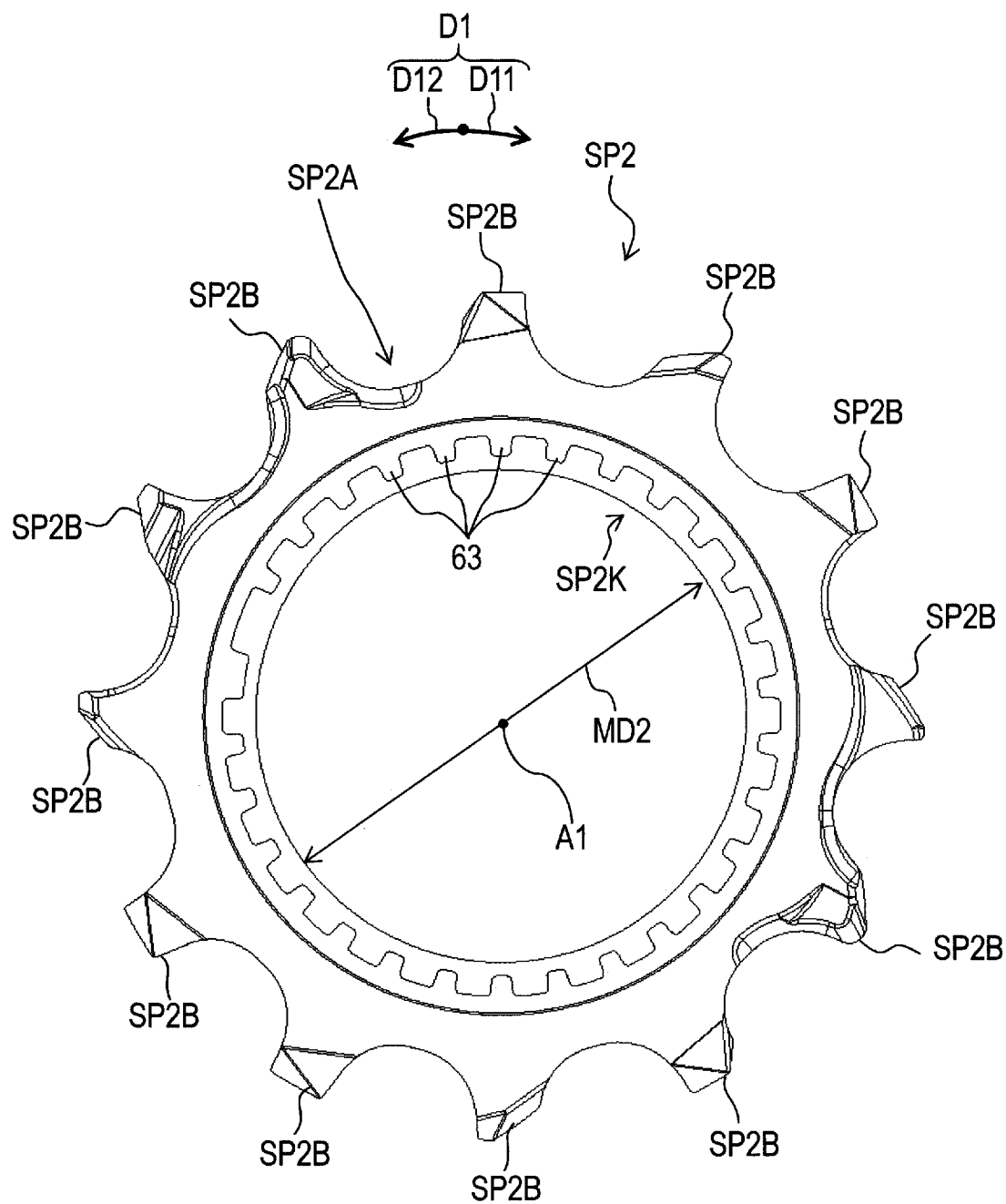
FIG. 32 is another side elevational view of the sprocket illustrated in FIG. 8.

As seen in FIG. 32, the first sprocket SP2 includes at least ten internal spline teeth 63 configured to engage with the sprocket support body 28 of the bicycle rear hub assembly 12. The at least ten internal spline teeth 63 is provided to the first opening SP2K. The at least ten internal spline teeth 63 is provided as a first torque-transmitting structure of the first sprocket SP2 as described later.

A total number of the at least ten internal spline teeth 63 of the first sprocket SP2 is equal to or larger than 20. The total number of the at least ten internal spline teeth 63 of the first sprocket SP2 is equal to or larger than 28. The total number of the internal spline teeth 63 is equal to or smaller than 72. In this embodiment, the total number of the internal spline teeth 63 is 29. However, the total number of the internal spline teeth 63 is not limited to this embodiment and the above ranges.

As seen in FIG. 9, the second sprocket SP3 includes at least ten internal spline teeth 64 configured to engage with the sprocket support body 28 of the bicycle rear hub assembly 12. In this embodiment, the at least ten internal spline teeth 64 of the second sprocket SP3 define the second minimum diameter MD3 as an internal-spline minor diameter of the at least ten internal spline teeth 64.

A total number of the at least ten internal spline teeth 64 of the second sprocket SP3 is equal to or larger than 20. The total number of the at least ten internal spline teeth 64 of the second sprocket SP3 is equal to or larger than 28. The total number of the internal spline teeth 64 is equal to or smaller than 72. In this embodiment, the total number of the internal spline teeth 64 is 29. However, the total number of the internal spline teeth 64 is not limited to this embodiment and the above ranges.

As seen in FIG. 10, the second sprocket SP4 includes at least ten internal spline teeth 65 configured to engage with the sprocket support body 28 of the bicycle rear hub assembly 12. Namely, the plurality of second sprockets SP3 and SP4 each includes the at least ten internal spline teeth configured to engage with the sprocket support body 28 of the bicycle rear hub assembly 12. In this embodiment, the at least ten internal spline teeth 65 of the second sprocket SP4 define the second minimum diameter MD4 as an internal-spline minor diameter of the at least ten internal spline teeth 65.

A total number of the at least ten internal spline teeth 65 of the second sprocket SP4 is equal to or larger than 20. The total number of the at least ten internal spline teeth 65 of the second sprocket SP4 is equal to or larger than 28. The total number of the internal spline teeth 65 is equal to or smaller than 72. In this embodiment, the total number of the internal spline teeth 65 is 29. However, the total number of the internal spline teeth 65 is not limited to this embodiment and the above ranges.

Figure 33:
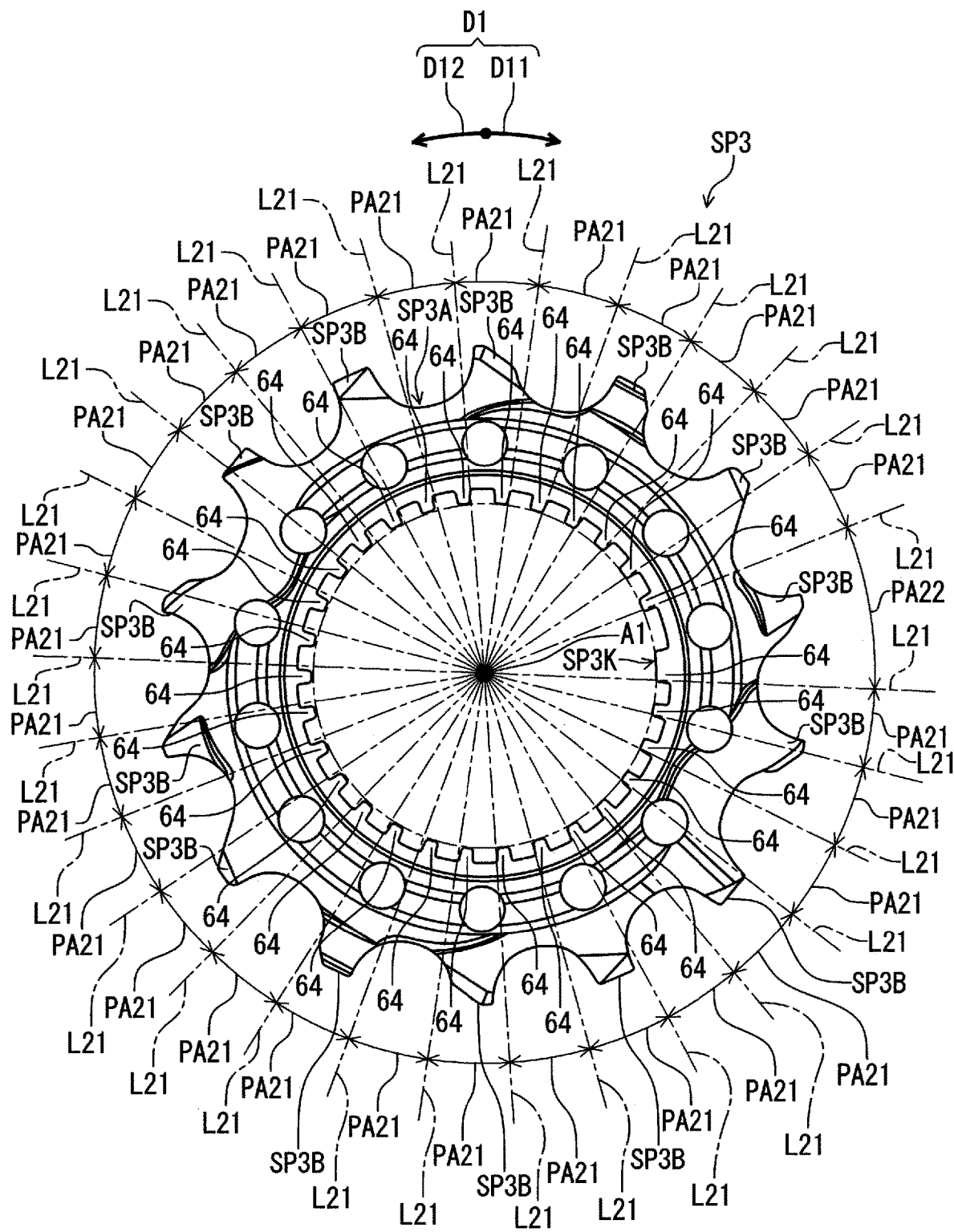
FIG. 33 is a side elevational view of the sprocket illustrated in FIG. 9.

As seen in FIG. 33, the at least ten internal spline teeth 64 of the second sprocket SP3 have a first internal pitch angle PA21 and a second internal pitch angle PA22. At least two internal spline teeth of the at least ten internal spline teeth 64 of the second sprocket SP3 are circumferentially arranged at the first internal pitch angle PA21 with respect to the rotational center axis A1 of the bicycle rear sprocket assembly 14. The at least two internal spline teeth of the at least ten internal spline teeth 64 are adjacent to each other without another spline tooth therebetween in the circumferential direction D1. In other words, at least two of the plurality of internal spline teeth 64 are circumferentially arranged at the first internal pitch angle PA21 with respect to the rotational center axis A1 of the bicycle rear sprocket assembly 14. At least other two internal spline teeth of the at least ten spline teeth 64 of the second sprocket SP3 are circumferentially arranged at the second internal pitch angle PA22 with respect to the rotational center axis A1. The at least other two internal spline teeth of the at least ten internal spline teeth 64 of the second sprocket SP3 are adjacent to each other without another spline tooth therebetween in the circumferential direction D1. In other words, at least two of the plurality of internal spline teeth 64 of the second sprocket SP3 are circumferentially arranged at the second internal pitch angle PA22 with respect to the rotational center axis A1. In this embodiment, the second internal pitch angle PA22 is different from the first internal pitch angle PA21. However, the second internal pitch angle PA22 can be substantially equal to the first internal pitch angle PA21.

In this embodiment, the internal spline teeth 64 are circumferentially arranged at the first internal pitch angle PA21 in the circumferential direction D1. Two internal spline teeth of the internal spline teeth 64 is arranged at the second internal pitch angle PA22 in the circumferential direction D1. However, at least two internal spline teeth of the internal spline teeth 64 can be arranged at another internal pitch angle in the circumferential direction D1.

The first internal pitch angle PA21 ranges from 5 degrees to 36 degrees. The first internal pitch angle PA21 ranges from 10 degrees to 20 degrees. The first internal pitch angle PA21 is equal to or smaller than 15 degrees. In this embodiment, for example, the first internal pitch angle PA21 is 12 degrees. However, the first internal pitch angle PA21 is not limited to this embodiment and the above ranges.

The second internal pitch angle PA22 ranges from 5 degrees to 36 degrees. In this embodiment, the second internal pitch angle PA22 is 24 degrees. However, the second internal pitch angle PA22 is not limited to this embodiment and the above range.

Figure 34:
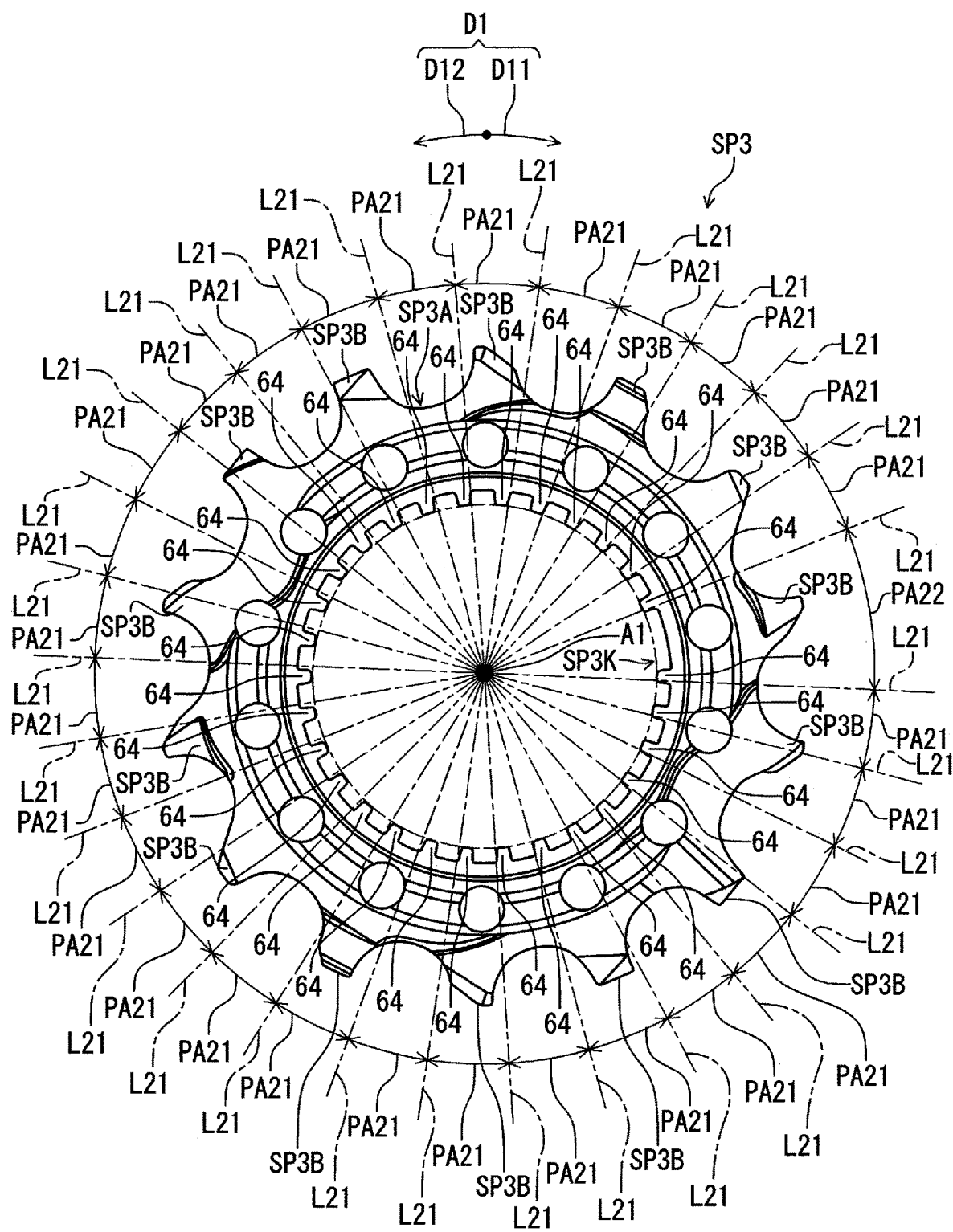
FIG. 34 is a side elevational view of the sprocket illustrated in FIG. 9 in accordance with a modification.

At least one of the at least ten internal spline teeth 64 of the second sprocket SP3 has a first spline shape different from a second spline shape of another of the at least ten internal spline teeth 64. At least one of the at least ten internal spline teeth 64 of the second sprocket SP3 has a first spline size different from a second spline size of another of the at least ten internal spline teeth 64. At least one of the at least ten internal spline teeth 64 has a cross-sectional shape different from a cross-sectional shape of another of the at least ten internal spline teeth 64. As seen in FIG. 34, however, the internal spline teeth 64 can have the same shape as each other. The at least ten internal spline teeth 64 can have the same size as each other. The at least ten internal spline teeth 64 can have the same cross-sectional shape as each other.

Figure 35:
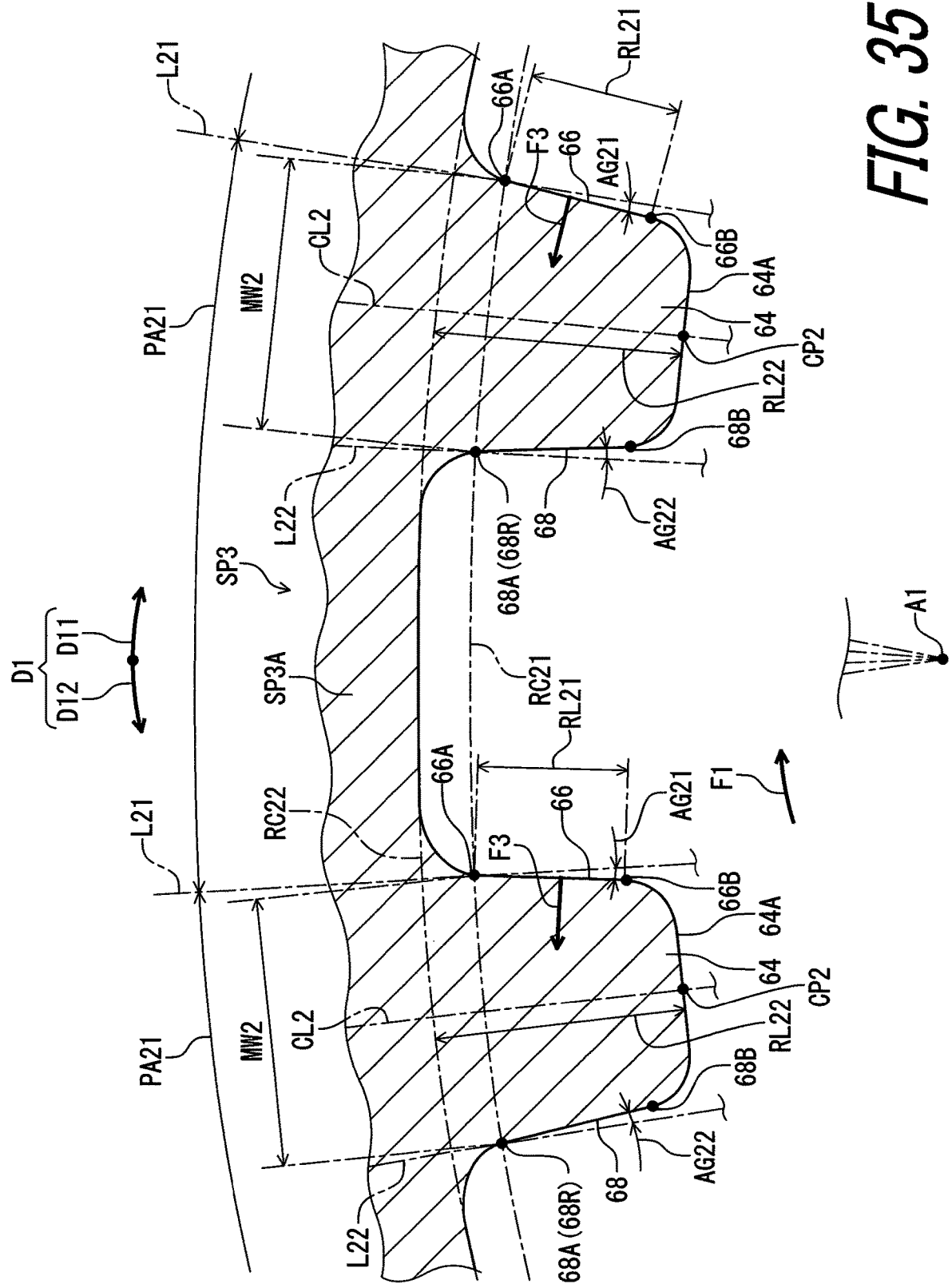
FIG. 35 is an enlarged cross-sectional view of the sprocket illustrated in FIG. 29.

As seen in FIG. 35, at least one of the at least ten internal spline teeth 64 includes an internal-spline driving surface 66. The at least one of the at least ten internal spline teeth 64 includes an internal-spline non-driving surface 68. The at least ten internal spline teeth 64 includes a plurality of internal-spline driving surfaces 66 to receive the driving rotational force F1 from the bicycle rear hub assembly 12 (FIG. 6) during pedaling. The at least ten internal spline teeth 64 includes a plurality of internal-spline non-driving surfaces 68. The internal-spline driving surface 66 is contactable with the sprocket support body 28 to transmit the driving rotational force F1 from the sprocket SP1 to the sprocket support body 28 during pedaling. The internal-spline driving surface 66 faces in the driving rotational direction D11. The internal-spline driving surface 66 faces the external-spline driving surface 48 of the bicycle rear hub assembly 12 in a state where the bicycle rear sprocket assembly 14 is mounted to the bicycle rear hub assembly 12. The internal-spline non-driving surface 68 is provided on a reverse side of the internal-spline driving surface 66 in the circumferential direction D1. The internal-spline non-driving surface 68 faces in the reverse rotational direction D12 not to transmit the driving rotational force F1 from the sprocket SP1 to the sprocket support body 28 during pedaling. The internal-spline non-driving surface 68 faces the external-spline non-driving surface 50 of the bicycle rear hub assembly 12 in a state where the bicycle rear sprocket assembly 14 is mounted to the bicycle rear hub assembly 12.

The at least ten internal spline teeth 64 respectively have circumferential maximum widths MW2. The internal spline teeth 64 respectively have circumferential maximum widths MW2. The circumferential maximum width MW2 is defined as a maximum width to receive a thrust force F3 applied to the internal spline tooth 64. The circumferential maximum width MW2 is defined as a straight distance based on the internal-spline driving surface 66.

The plurality of internal-spline driving surfaces 66 each includes a radially outermost edge 66A and a radially innermost edge 66B. A second reference circle RC21 is defined on the radially outermost edge 66A and is centered at the rotational center axis A1. The second reference circle RC21 intersects with the internal-spline non-driving surface 68 at a reference point 68R. The circumferential maximum width MW2 extends straight from the radially innermost edge 66B to the reference point 68R in the circumferential direction D1.

The internal-spline non-driving surface 68 includes a radially outermost edge 68A and a radially innermost edge 68B. The internal-spline non-driving surface 68 extends from the radially outermost edge 68A to the radially innermost edge 68B. The reference point 68R is provided between the radially outermost edge 68A and the radially innermost edge 68B.

A total of the circumferential maximum widths MW2 is equal to or larger than 40 mm. The total of the circumferential maximum widths MW2 can be equal to or larger than 45 mm. The total of the circumferential maximum widths MW2 can be equal to or larger than 50 mm. In this embodiment, the total of the circumferential maximum widths MW2 is 50.8 mm. However, the total of the circumferential maximum widths MW2 is not limited to this embodiment.

Figure 36:
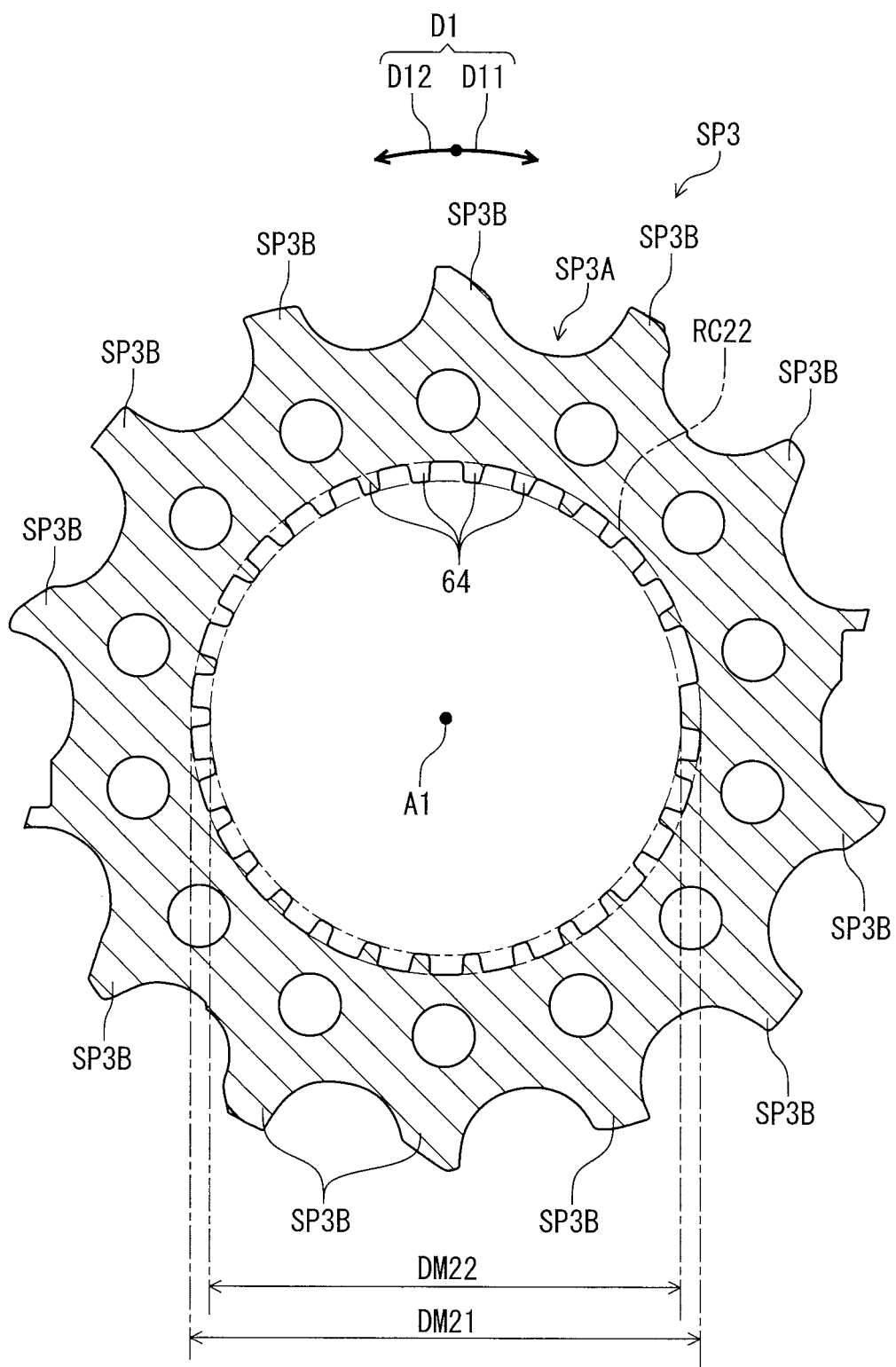
FIG. 36 is another cross-sectional view of the sprocket illustrated in FIG. 29.

As seen in FIG. 36, the at least ten internal spline teeth 64 of the second sprocket SP3 have an internal-spline major diameter DM21. The at least one internal spline tooth 64 of the second sprocket SP3 has an internal-spline root circle RC22 having the internal-spline major diameter DM21. The internal-spline major diameter DM21 equal to or smaller than 34 mm. The internal-spline major diameter DM21 of the second sprocket SP3 is equal to or smaller than 33 mm.

The internal-spline major diameter DM21 of the second sprocket SP3 is equal to or larger than 29 mm. In this embodiment, the internal-spline major diameter DM21 of the second sprocket SP3 is 32.8 mm. However, the internal-spline major diameter DM21 of the second sprocket SP3 is not limited to this embodiment and the above ranges.

The at least ten internal spline teeth 64 of the second sprocket SP3 have an internal-spline minor diameter DM22 equal to or smaller than 32 mm. The internal-spline minor diameter DM22 is equal to or smaller than 31 mm. The internal-spline minor diameter DM22 is equal to or larger than 28 mm. In this embodiment, the internal-spline minor diameter DM22 is 30.4 mm. However, the internal-spline minor diameter DM22 is not limited to this embodiment and the above ranges.

As seen in FIG. 18, the additional sprocket SP12 has a largest tooth-tip diameter TD12. The largest tooth-tip diameter TD12 is a maximum outer diameter defined by the plurality of sprocket teeth SP12B. A ratio of the internal-spline major diameter DM21 (FIG. 36) to the largest tooth-tip diameter TD12 ranges from 0.15 to 0.18. In this embodiment, the ratio of the internal-spline major diameter DM21 to the largest tooth-tip diameter TD12 is 0.15. However, the ratio of the internal-spline major diameter DM21 to the largest tooth-tip diameter TD12 is not limited to this embodiment and the above ranges.

As seen in FIG. 35, the plurality of internal-spline driving surface 66 includes the radially outermost edge 66A and the radially innermost edge 66B. The plurality of internal-spline driving surfaces 66 each includes a radial length RL21 defined from the radially outermost edge 66A to the radially innermost edge 66B. A total of the radial lengths RL21 of the plurality of internal-spline driving surfaces 66 is equal to or larger than 7 mm. The total of the radial lengths RL21 is equal to or larger than 10 mm. The total of the radial lengths RL21 is equal to or larger than 15 mm. The total of the radial lengths RL21 is equal to or smaller than 36 mm. In this embodiment, the total of the radial lengths RL21 is 16.6 mm. However, the total of the radial lengths RL21 is not limited to this embodiment and the above ranges.

The plurality of internal spline tooth 64 has an additional radial length RL22. The additional radial lengths RL22 are respectively defined from the internal-spline root circle RC22 to radially innermost ends 64A of the plurality of internal spline teeth 64. A total of the additional radial lengths RL22 is equal to or larger than 12 mm. In this embodiment, the total of the additional radial lengths RL22 is 34.8 mm. However, the total of the additional radial lengths RL22 is not limited to this embodiment and the above ranges.

At least one of the at least ten internal spline teeth 64 of the second sprocket SP3 is circumferentially symmetric with respect to a reference line CL2. The reference line CL2 extends from the rotational center axis A1 to a circumferential center point CP2 of a radially innermost end 64A of the at least one of the at least ten internal spline teeth 64 in a radial direction with respect to the rotational center axis A1. However, at least one of the internal spline teeth 64 can have an asymmetric shape with respect to the reference line CL2. The at least one of the internal spline tooth 64 comprises the internal-spline driving surface 66 and the internal-spline non-driving surface 68.

The internal-spline driving surface 66 has a first internal-spline-surface angle AG21. The first internal-spline-surface angle AG21 is defined between the internal-spline driving surface 66 and a first radial line L21. The first radial line L21 extends from the rotational center axis A1 of the bicycle rear sprocket assembly 14 to the radially outermost edge 66A of the internal-spline driving surface 66. The first internal pitch angle PA21 or the second internal pitch angle PA22 is defined between the adjacent first radial lines L21 (see, e.g., FIG. 33).

The internal-spline non-driving surface 68 has a second internal-spline-surface angle AG22. The second internal-spline-surface angle AG22 is defined between the internal-spline non-driving surface 68 and a second radial line L22. The second radial line L22 extends from the rotational center axis A1 of the bicycle rear sprocket assembly 14 to the radially outermost edge 68A of the internal-spline non-driving surface 68.

In this embodiment, the second internal-spline-surface angle AG22 is equal to the first internal-spline-surface angle AG21. However, the first internal-spline-surface angle AG21 can be different from the second internal-spline-surface angle AG22.

The first internal-spline-surface angle AG21 ranges from 0 degree to 6 degrees. The second internal-spline-surface angle AG22 ranges from 0 degree to 6 degrees. In this embodiment, the first internal-spline-surface angle AG21 is 5 degrees. The second internal-spline-surface angle AG22 is 5 degrees. However, the first internal-spline-surface angle AG21 and the second internal-spline-surface angle AG22 are not limited to this embodiment and the above ranges.

Figure 37:
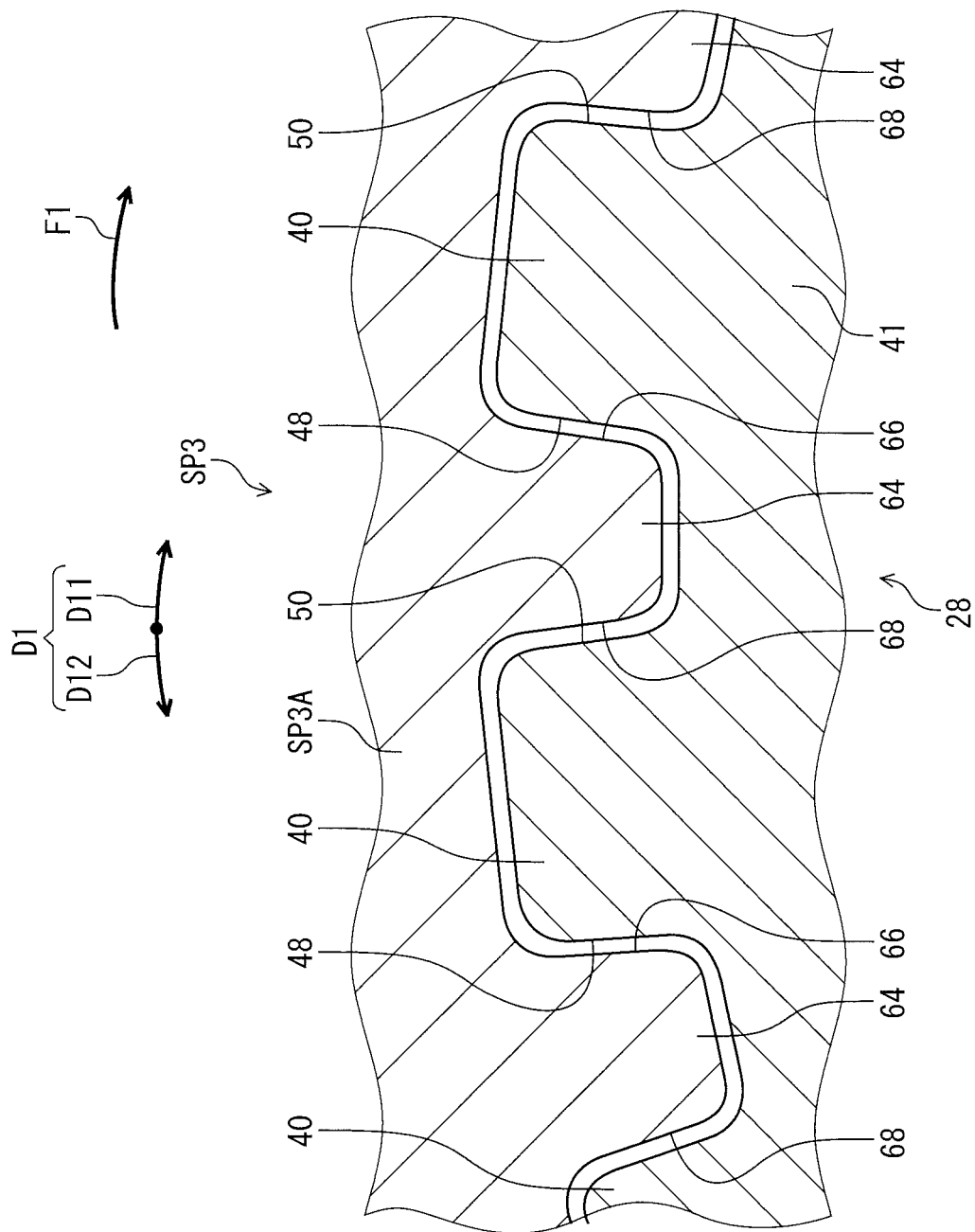
FIG. 37 is another cross-sectional view of the bicycle drive train illustrated in FIG. 2.

As seen in FIG. 37, the internal spline teeth 64 mesh with the external spline teeth 40 to transmit the driving rotational force F1 from the second sprocket SP3 to the sprocket support body 28. The internal-spline driving surface 66 is contactable with the external-spline driving surface 48 to transmit the driving rotational force F1 from the second sprocket SP3 to the sprocket support body 28. The internal-spline non-driving surface 68 is spaced apart from the external-spline non-driving surface 50 in a state where the internal-spline driving surface 66 is in contact with the external-spline driving surface 48.

The internal spline teeth 63 of the first sprocket SP2 and the internal spline teeth 65 of the second sprocket SP4 have substantially the same structure as the internal spline teeth 64 of the second sprocket SP3. Thus, they will not be described in detail here for the sake of brevity.

As seen in FIG. 2, the sprocket support member 37 includes at least ten internal spline teeth 76 configured to engage with the sprocket support body 28 of the bicycle rear hub assembly 12. The plurality of internal spline teeth 76 has substantially the same structure as that of the plurality of internal spline teeth 64. Thus, they will not be described in detail here for the sake of brevity.

Figure 38:
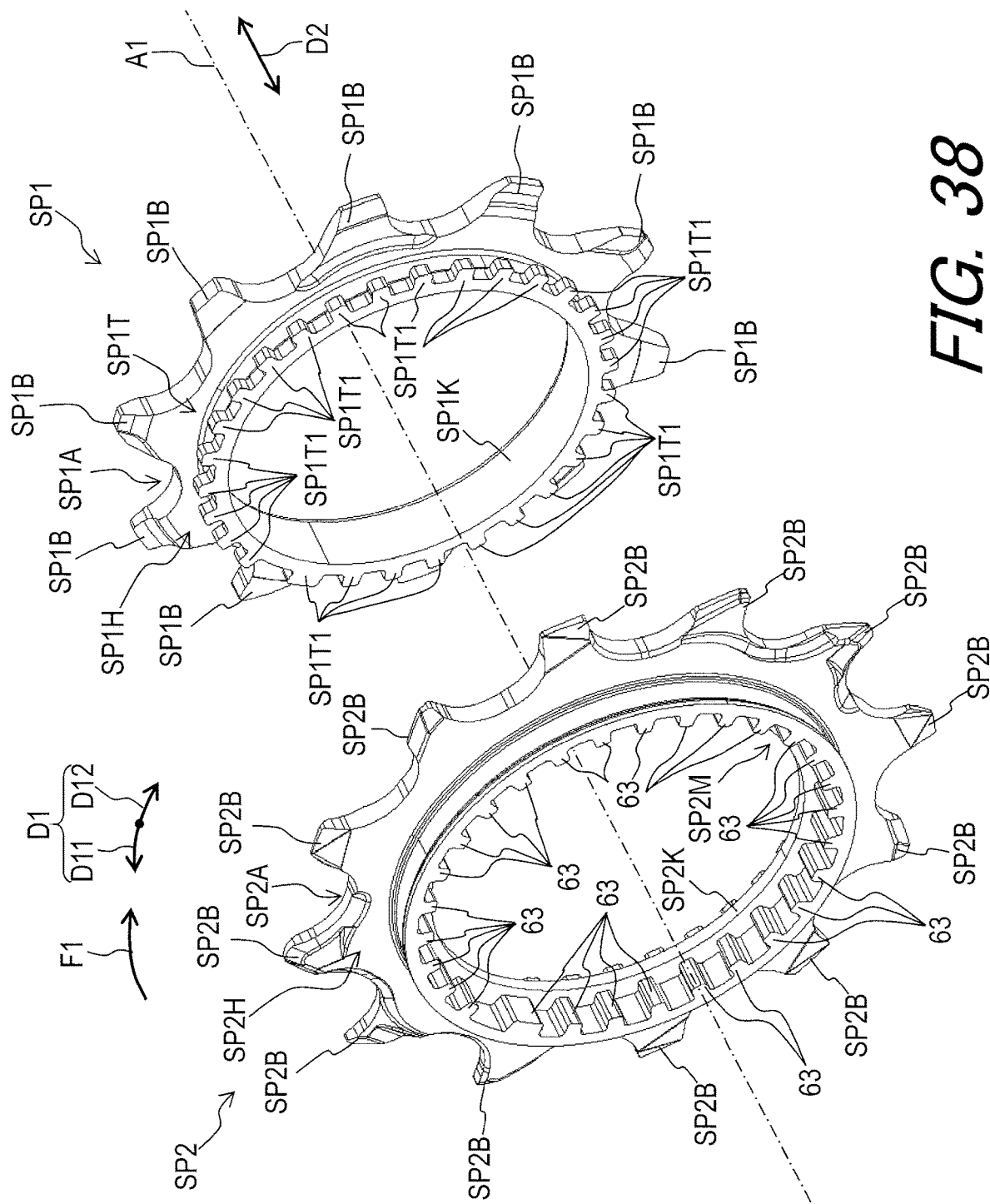
FIG. 38 is an exploded perspective view of the sprockets illustrated in FIGS. 7 and 8.

As seen in FIG. 38, the first sprocket SP1 includes a first torque-transmitting structure SP1T provided to the first inward facing side SP1H to directly or indirectly transmit a pedaling torque to the sprocket support body 28. In this embodiment, the first torque-transmitting structure SP1T includes a plurality of first torque-transmitting teeth SP1T1 to indirectly transmit a pedaling torque to the sprocket support body 28. The first torque-transmitting structure SP1T includes at least ten first torque-transmitting teeth SP1T1. Preferably, a total number of the at least ten first torque-transmitting teeth SP1T1 is equal to or larger than 20. More preferably, a total number of the at least ten first torque-transmitting teeth SP1T1 is equal to or larger than 28. In this embodiment, a total number of the at least ten first torque-transmitting teeth SP1T1 is 29. However, the total number of the at least ten first torque-transmitting teeth SP1T1 is not limited to this embodiment and the above ranges.

Figure 39:
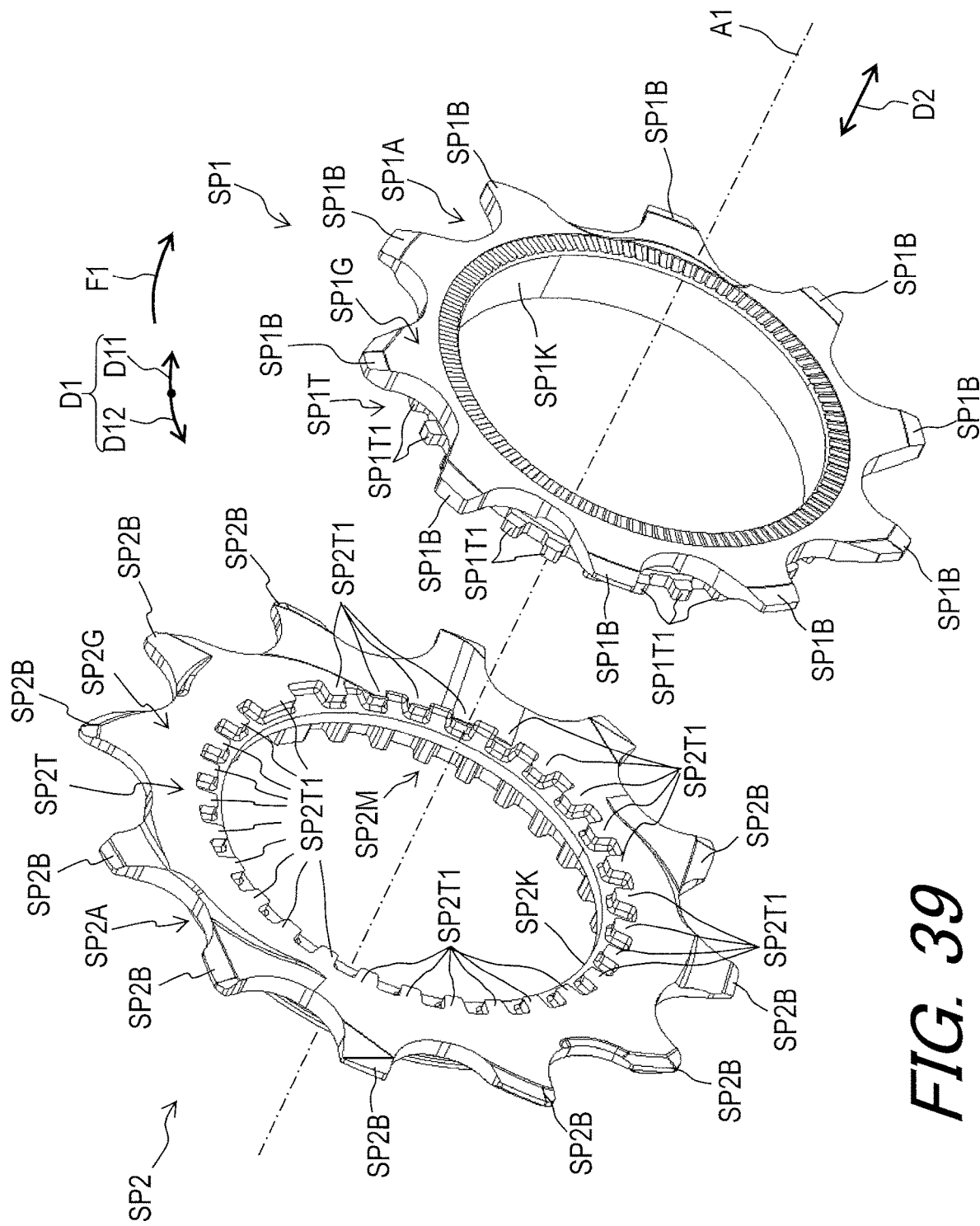
FIG. 39 is another exploded perspective view of the sprockets illustrated in FIGS. 7 and 8.

As seen in FIGS. 38 and 39, the first sprocket SP2 includes a first inward facing side SP2H and a first outward facing side SP2G. The first outward facing side SP2G is opposite to the first inward facing side SP2H in the axial direction D2 with respect to the rotational center axis A1 of the bicycle rear sprocket assembly 14. The first sprocket SP2 includes a first torque-transmitting structure SP2M provided to the first inward facing side SP2H to directly or indirectly transmit a pedaling torque to the sprocket support body 28. In this embodiment, the internal spline tooth 63 of the first sprocket SP2 can also be referred to as a first torque-transmitting tooth 63. The first torque-transmitting structure SP2M includes the plurality of first torque-transmitting teeth 63 to directly transmit a pedaling torque to the sprocket support body 28. The first torque-transmitting structure SP2M includes at least ten first torque-transmitting teeth 63. Preferably, a total number of the at least ten first torque-transmitting teeth 63 is equal to or larger than 20. More preferably, the total number of the at least ten first torque-transmitting teeth 63 is equal to or larger than 28. In this embodiment, the total number of the at least ten first torque-transmitting teeth 63 is 29. However, the total number of the at least ten first torque-transmitting teeth 63 is not limited to this embodiment and the above ranges. The first torque-transmitting tooth 63 can also be referred to as the internal spline tooth 63.

As seen in FIG. 39, the first sprocket SP2 includes a second torque-transmitting structure SP2T to receive a pedaling torque from the first sprocket SP1. The second torque-transmitting structure SP2T is provided on the first outward facing side SP2G. In this embodiment, the second torque-transmitting structure SP2T includes a plurality of second torque-transmitting teeth SP2T1. Preferably, a total number of the second torque-transmitting teeth SP2T1 is equal to or larger than 20. More preferably, the total number of the second torque-transmitting teeth SP2T1 is equal to or larger than 28. In this embodiment, the total number of the second torque-transmitting teeth SP2T1 is 29. However, the total number of the second torque-transmitting teeth SP2T1 is not limited to this embodiment and the above ranges. The first torque-transmitting structure SPIT is engaged with the second torque-transmitting structure SP2T. The plurality of first torque-transmitting teeth SP1T1 is meshed with the plurality of second torque-transmitting teeth SP2T1 to transmit the driving rotational force F1.

As seen in FIGS. 23 and 24, the sprocket support body 28 includes a hub indicator 281 provided at an axial end of the base support 41. The hub indicator 281 is provided in an area of the second external pitch angle PA12 when viewed along the rotational center axis A1. In this embodiment, the hub indicator 281 includes a dot. However, the hub indicator 281 can include other shapes such as a triangle and a line. Further, the hub indicator 281 can be a separate member that is attached to the sprocket support body 28 e.g. with a bonding structure such as an adhesive agent. The position of the hub indicator 281 is not limited to this embodiment.

As seen in FIG. 7, the first sprocket SP1 includes a sprocket indicator SP1I provided at an axial end of the sprocket body SP1A. In this embodiment, the sprocket indicator SP1I includes a dot. However, the sprocket indicator SP1I can include other shapes such as a triangle and a line. Further, the sprocket indicator SP1I can be a separate member that is attached to the sprocket SP1 e.g. with a bonding structure such as an adhesive agent. The position of the sprocket indicator SP1I is not limited to this embodiment. The sprocket indicator SP1I can be provided to any one of other sprockets SP2 to SP12. The sprocket indicator SP1I can also be provided to the sprocket support member 37.

As seen in FIG. 6, the bicycle rear hub assembly 12 further comprises a freewheel structure 78. The sprocket support body 28 is operatively coupled to the hub body 36 with the freewheel structure 78. The freewheel structure 78 is configured to couple the sprocket support body 28 to the hub body 36 to rotate the sprocket support body 28 along with the hub body 36 in the driving rotational direction D11 (FIG. 5) during pedaling. The freewheel structure 78 is configured to allow the sprocket support body 28 to rotate relative to the hub body 36 in the reverse rotational direction D12 (FIG. 5) during coasting. Accordingly, the freewheel structure 78 may be paraphrased into a one-way clutch structure 78. The freewheel structure 78 will be described in detail later.

The bicycle rear hub assembly 12 includes a first bearing 79A and a second bearing 79B. The first bearing 79A and the second bearing 79B are provided between the sprocket support body 28 and the hub axle 30 to rotatably support the sprocket support body 28 relative to the hub axle 30 about the rotational center axis A1.

In this embodiment, each of the sprocket support body 28, the brake-rotor support body 34, and the hub body 36 is made of a metallic material such as aluminum, iron, or titanium. However, at least one of the sprocket support body 28, the brake-rotor support body 34, and the hub body 36 can be made of a non-metallic material.

Figure 40:
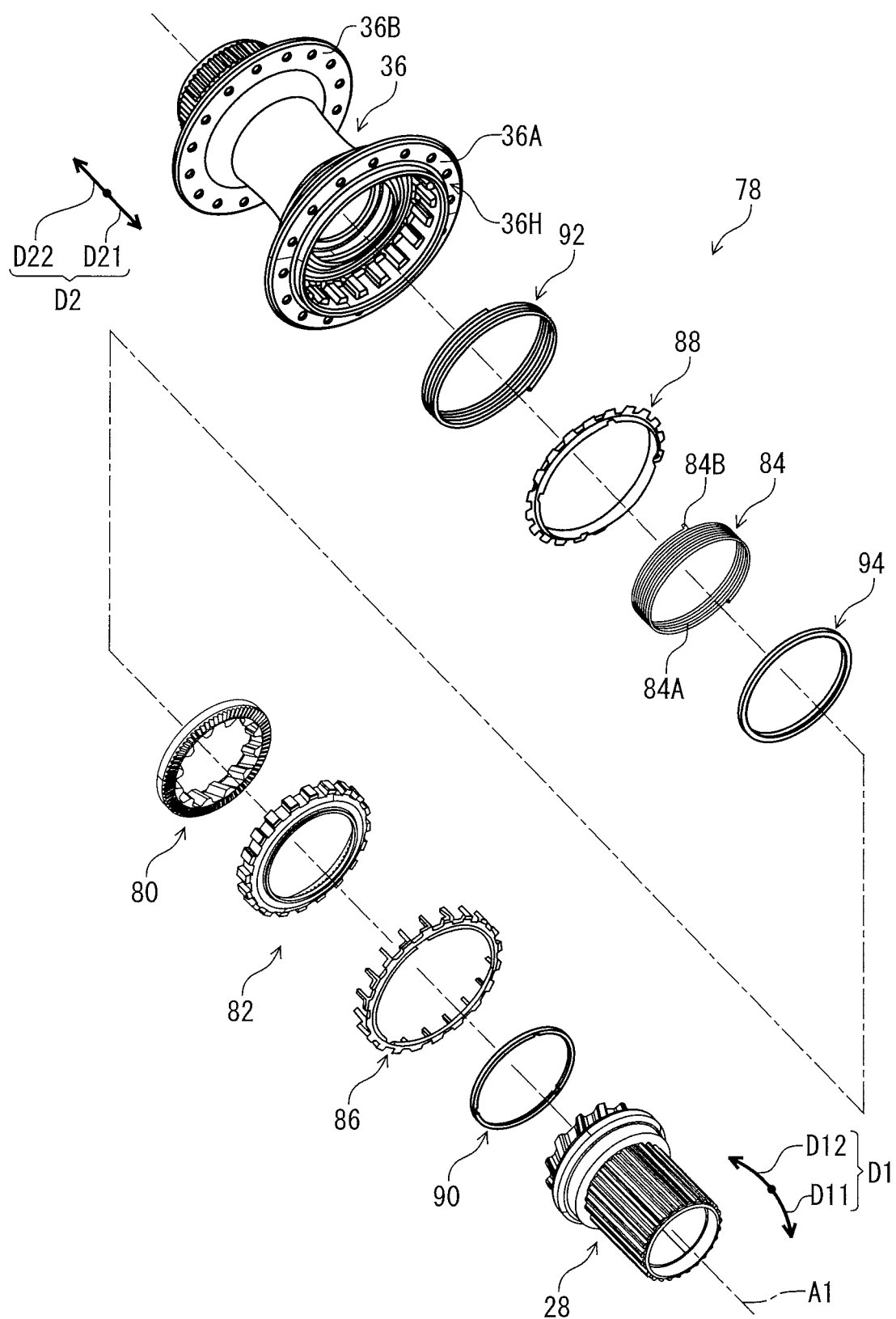
FIG. 40 is an exploded perspective view of a part of the bicycle rear hub assembly illustrated in FIG. 4.

As seen in FIG. 40, the freewheel structure 78 includes a first ratchet member 80 and a second ratchet member 82. The first ratchet member 80 is configured to engage with one of the hub body 36 and the sprocket support body 28 in a torque transmitting manner. The second ratchet member 82 is configured to engage with the other of the hub body 36 and the sprocket support body 28 in a torque transmitting manner. In this embodiment, the first ratchet member 80 is engage with the sprocket support body 28 in a torque transmitting manner. The second ratchet member 82 is engage with the hub body 36 in a torque transmitting manner. However, the first ratchet member 80 can be configured to engage with the hub body 36 in a torque transmitting manner. The second ratchet member 82 can be configured to engage with the sprocket support body 28 in a torque transmitting manner.

The first ratchet member 80 is mounted to the sprocket support body 28 to rotate together with the sprocket support body 28 relative to the hub body 36 about the rotational center axis A1. The second ratchet member 82 is mounted to the hub body 36 to rotate together with the hub body 36 relative to the sprocket support body 28 about the rotational center axis A1. Each of the first ratchet member 80 and the second ratchet member 82 has an annular shape.

At least one of the first ratchet member 80 and the second ratchet member 82 is movable relative to the hub axle 30 in the axial direction D2 with respect to the rotational center axis A1. In this embodiment, each of the first ratchet member 80 and the second ratchet member 82 is movable relative to the hub axle 30 in the axial direction D2. The second ratchet member 82 is movable relative to the hub body 36 in the axial direction D2. The first ratchet member 80 is movable relative to the sprocket support body 28 in the axial direction D2.

The hub body 36 includes a freewheel housing 36H having an annular shape. The freewheel housing 36H extends in the axial direction D2. The first ratchet member 80 and the second ratchet member 82 are provided in the freewheel housing 36H in an assembled state.

Figure 41:
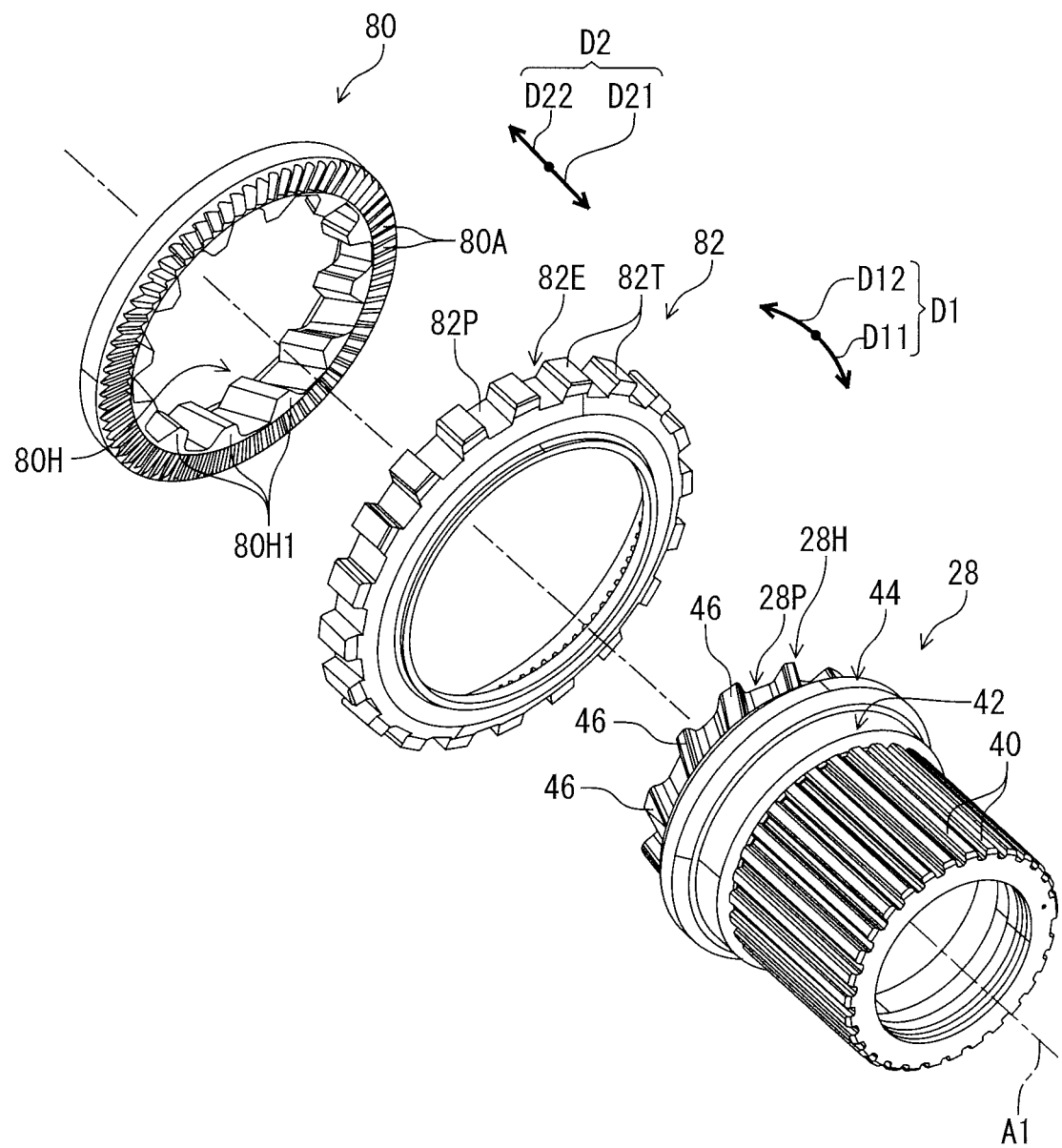
FIG. 41 is an exploded perspective view of a part of the bicycle rear hub assembly illustrated in FIG. 40.

As seen in FIG. 41, the first ratchet member 80 includes at least one first ratchet tooth 80A. In this embodiment, the at least one first ratchet tooth 80A includes a plurality of first ratchet teeth 80A. The plurality of first ratchet teeth 80A is arranged in the circumferential direction D1 to provide a serration.

Figure 42:
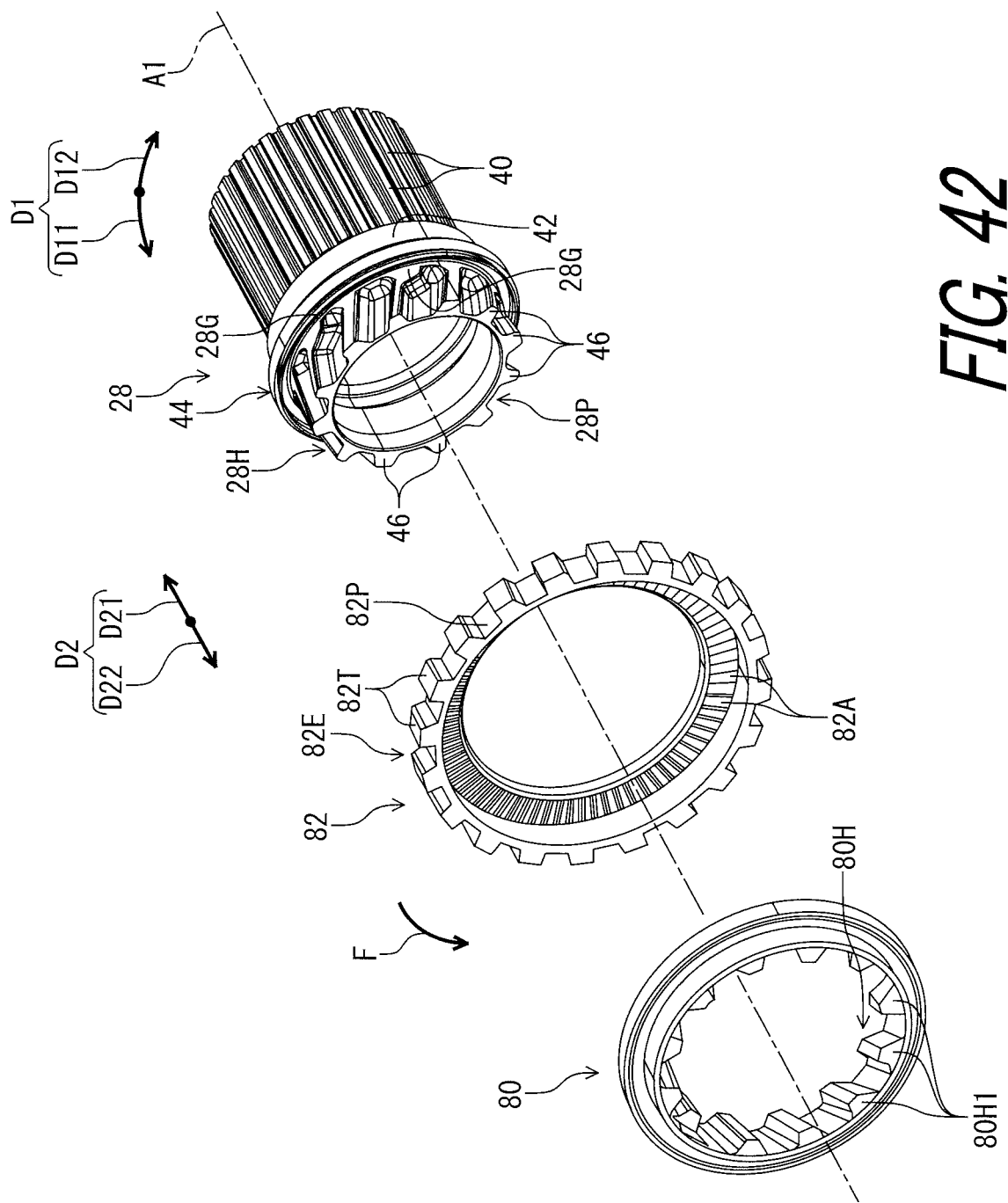
FIG. 42 is an exploded perspective view of a part of the bicycle rear hub assembly illustrated in FIG. 40.

As seen in FIG. 42, the second ratchet member 82 includes at least one second ratchet tooth 82A configured to engage with the at least one first ratchet tooth 80A in a torque transmitting manner. The at least one second ratchet tooth 82A engages with the at least one first ratchet tooth 80A to transmit the rotational force F1 from the sprocket support body 28 to the hub body 36 (FIG. 40). In this embodiment, the at least one second ratchet tooth 82A includes a plurality of second ratchet teeth 82A configured to engage with the plurality of first ratchet teeth 80A in a torque transmitting manner. The plurality of second ratchet teeth 82A is arranged in the circumferential direction D1 to provide a serration. The plurality of second ratchet teeth 82A is engageable with the plurality of first ratchet teeth 80A. The first ratchet member 80 and the second ratchet member 82 rotate together in a state where the second ratchet teeth 82A are engaged with the first ratchet teeth 80A.

As seen in FIGS. 41 and 42, the sprocket support body 28 has an outer peripheral surface 28P having a first helical spline 28H. The first ratchet member 80 is configured to engage with the sprocket support body 28 in a torque transmitting manner and includes a second helical spline 80H mating with the first helical spline 28H. The first ratchet member 80 is movably mounted in the axial direction D2 with respect to the sprocket support body 28 via the second helical spline 80H mating with the first helical spline 28H during driving by a first thrust force applied from the sprocket support body 28. In this embodiment, the first helical spline 28H includes the plurality of helical external spline teeth 46. The second helical spline 80H includes a plurality of helical internal spline teeth 80H1 mating with the plurality of helical external spline teeth 46.

Figure 43:
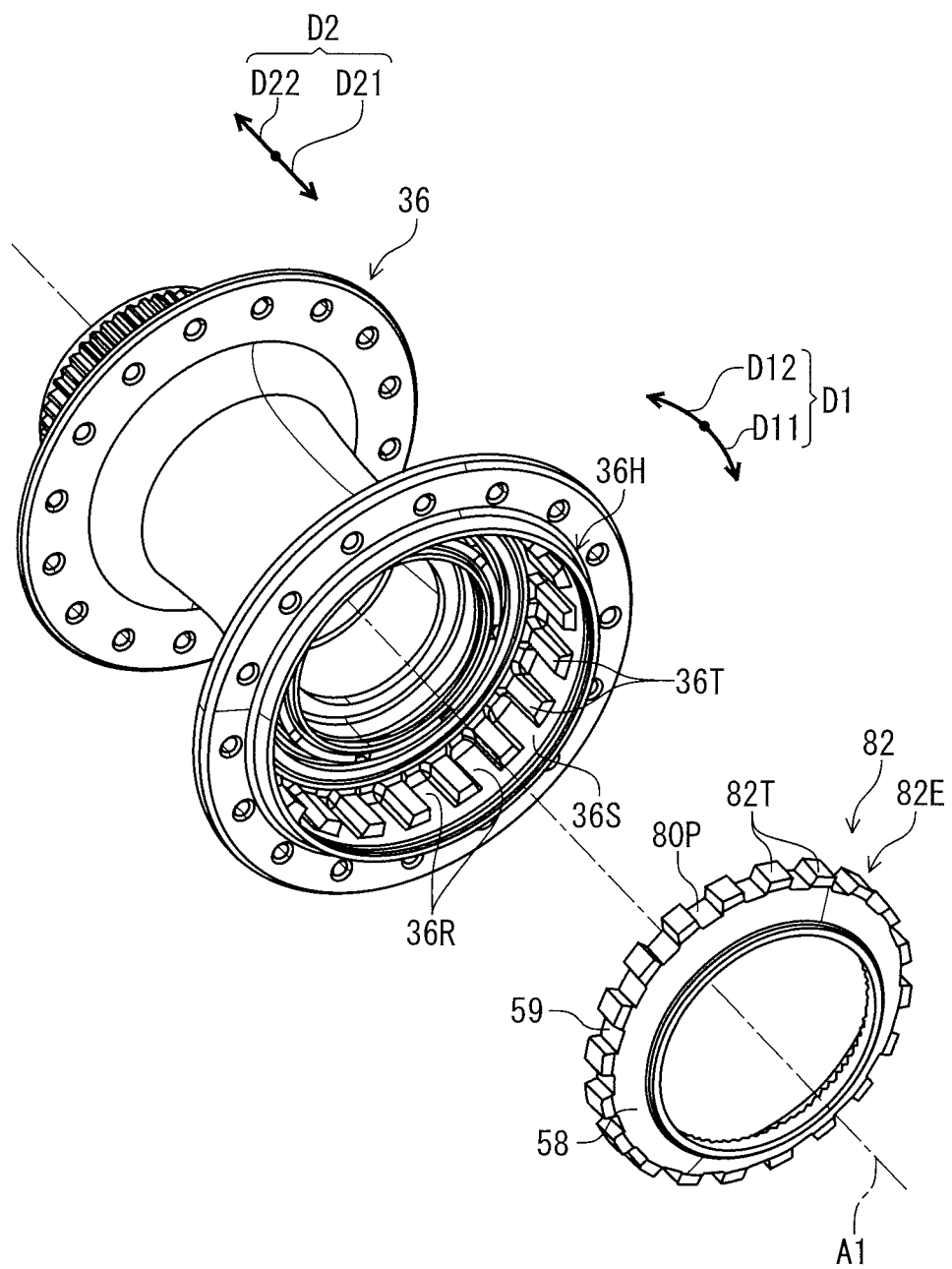
FIG. 43 is an exploded perspective view of a part of the bicycle rear hub assembly illustrated in FIG. 40.

As seen in FIG. 43, the hub body 36 includes an inner peripheral surface 36S and at least one first tooth 36T. The at least one first tooth 36T is provided on the inner peripheral surface 36S. In this embodiment, the freewheel housing 36H includes the inner peripheral surface 36S. The hub body 36 includes a plurality of first teeth 36T. The plurality of first teeth 36T is provided on the inner peripheral surface 36S and extends radially inwardly from the inner peripheral surface 36S with respect to the rotational center axis A1. The first teeth 36T are arranged in the circumferential direction D1 to define a plurality of recesses 36R between adjacent two teeth of the first teeth 36T.

The second ratchet member 82 includes a hub body engagement portion 82E engaged with the hub body 36 in a torque transmitting manner to transmit the rotational force F1 from the first ratchet member 80 to the hub body 36 via the hub body engagement portion 82E. One of the hub body engagement portion 82E and the hub body 36 includes at least one protrusion extending radially. The other of the hub body engagement portion 82E and the hub body 36 includes at least one recess engaged with the at least one protrusion. In this embodiment, the hub body engagement portion 82E includes at least one protrusion 82T extending radially as at least one protrusion. The hub body 36 includes at least one recess 36R engaged with the at least one protrusion 82T. In this embodiment, the hub body engagement portion 82E includes a plurality of protrusions 82T. The plurality of protrusions 82T is engaged with the plurality of recesses 36R.

As seen in FIG. 42, the outer peripheral surface 28P of the sprocket support body 28 has a guiding portion 28G configured to guide the first ratchet member 80 toward the hub body 36 during coasting. The guiding portion 28G is arranged to define an obtuse angle AG28 (FIG. 48) with the first helical spline 28H. The sprocket support body 28 includes a plurality of guiding portions 28G. The guiding portion 28G is configured to guide the first ratchet member 80 toward the hub body 36 during coasting or freewheeling. The guiding portion 28G guides the first ratchet member 80 toward the hub body 36 to release a meshing engagement between the at least one first ratchet tooth 80A (FIG. 41) and the at least one second ratchet tooth 82A during coasting. The guiding portion 28G is configured to move the first ratchet member 80 away from the second ratchet member 82 in the axial direction D2. The guiding portion 28G extends in at least the circumferential direction D1 with respect to the sprocket support body 28. The guiding portion 28G extends from one tooth of the plurality of helical external spline teeth 46 in at least the circumferential direction D1. While the guiding portion 28G is integrally provided with the helical external spline tooth 46 as a one-piece unitary member in this embodiment, the guiding portion 28G can be a separate member from the plurality of helical external spline teeth 46. The first ratchet member 80 and the second ratchet member 82 are smoothly disengaged from each other during coasting because of the guiding portion 28G, especially in a case where the guiding portion 28G is arranged to define an obtuse angle AG 28 with respect to the first helical spline 28H. This also results in reducing noise during coasting because the at least one first ratchet tooth 80A and the at least one second ratchet tooth 82A are smoothly separated from each other during coasting.

As seen in FIG. 40, the bicycle rear hub assembly 12 further comprises a biasing member 84. The biasing member 84 is disposed between the hub body 36 and the first ratchet member 80 to bias the first ratchet member 80 in the axial direction D2 toward the second ratchet member 82. In this embodiment, for example, the biasing member 84 is a compression spring.

Figure 44:
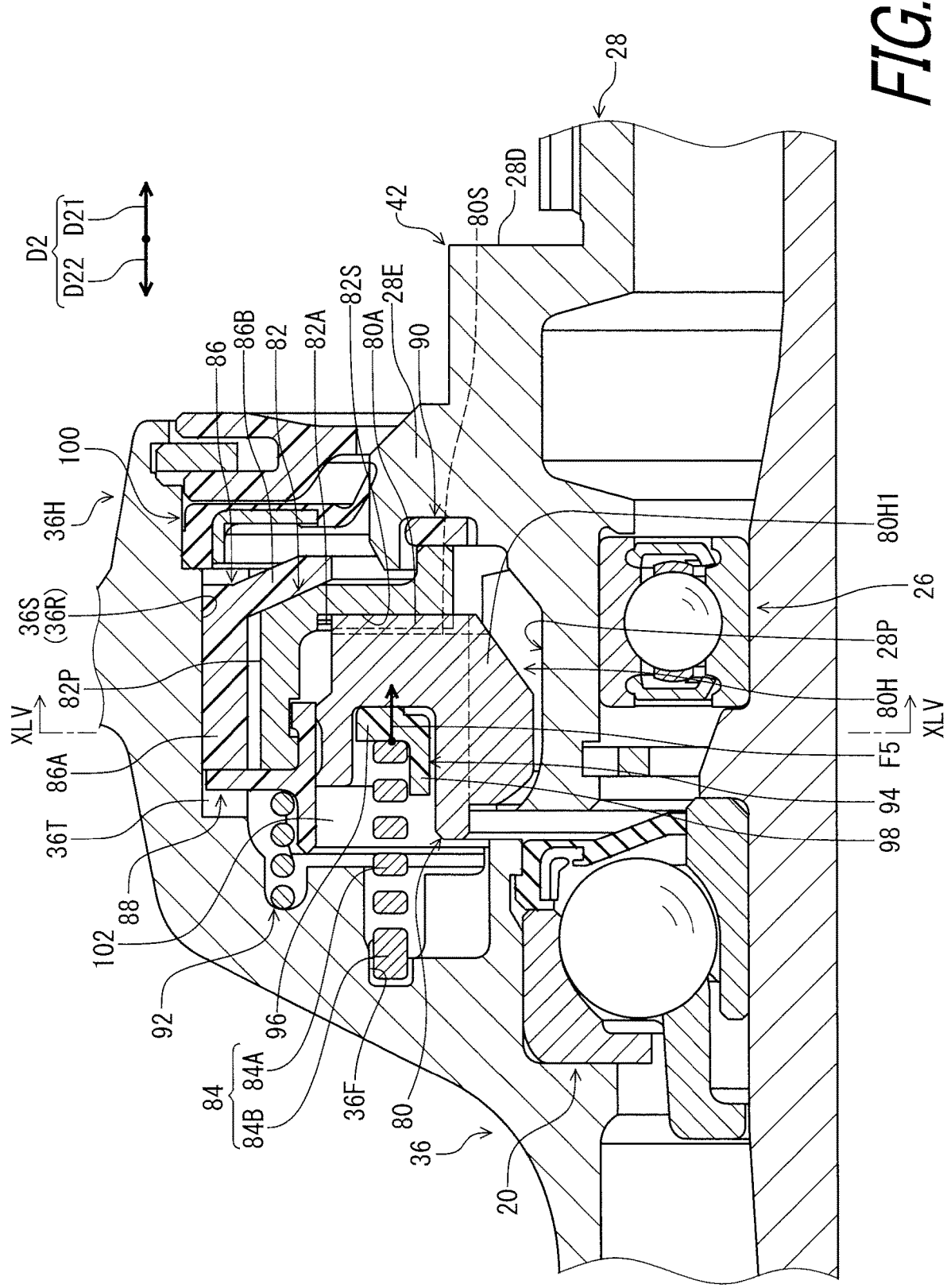
FIG. 44 is a partial cross-sectional view of the bicycle rear hub assembly illustrated in FIG. 40.

As seen in FIG. 44, the biasing member 84 is compressed between the hub body 36 and the first ratchet member 80 in the axial direction D2. The biasing member 84 biases the first ratchet member 80 toward the second ratchet member 82 to maintain an engagement state where the first ratchet member 80 and the second ratchet member 82 are engaged with each other via the first ratchet teeth 80A and the second ratchet teeth 82A.

Preferably, the biasing member 84 is engaged with the hub body 36 to rotate with the hub body 36. The biasing member 84 is mounted to the hub body 36 to rotate together with the hub body 36 about the rotational center axis A1 (FIG. 40). The biasing member 84 includes a coiled body 84A and a connecting end 84B. The hub body 36 includes a connecting hole 36F. The connecting end 84B is provided in the connecting hole 36F so that the biasing member 84 rotates together with the hub body 36 about the rotational center axis A1 (FIG. 40).

As seen in FIG. 44, the outer peripheral surface 28P of the sprocket support body 28 supports the first ratchet member 80 and the second ratchet member 82. The first ratchet member 80 includes an axial facing surface 80S facing in the axial direction D2. The at least one first ratchet tooth 80A is disposed on the axial facing surface 80S of the first ratchet member 80. In this embodiment, the plurality of first ratchet teeth 80A is disposed on the axial facing surface 80S of the first ratchet member 80. The axial facing surface 80S is substantially perpendicular to the axial direction D2. However, the axial facing surface 80S can be non-perpendicular to the axial direction D2.

The second ratchet member 82 includes an axial facing surface 82S facing in the axial direction D2. The at least one second ratchet tooth 82A is disposed on the axial facing surface 82S of the second ratchet member 82. The axial facing surface 82S of the second ratchet member 82 faces the axial facing surface 80S of the first ratchet member 80. In this embodiment, the plurality of second ratchet teeth 82A is disposed on the axial facing surface 82S of the second ratchet member 82. The axial facing surface 82S is substantially perpendicular to the axial direction D2. However, the axial facing surface 82S can be non-perpendicular to the axial direction D2.

As seen in FIG. 40, the bicycle rear hub assembly 12 comprises a spacer 86, a supporting member 88, a sliding member 90, an additional biasing member 92, and a receiving member 94. However, it is possible to omit at least one of the spacer 86, the supporting member 88, the sliding member 90, the additional biasing member 92, and the receiving member 94 from the bicycle rear hub assembly 12.

Figure 45:
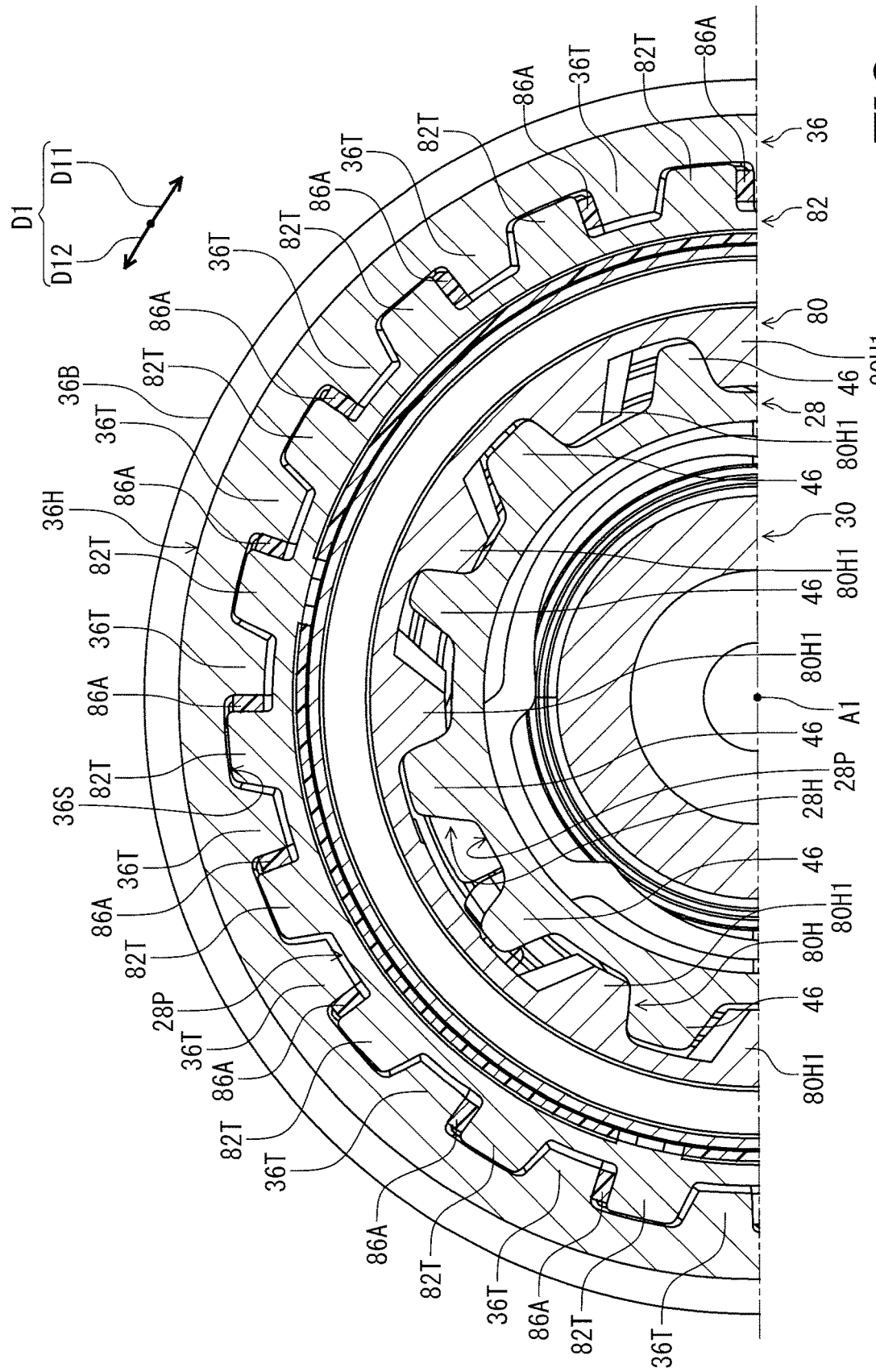
FIG. 45 is a cross-sectional view of the bicycle rear hub assembly taken along line XLV-XLV of FIG. 44.

As seen in FIGS. 44 and 45, the spacer 86 is at least partly provided between the at least one first tooth 36T and the at least one protrusion 82T in the circumferential direction D1 defined about the rotational center axis A1. In this embodiment, the spacer 86 is partly provided between the first teeth 36T and the protrusions 82T in the circumferential direction D1. However, the spacer 86 can be entirely provided between the first teeth 36T and the protrusions 82T in the circumferential direction D1.

Figure 46:
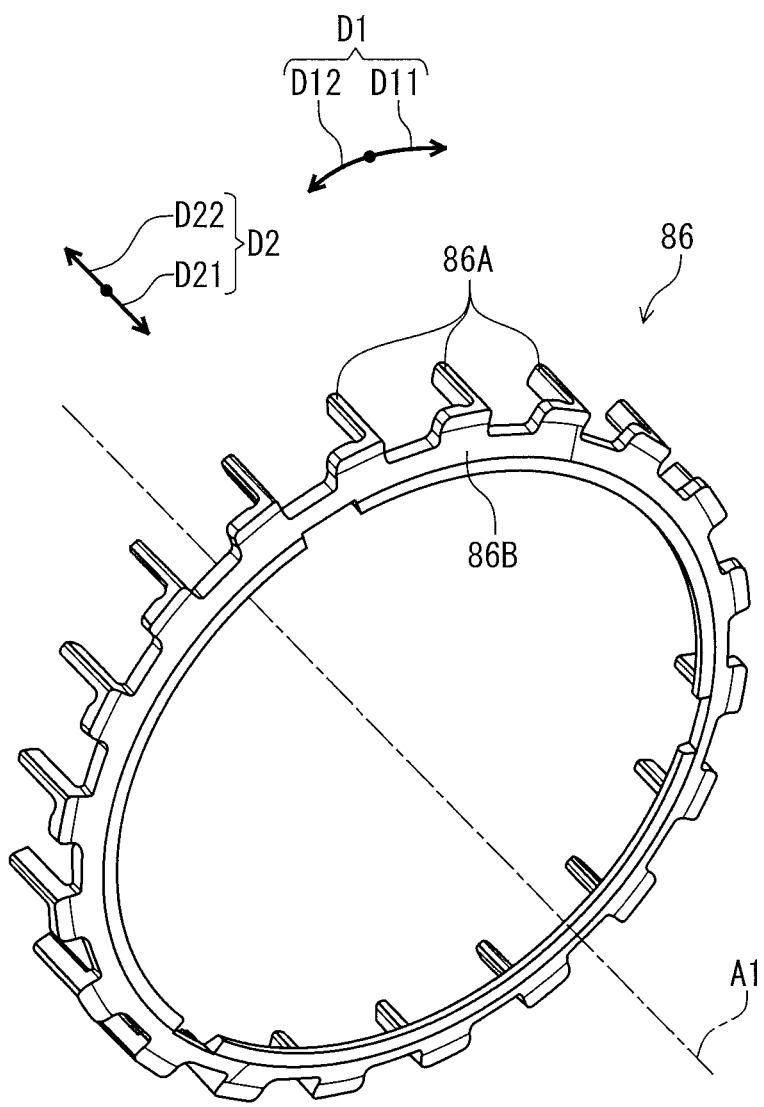
FIG. 46 is a perspective view of a spacer of the bicycle rear hub assembly illustrated in FIG. 40.
Figure 47:
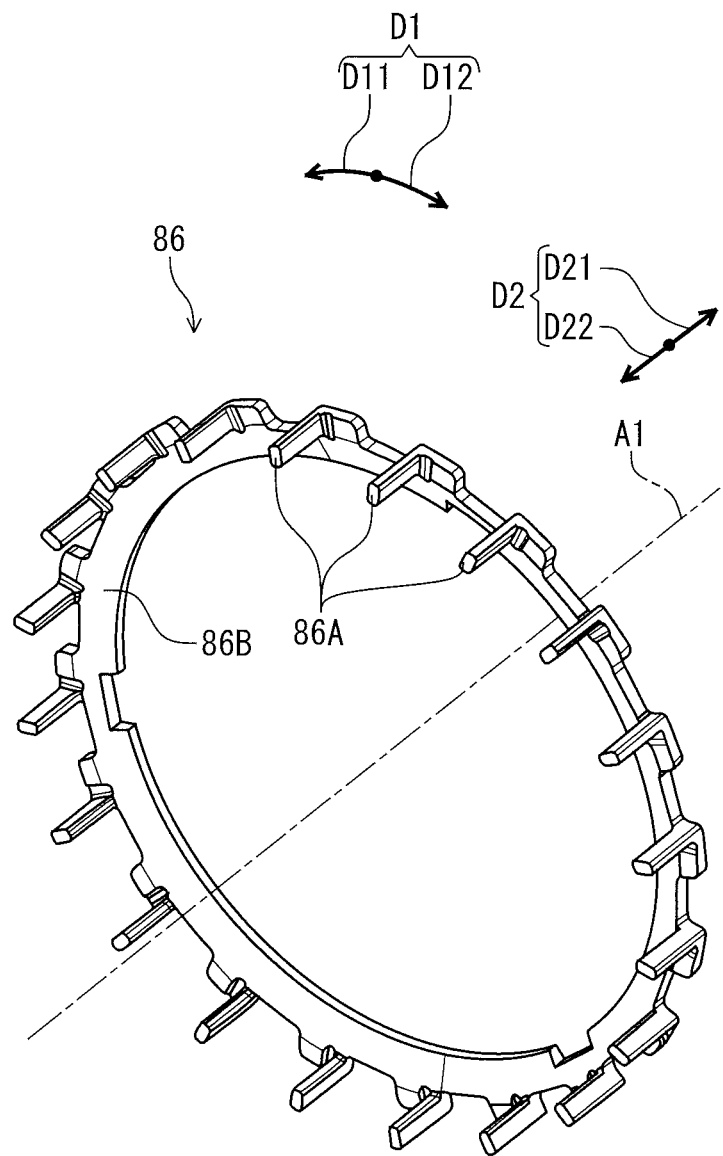
FIG. 47 is another perspective view of a spacer of the bicycle rear hub assembly illustrated in FIG. 40.

As seen in FIGS. 45 to 47, the spacer 86 includes at least one intermediate portion 86A provided between the at least one first tooth 36T and the at least one protrusion 82T. The at least one intermediate portion 86A provided between the at least one first tooth 36T and the at least one protrusion 82T in the circumferential direction D1. In this embodiment, the spacer 86 includes a plurality of intermediate portions 86A respectively provided between the first teeth 36T and the protrusions 82T in the circumferential direction D1. While the spacer 86 includes the intermediate portions 86A in this embodiment, the spacer 86 can include one intermediate portion 86A.

As seen in FIGS. 46 and 47, the spacer 86 includes a connection portion 86B. The plurality of intermediate portions 86A extends from the connection portion 86B in the axial direction D2 parallel to the rotational center axis A1. While the spacer 86 includes the connection portion 86B in this embodiment, the connection portion 86B can be omitted from the spacer 86.

The spacer 86 including a non-metallic material. In this embodiment, the non-metallic material includes a resin material. Examples of the resin material include synthetic resin. The non-metallic material can include a material other than the resin material instead of or in addition to the resin material. While the intermediate portions 86A and the connection portion 86B are integrally provided with each other as a one-piece unitary member in this embodiment, at least one of the intermediate portions 86A can be a separate portion from the connection portion 86B.

As seen in FIGS. 44 and 45, the plurality of intermediate portions 86A is provided between the inner peripheral surface 36S of the hub body 36 and an outer peripheral surface 82P of the second ratchet member 82 in the radial direction.

As seen in FIG. 44, the supporting member 88 is provided between the hub body 36 and the second ratchet member 82 in the axial direction D2. The supporting member 88 is attached to the second ratchet member 82. The supporting member 88 is provided radially outwardly of the first ratchet member 80. The supporting member 88 is contactable with the first ratchet member 80. The supporting member 88 preferably includes a non-metallic material. The supporting member 88 made of a non-metallic material reduces noise during operation of the bicycle rear hub assembly 12. In this embodiment, the non-metallic material includes a resin material. The non-metallic material can include a material other than the resin material instead of or in addition to the resin material.

The sliding member 90 is provided between the sprocket support body 28 and the second ratchet member 82 in the axial direction D2 parallel to the rotational center axis A1. The second ratchet member 82 is provided between the first ratchet member 80 and the sliding member 90 in the axial direction D2. The sliding member 90 preferably includes a non-metallic material. The sliding member 90 made of a non-metallic material reduces noise during operation of the bicycle rear hub assembly 12. In this embodiment, the non-metallic material includes a resin material. The non-metallic material can include a material other than the resin material instead of or in addition to the resin material.

The sprocket support body 28 includes an abutment 28E to abut the second ratchet member 82 to restrict an axial movement of the second ratchet member 82 away from the hub body 36. The abutment 28E can indirectly abut the second ratchet member 82 via the sliding member 90 in this embodiment. Alternatively, the abutment 28E can directly abut the second ratchet member 82. The first ratchet member 80 is disposed on an axial side of the second ratchet member 82 that is opposite to the abutment 28E of the sprocket support body 28 in the axial direction D2. The sliding member 90 is provided between the abutment 28E of the sprocket support body 28 and the second ratchet member 82 in the axial direction D2.

As seen in FIG. 44, the additional biasing member 92 is provided between the hub body 36 and the second ratchet member 82 in the axial direction D2 to bias the second ratchet member 82 toward the sprocket support body 28. In this embodiment, the additional biasing member 92 biases the second ratchet member 82 in the axial direction D2 via the supporting member 88. The additional biasing member 92 is provided radially outwardly of the biasing member 84. The additional biasing member 92 is provided radially outwardly of the plurality of second ratchet teeth 82A in this embodiment.

The receiving member 94 includes a non-metallic material. The receiving member 94 made of a non-metallic material prevent the biasing member 84 from excessively twisting during operation of the bicycle rear hub assembly 12. In this embodiment, the non-metallic material includes a resin material. The non-metallic material can include a material other than the resin material instead of or in addition to the resin material. The receiving member 94 includes an axially receiving part 96 and a radially receiving part 98. The axially receiving part 96 is provided between the first ratchet member 80 and the biasing member 84 in the axial direction D2. The radially receiving part 98 extends from the axially receiving part 96 in the axial direction D2. The radially receiving part 98 is provided radially inwardly of the biasing member 84. The axially receiving part 96 and the radially receiving part 98 are integrally provided with each other as a one-piece unitary member. However, the axially receiving part 96 can be a separate member from the radially receiving part 98.

As seen in FIG. 44, the bicycle rear hub assembly 12 comprises a seal structure 100. The seal structure 100 is provided between the sprocket support body 28 and the hub body 36. The hub body 36 includes an internal space 102. Each of the sprocket support body 28, the biasing member 84, the first ratchet member 80, and the second ratchet member 82 is at least partly disposed in the internal space 102 of the hub body 36. The internal space 102 is sealed by the seal structure 100. In this embodiment, no lubricant is provided in the internal space 102. However, the bicycle rear hub assembly 12 can comprises lubricant provided in the internal space 102. Each gap between members disposed in the internal space 102 can be reduced if no lubricant is provided in comparison with a case in which the bicycle rear hub assembly 12 can comprises lubricant provided in the internal space 102.

The operation of the bicycle rear hub assembly 12 will be described in detail below referring to FIGS. 44, 48, and 49.

As seen in FIG. 44, the axial direction D2 includes a first axial direction D21 and a second axial direction D22 opposite to the first axial direction D21. A biasing force F5 is applied from the biasing member 84 to the receiving member 94 in the first axial direction D21. The biasing force F5 of the biasing member 84 biases the receiving member 94, the first ratchet member 80, the second ratchet member 82, and the sliding member 90 toward the sprocket support body 28 in the first axial direction D21. This brings the first ratchet teeth 80A into engagement with the second ratchet teeth 82A.

Figure 48:
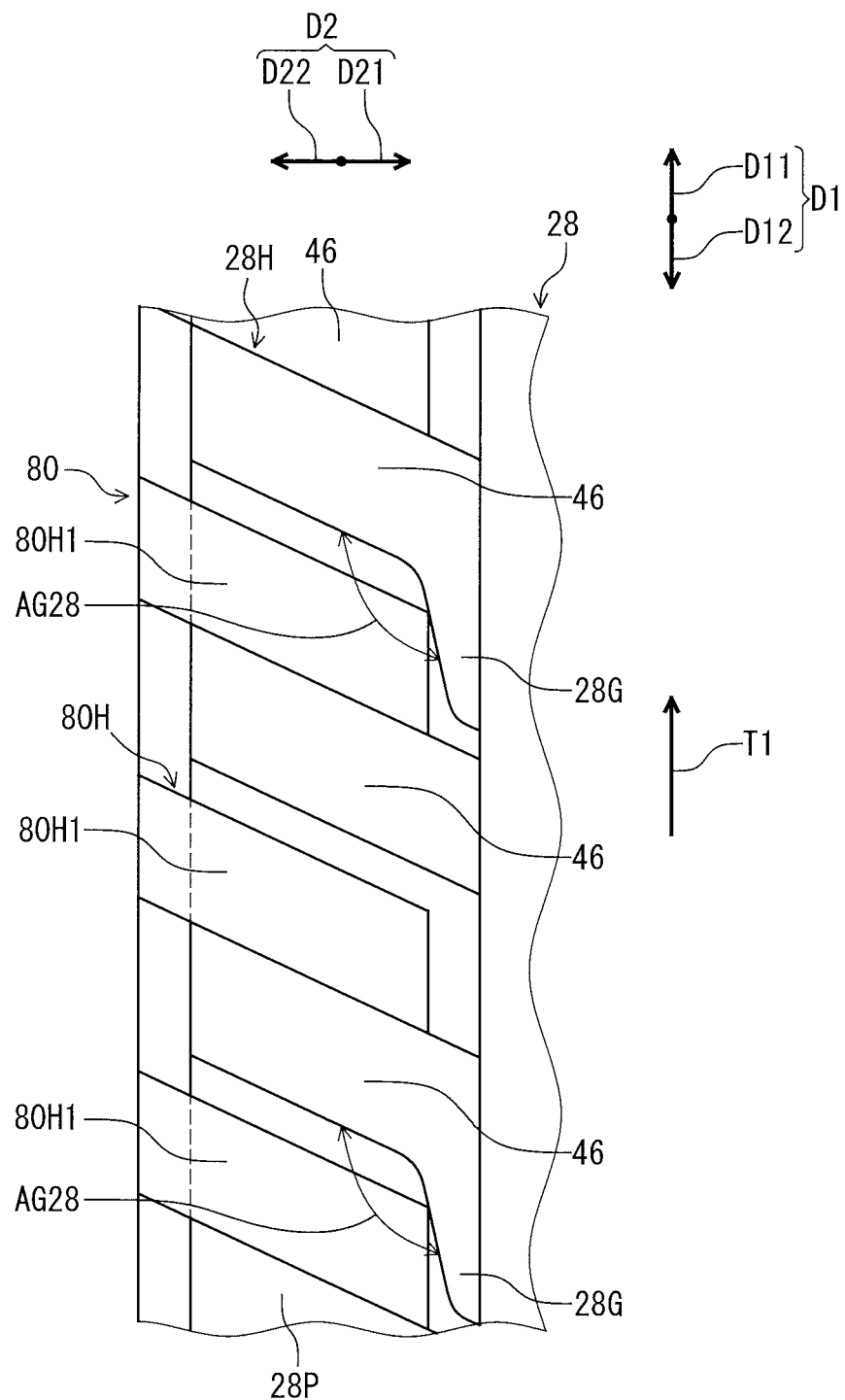
FIG. 48 is a schematic diagram showing an action of a first ratchet member and a sprocket support body of the bicycle rear hub assembly illustrated in FIG. 40 (pedaling).
Figure 49:
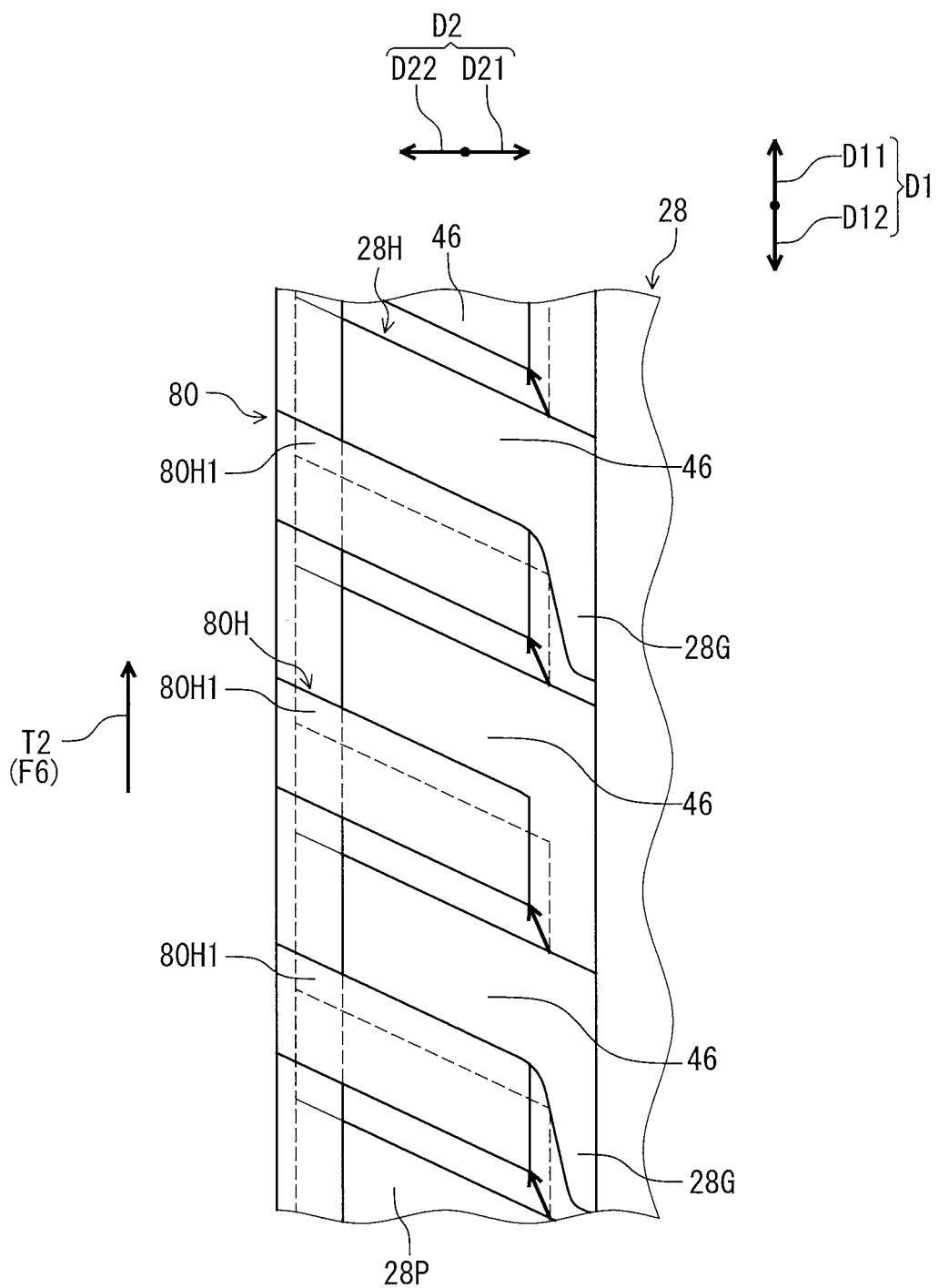
FIG. 49 is a schematic diagram showing an action of the first ratchet member and the sprocket support body of the bicycle rear hub assembly illustrated in FIG. 40 (coasting).

Furthermore, as seen in FIG. 48, when a pedaling torque T1 is input to the sprocket support body 28 in the driving rotational direction D11, the helical internal spline teeth 80H1 are guided by the helical external spline teeth 46 relative to the sprocket support body 28 in the first axial direction D21. This strongly brings the first ratchet teeth 80A into engagement with the second ratchet teeth 82A. In this state, the pedaling torque T1 is transmitted from the sprocket support body 28 to the hub body 36 (FIG. 44) via the first ratchet member 80 and the second ratchet member 82 (FIG. 44).

As seen in FIG. 48, the first ratchet member 80 contacts the guiding portion 28G to disengage from the second ratchet member 82 with a rotational friction force F6 generated between the biasing member 84 (FIG. 44) and the first ratchet member 80 during coasting. As seen in FIG. 49, a coasting torque T2 is applied to the hub body 36 in the driving rotational direction D11 during coasting. The coasting torque T2 is transmitted from the hub body 36 (FIG. 44) to the first ratchet member 80 via the second ratchet member 82 (FIG. 44). At this time, the helical internal spline teeth 80H1 are guided by the helical external spline teeth 46 relative to the sprocket support body 28 in the second axial direction D22. This moves the first ratchet member 80 relative to the sprocket support body 28 in the second axial direction D22 against the biasing force F5. Thus, the first ratchet member 80 is moved away from the second ratchet member 82 in the second axial direction D22, causing the engagement between the first ratchet teeth 80A and the second ratchet teeth 82A to be weaker. This allows the second ratchet member 82 to rotate relative to the first ratchet member 80 in the driving rotational direction D11, preventing the coasting torque T2 from being transmitted from the hub body 36 to the sprocket support body 28 via the first ratchet member 80 and the second ratchet member 82. At this time, the first ratchet teeth 80A slide with the second ratchet teeth 82A in the circumferential direction D1.

Modifications

Figure 50:
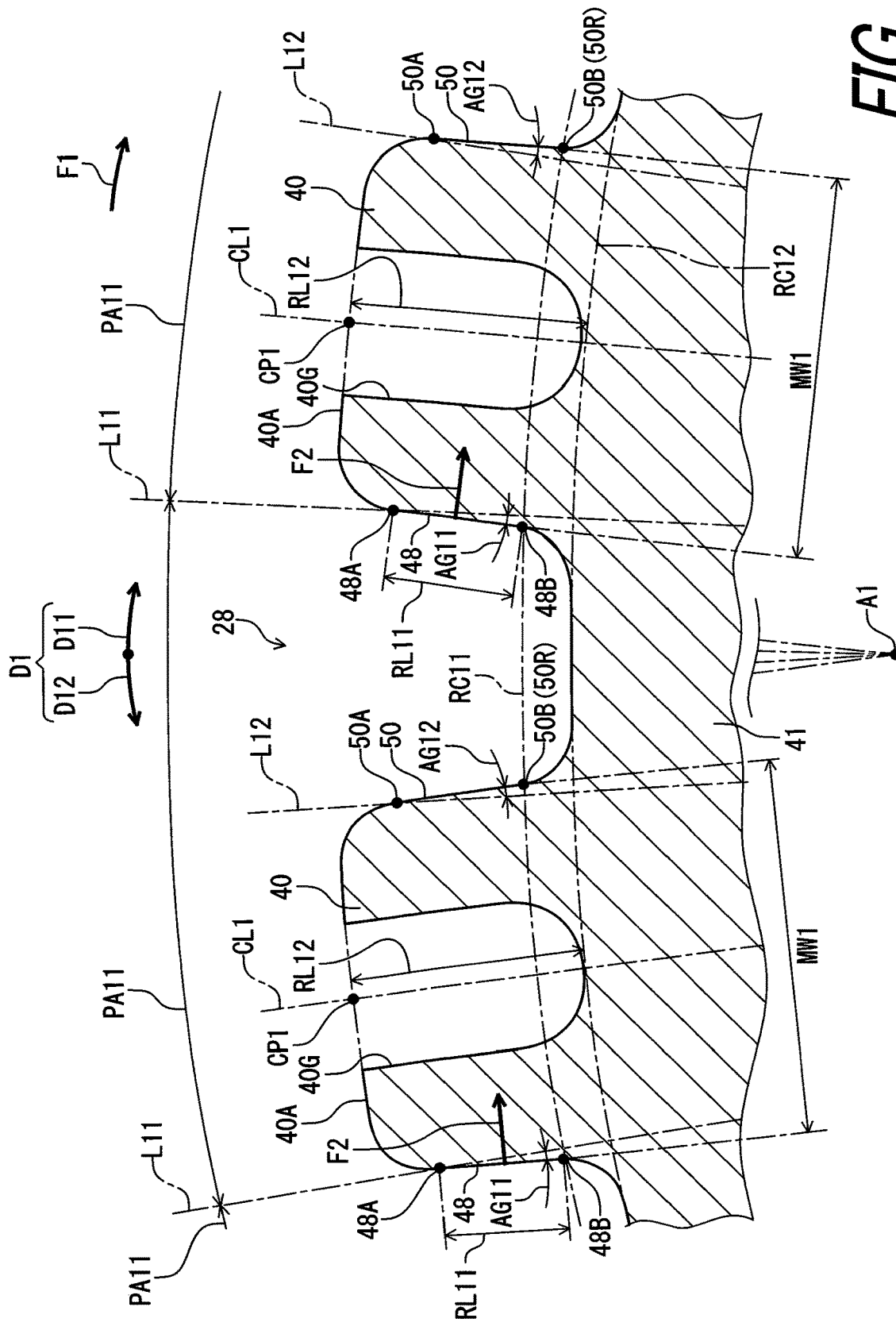
FIG. 50 is an enlarged cross-sectional view of the sprocket support body in accordance with a modification.

As seen in FIG. 50, in the above embodiments and other modifications, the external spline tooth 40 can include a groove 40G provided between the external-spline driving surface 48 and the external-spline non-driving surface 50 in the circumferential direction D1. The groove 40G reduces weight of the bicycle rear hub assembly 12.

Figure 51:
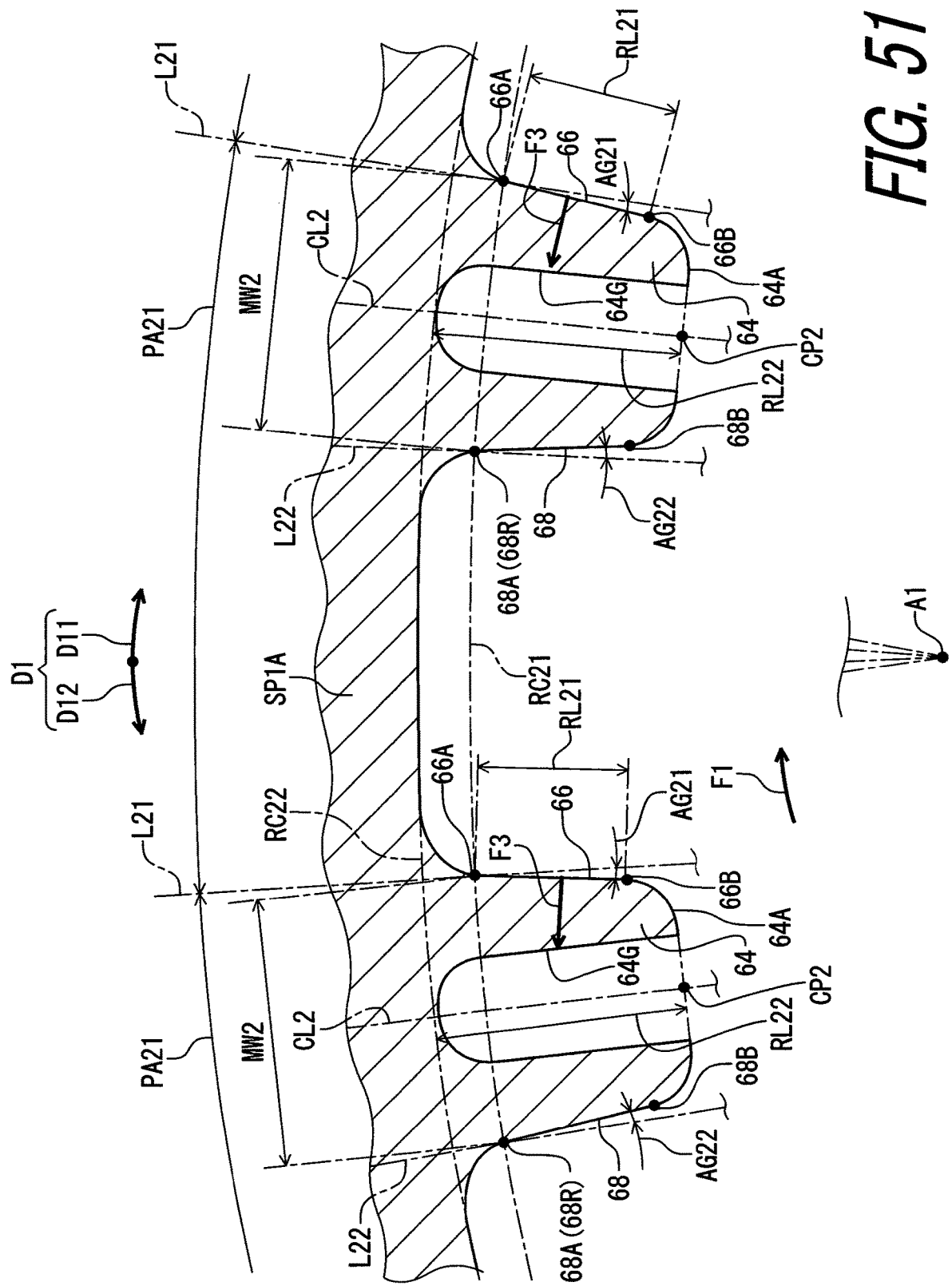
FIG. 51 is an enlarged cross-sectional view of the sprocket in accordance with a modification.

As seen in FIG. 51, in the above embodiments and other modifications, the internal spline tooth 64 can include a groove 64G provided between the internal-spline driving surface 66 and the internal-spline non-driving surface 68 in the circumferential direction D1. The groove 64G reduces weight of the bicycle rear sprocket assembly 14.

In the present application, at least ten internal spline teeth may be indirectly provided to a second opening of a second sprocket whereas the at least ten internal spline teeth are directly provided to the second opening of each of the second sprockets SP3 and SP4 in the above embodiments. For example, instead of directly providing at least ten internal spline teeth to the second opening of the second sprocket SP3 and/or the second sprocket SP4, at least one of the second sprockets SP3 and SP4 can be attached to a sprocket support member including at least ten internal spline teeth. Alternatively, instead of directly providing at least ten internal spline teeth to a second opening of a second sprocket, at least one second sprocket can be integrally formed with at least one additional sprocket including at least ten internal spline teeth as a one-piece unitary member. Because such a second sprocket indirectly include at least ten internal spline teeth via a sprocket support member and/or an additional sprocket, it also means that the second sprocket includes at least ten internal spline teeth configured to engage with a sprocket support body of a bicycle rear hub assembly.

The bicycle rear sprocket assembly 14 can include only one first sprocket or more than two first sprockets whereas the bicycle rear sprocket assembly 14 includes two first sprockets SP1 and SP2 in the above embodiments.

The bicycle rear sprocket assembly 14 can include only one second sprocket or more than two second sprockets whereas the bicycle rear sprocket assembly 14 includes two second sprockets SP3 and SP4 in the above embodiments.

Figure 52:
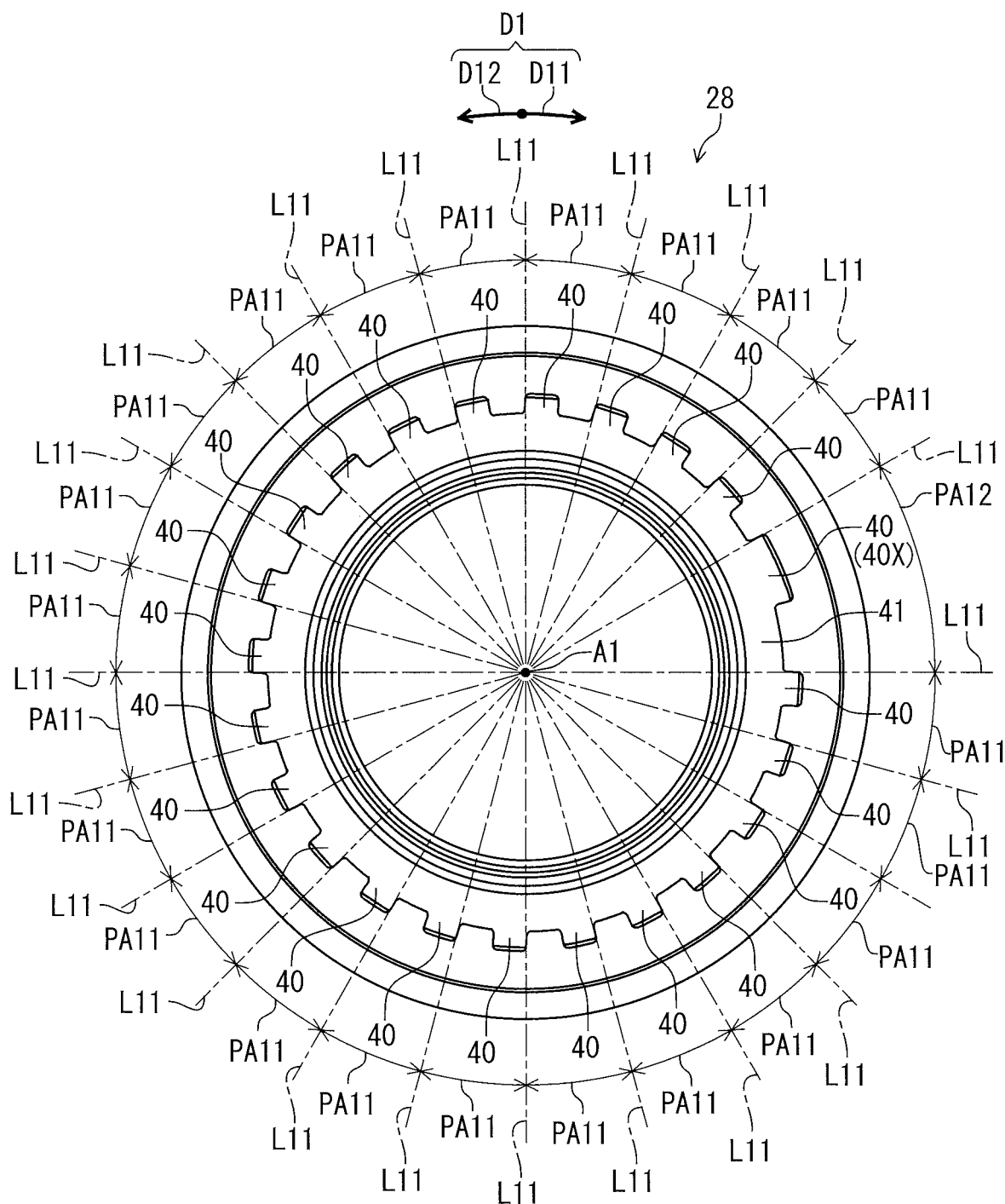
FIG. 52 is a side elevational view of a sprocket support body of a bicycle rear hub assembly in accordance with a modification.

As seen in FIG. 52, in the sprocket support body 28, the total number of the at least ten external spline teeth 40 can range from 22 to 24. For example, the total number of the at least ten external spline teeth 40 can be 23. The first external pitch angle PA11 can range from 13 degrees to 17 degrees. For example, the first external pitch angle PA11 can be 15 degrees. The second external pitch angle PA12 can range from 28 degrees to 32 degrees. For example, the second external pitch angle PA12 can be 30 degrees. The first external pitch angle PA11 is half of the second external pitch angle PA12. However, the first external pitch angle PA11 can be different from the half of the second external pitch angle PA12. The total number of the at least ten external spline teeth 40 is not limited to the above modification and ranges. The first external pitch angle PA11 is not limited to the above modification and ranges. The second external pitch angle PA12 is not limited to the above modification and ranges.

Figure 53:
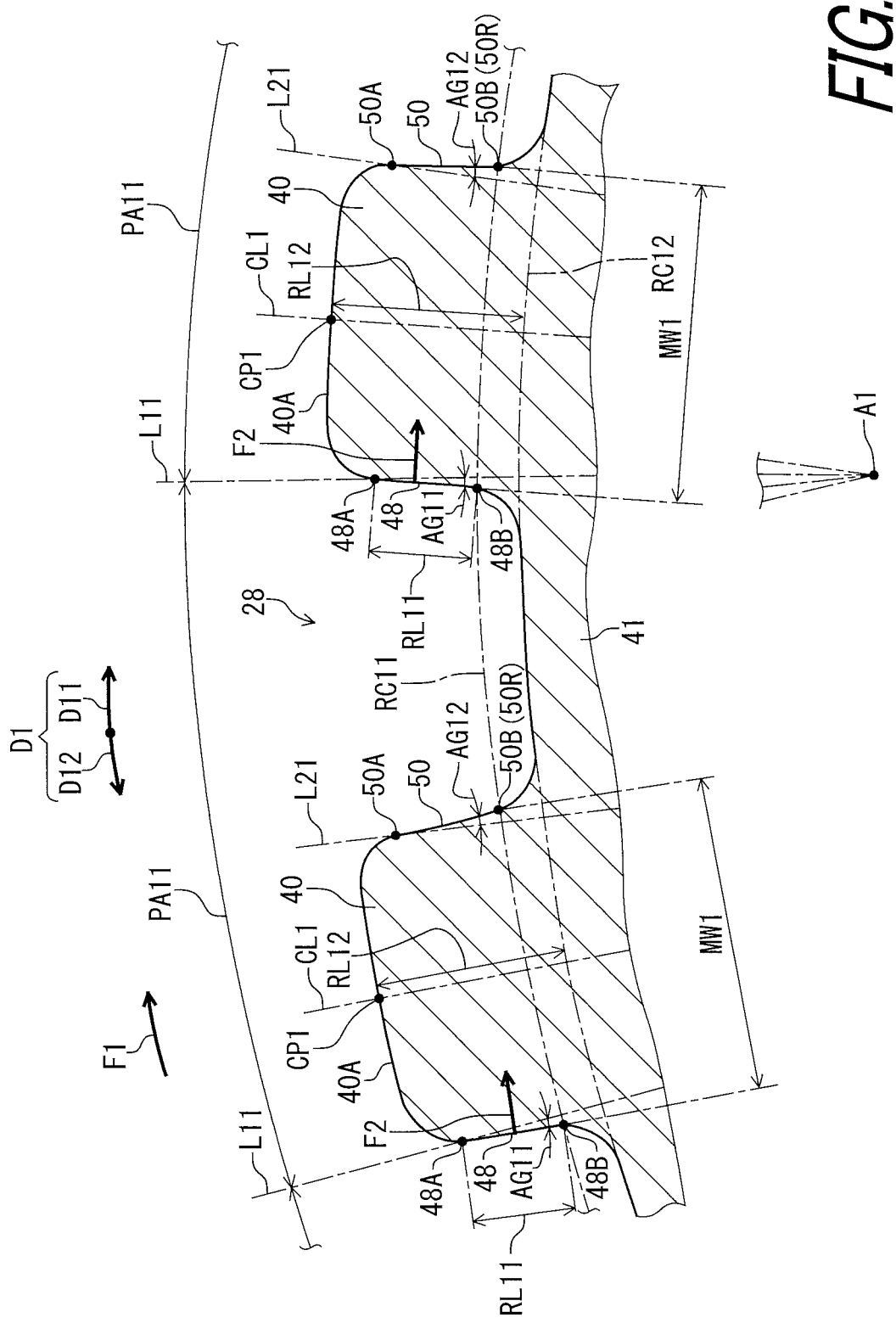
FIG. 53 is an enlarged cross-sectional view of the sprocket support body illustrated in FIG. 52.

As seen in FIG. 53, in the sprocket support body 28, the total of the radial lengths RL11 of the plurality of external-spline driving surfaces 48 can range from 11 mm to 14 mm. The total of the radial lengths RL11 of the plurality of external-spline driving surfaces 48 can be 12.5 mm. The total of the additional radial lengths RL12 can range from 26 mm to 30 mm. For example, the total of the additional radial lengths RL12 can be 28.2 mm. However, the total of the additional radial lengths RL12 is not limited to the above modification and ranges.

Figure 54:
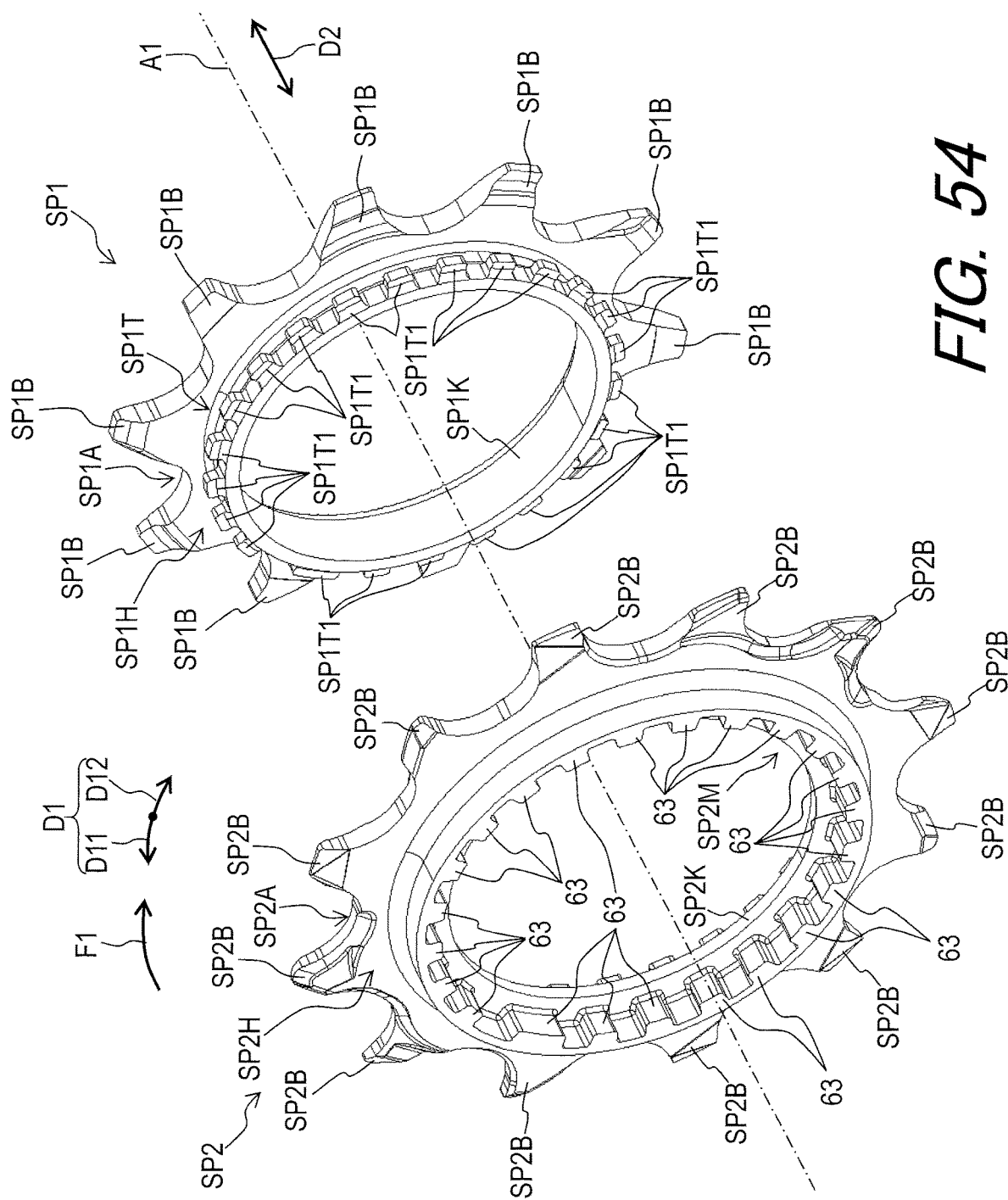
FIG. 54 is an exploded perspective view of sprockets of a bicycle rear sprocket assembly in accordance with a modification.

As seen in FIG. 54, in the first torque-transmitting structure SP1T of the first sprocket SP1, the total number of the at least ten first torque-transmitting teeth SP1T1 can range from 22 to 24. For example, the total number of the at least ten first torque-transmitting teeth SP1T1 can be 23. However, the total number of the at least ten first torque-transmitting teeth SP1T1 is not limited to the above modification and range.

Figure 55:
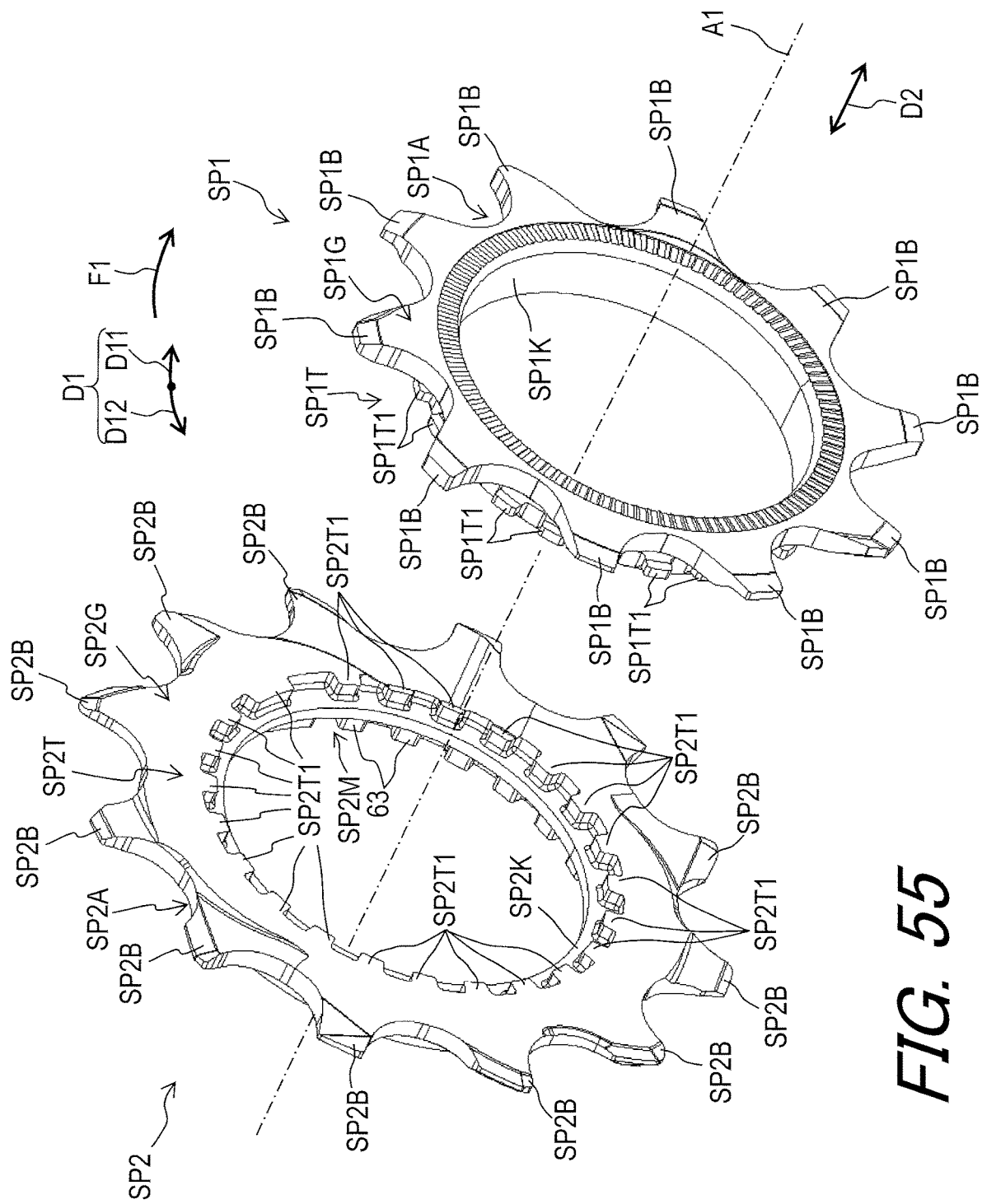
FIG. 55 is another exploded perspective view of the sprockets of the bicycle rear sprocket assembly in accordance with the modification.

As seen in FIG. 55, in the second torque-transmitting structure SP2T of the first sprocket SP2, the total number of the at least ten second torque-transmitting teeth SP2T1 can range from 22 to 24. For example, the total number of the at least ten second torque-transmitting teeth SP2T1 can be 23. However, the total number of the at least ten second torque-transmitting teeth SP2T1 is not limited to the above modification and range.

Figure 56:
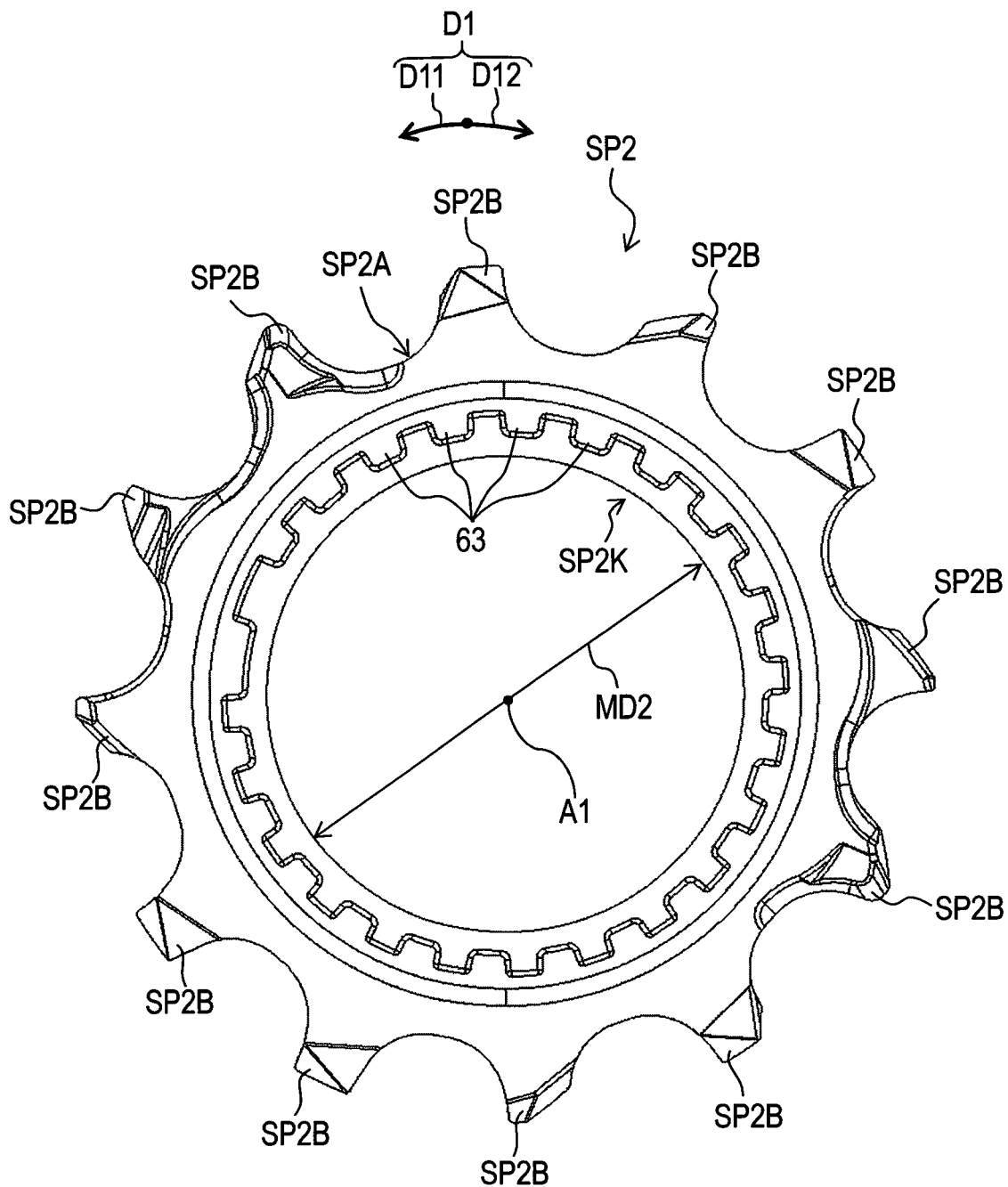
FIG. 56 is a side elevational view of a sprocket of the bicycle rear sprocket assembly in accordance with the modification.

As seen in FIG. 56, in the first sprocket SP2, the total number of the at least ten internal spline teeth 63 of the first sprocket SP2 can range from 22 to 24. For example, the total number of the at least ten internal spline teeth 63 of the first sprocket SP2 can be 23. However, the total number of the at least ten internal spline teeth 63 is not limited to the above modification and range.

Figure 57:
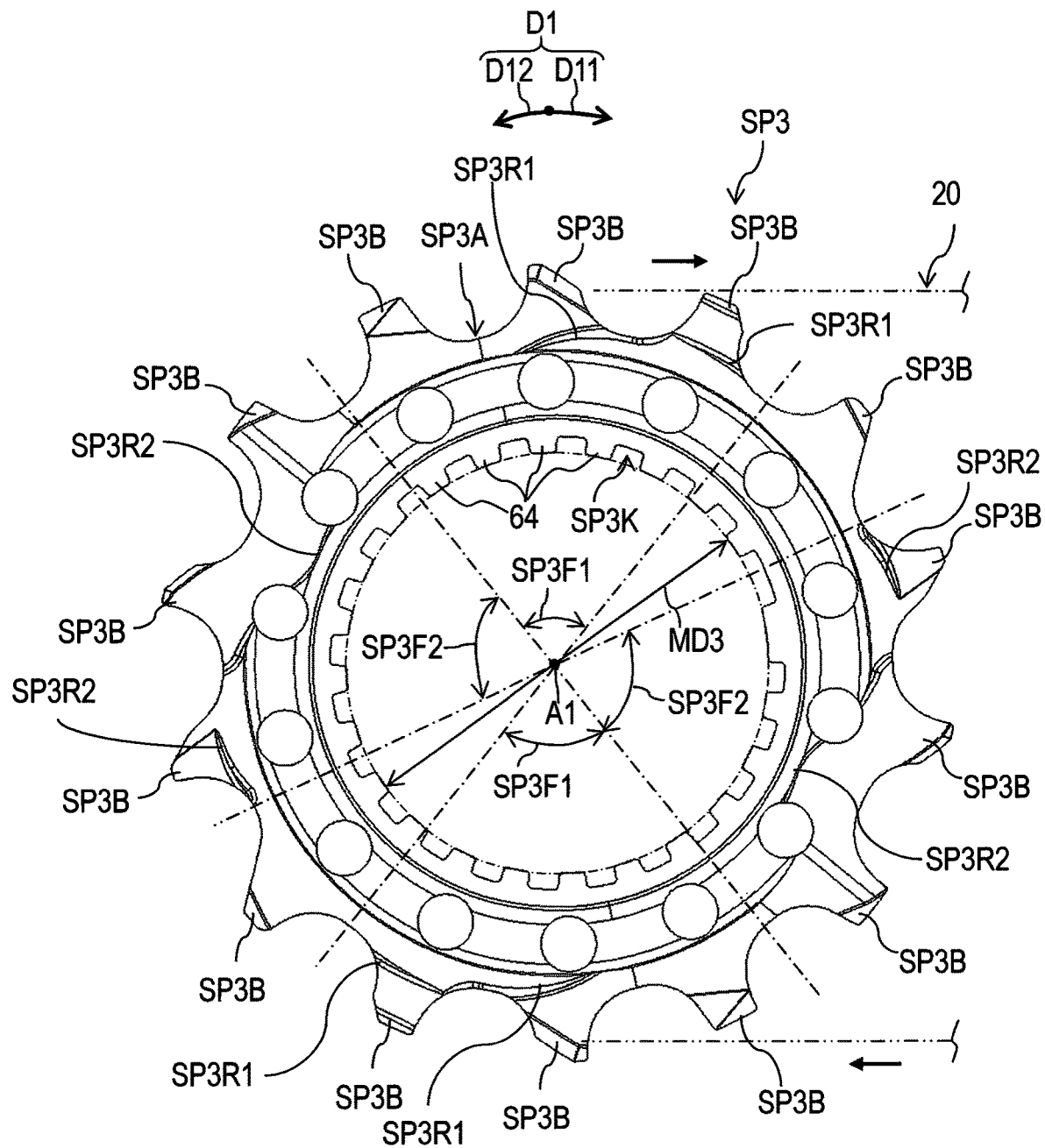
FIG. 57 is a side elevational view of a sprocket of the bicycle rear sprocket assembly in accordance with the modification.

As seen in FIG. 57, in the second sprocket SP3, the total number of the at least ten internal spline teeth 64 of the second sprocket SP3 can range from 22 to 24. For example, the total number of the at least ten internal spline teeth 64 of the second sprocket SP3 can be 23. However, the total number of the at least ten internal spline teeth 64 is not limited to the above modification and range.

Figure 58:
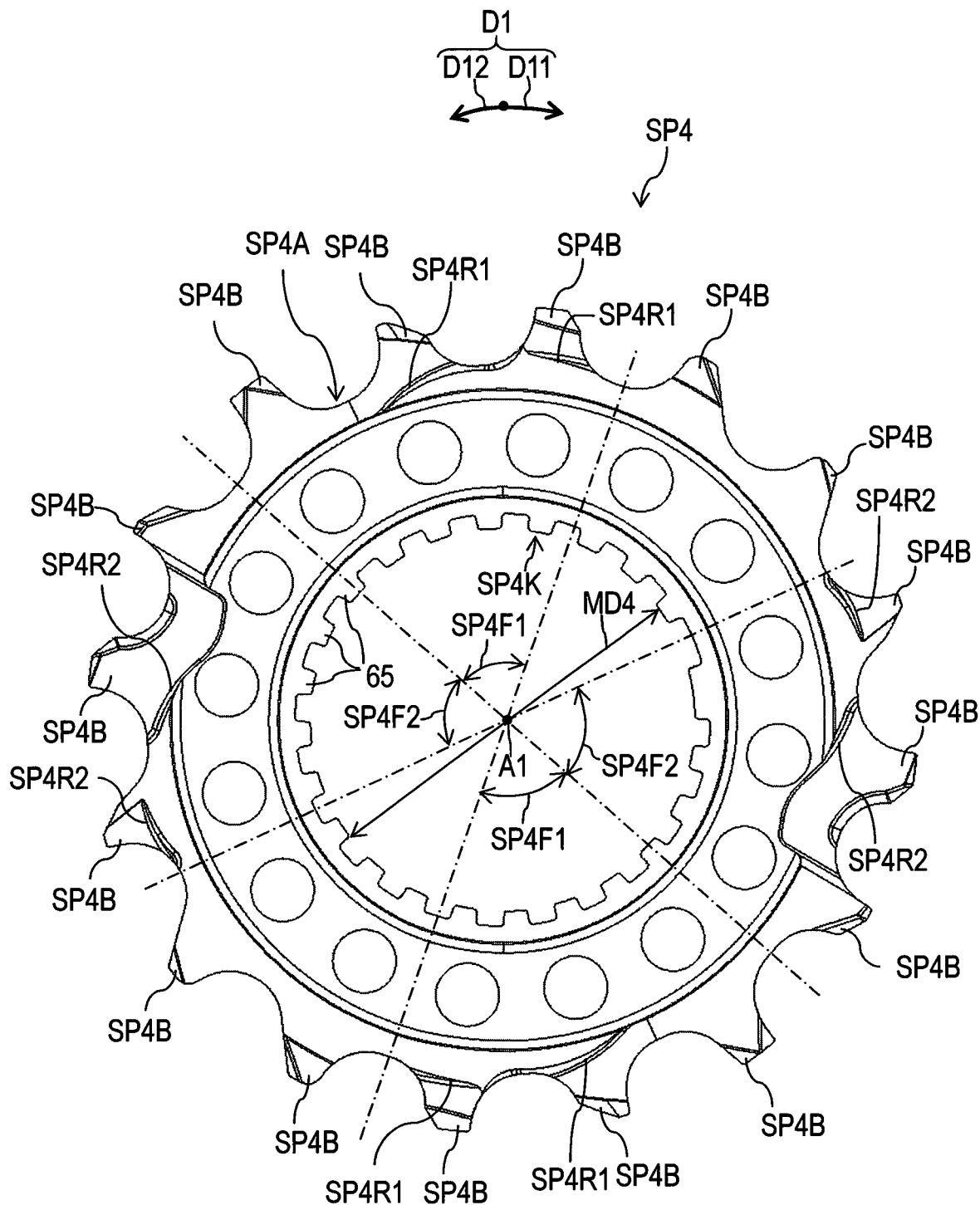
FIG. 58 is a side elevational view of a sprocket of the bicycle rear sprocket assembly in accordance with the modification.

As seen in FIG. 58, in the second sprocket SP4, the total number of the at least ten internal spline teeth 65 of the second sprocket SP4 can range from 22 to 24. For example, the total number of the at least ten internal spline teeth 65 of the second sprocket SP4 can be 23. However, the total number of the at least ten internal spline teeth 65 is not limited to the above modification and range.

Figure 59:
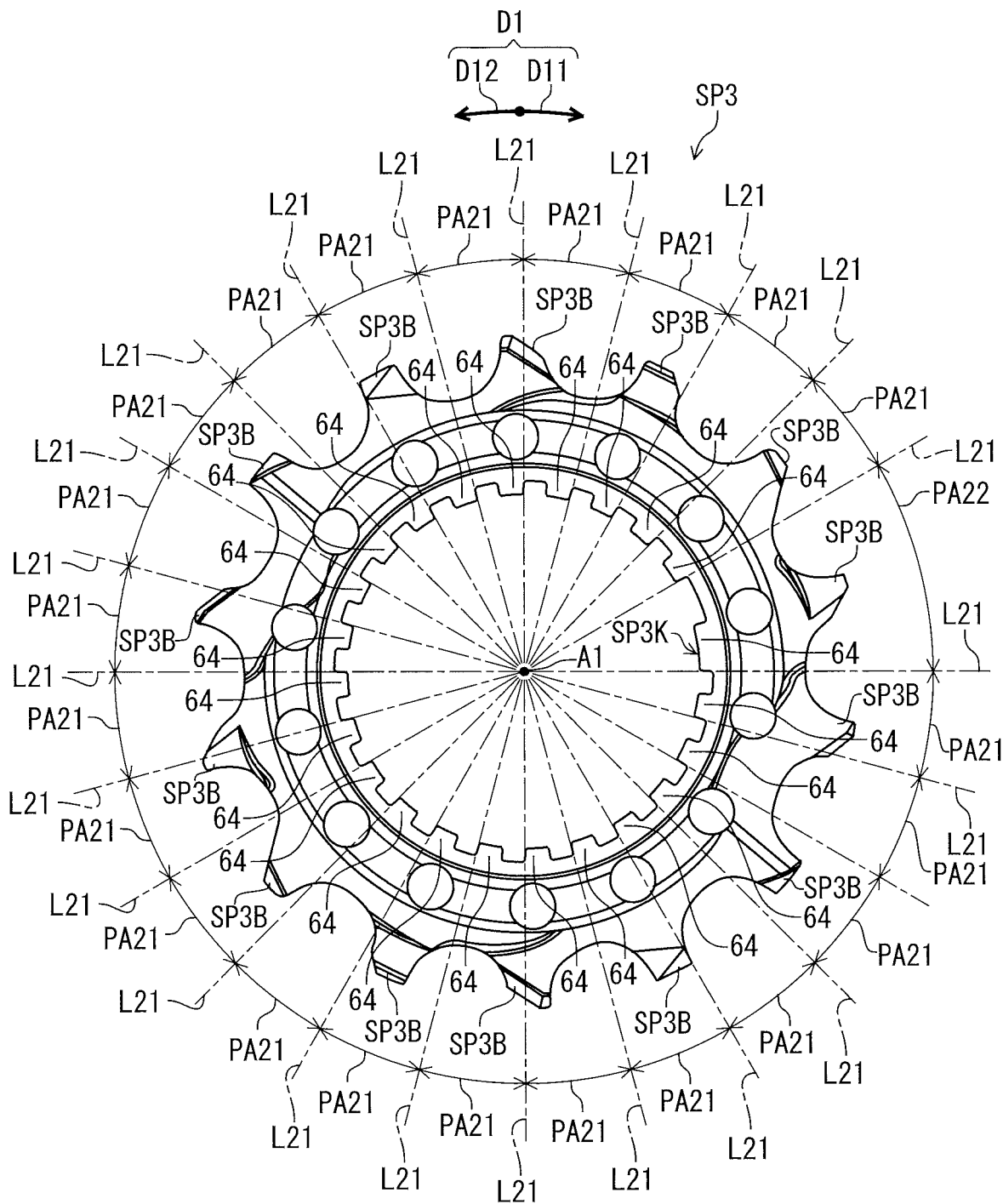
FIG. 59 is a side elevational view of the sprocket illustrated in FIG. 57.

As seen in FIG. 59, in the at least ten internal spline teeth 64 of the second sprocket SP3, the first internal pitch angle PA21 can range from 13 degrees to 17 degrees. For example, the first internal pitch angle PA21 can be 15 degrees. The second internal pitch angle PA22 can range from 28 degrees to 32 degrees. For example, the second internal pitch angle PA22 can be 30 degrees. The first internal pitch angle PA21 can be half of the second internal pitch angle PA22. However, the first internal pitch angle PA21 can be different from the half of the second internal pitch angle PA22. The first internal pitch angle PA21 is not limited to the above modification and range. The second internal pitch angle PA22 is not limited to the above modification and range.

Figure 60:
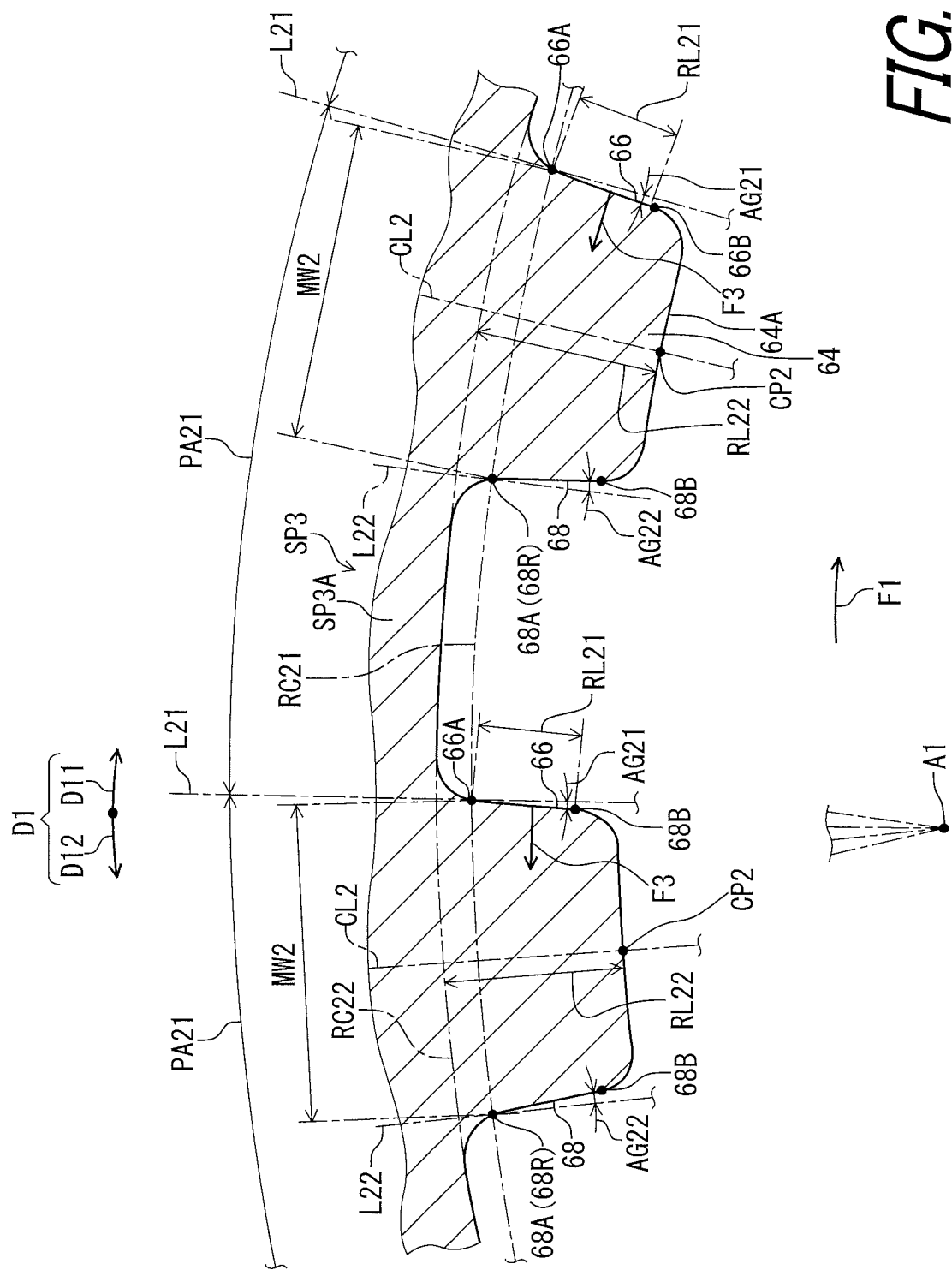
FIG. 60 is an enlarged cross-sectional view of the sprocket illustrated in FIG. 57.

As seen in FIG. 60, in the internal spline teeth 64 of the second sprocket SP3, the total of the radial lengths RL21 of the plurality of internal-spline driving surfaces 66 can range from 11 mm to 14 mm. For example, the total of the radial lengths RL21 of the plurality of internal-spline driving surfaces 66 can be 12.5 mm. However, the total of the radial lengths RL21 is not limited to the above modification and range. The total of the additional radial lengths RL22 can range from 26 mm to 29 mm. For example, the total of the additional radial lengths RL22 is 27.6 mm. However, the total of the additional radial lengths RL22 is not limited to this embodiment and the above ranges. The internal spline teeth 63 of the first sprocket SP2 and the internal spline teeth 65 of the second sprocket SP4 have the same structures as that of the internal spline teeth 64 of the second sprocket SP3.

Figure 61:
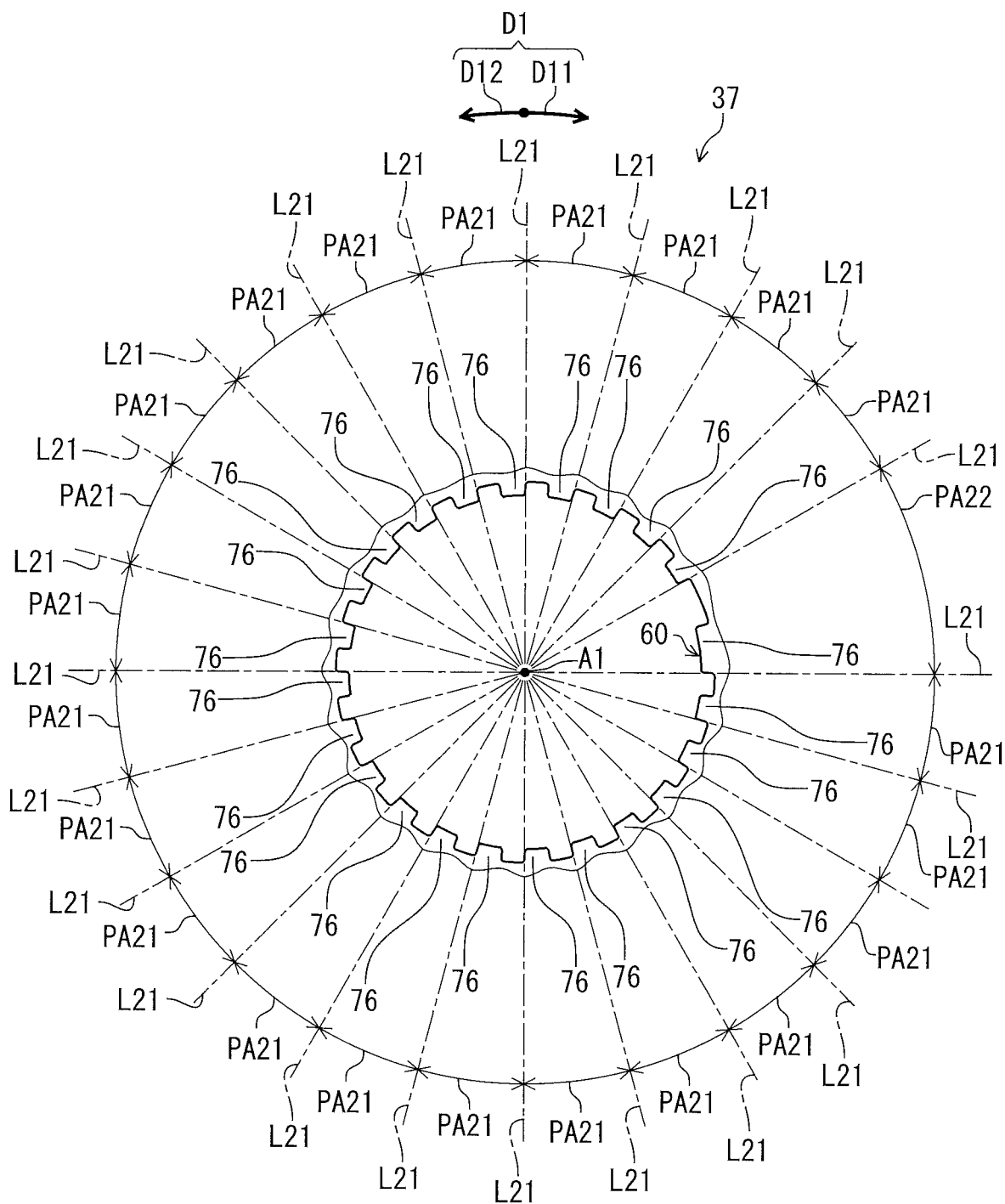
FIG. 61 is a partial side elevational view of a sprocket support member of the bicycle rear sprocket assembly in accordance with the modification.

As seen in FIG. 61, the internal spline teeth 76 of the sprocket support member 37 can have the same structures as that of the internal spline teeth 64 of the second sprocket SP3 illustrated in FIGS. 57, 59, and 60. The total number of the at least ten internal spline teeth 76 of the sprocket support member 37 can range from 22 to 24. For example, the total number of the at least ten internal spline teeth 76 of the sprocket support member 37 can be 23. However, the total number of the at least ten internal spline teeth 76 is not limited to the above modification and range. The structure of the internal spline teeth 64 illustrated in FIG. 60 can apply to the internal spline teeth 76 of the sprocket support member 37.

Figure 62:
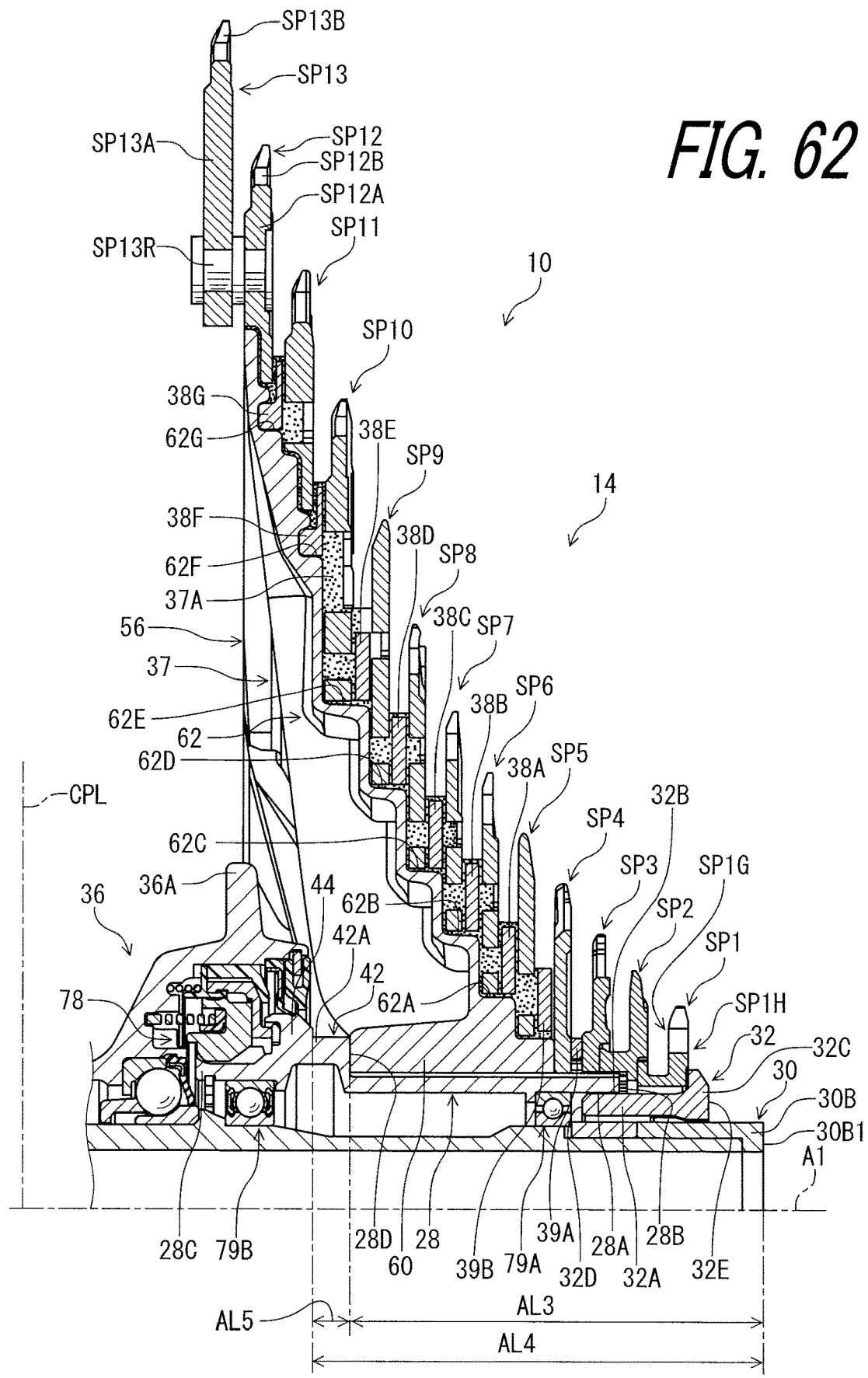
FIG. 62 is a cross-sectional view of a bicycle drive train in accordance with a modification.

As seen in FIG. 62, the bicycle rear sprocket assembly 14 can comprise an additional sprocket SP13. The additional sprocket SP13 is coupled to the additional sprocket SP12 with a plurality of coupling members SP13R. The additional sprocket SP13 includes a sprocket body SP13A and at least one sprocket tooth SP13B. The sprocket body SP13A of the additional sprocket SP13 is coupled to the sprocket body SP12A of the additional sprocket SP12 with the plurality of coupling member SP13R. The at least one sprocket tooth SP13B extends radially outwardly from the sprocket body SP13A. A total number of at least one sprocket tooth SP13B is larger than the total number of the at least one sprocket tooth SP12B. Preferably, the total tooth number of the at least one sprocket tooth SP13B is equal to or larger than 46. More preferably, the total tooth number of the at least one sprocket tooth SP13B is equal to or larger than 50. For example, the total tooth number of the at least one sprocket tooth SP13B is 54.

The teeth profile of the sprocket teeth SP1B to SP13B of the sprockets SP1 to SP13 can have a conventional teeth profile and/or a narrow-wide teeth profile. Specifically, as the narrow-wide teeth profile, the sprocket teeth SP1B to SP13B of the sprockets SP1 to SP13 may also include at least one first tooth each having a first axially maximum chain engagement width and at least one second tooth each having a second axially maximum chain engagement width that is smaller than the first axially maximum chain engagement width. The first axially maximum chain engagement width and the second axially maximum chain engagement width are measured along the axial direction D2. The first axially maximum chain engagement width is larger than an axially inner-link space defined by a pair of inner link plates of the bicycle chain 20 and smaller than an axially outer-link space defined by a pair of outer link plates of the bicycle chain 20 in which the pair of outer link plates face each other in the axial direction D2 when the bicycle chain 20 engages with one of the sprockets SP1 to SP13. The second axially maximum chain engagement width is smaller than the axially inner-link space defined by the pair of inner link plates of the bicycle chain 20. Accordingly, the at least one first tooth are configured to engage with a pair of outer link plates of the bicycle chain 20 in which the pair of outer link plates face each other in the axial direction D2 when the bicycle chain 20 engages with one of the sprockets SP1 to SP13, and the at least one second tooth are configured to engage with a pair of inner link plates of the bicycle chain 20 in which the pair of inner link plates face each other in the axial direction D2. Preferably, the at least one first tooth and the at least one second tooth are alternately disposed on an outer periphery of at least one of the sprockets SP1 to SP13. Preferably, the sprocket teeth SP1B to SP13B of the sprockets SP1 to SP13 include a plurality of first teeth each having the above-mentioned first axially maximum chain engagement width and a plurality of second teeth each having the above-mentioned second axially maximum chain engagement width. Preferably, the plurality of first teeth and the plurality of second teeth are alternately disposed on an outer periphery of at least one of the sprockets SP1 to SP13. Preferably, sprocket teeth of a largest sprocket can have such a narrow-wide teeth profile. Accordingly, it is preferable that the sprocket teeth SP12B of the sprocket SP12 in FIG. 6 or the sprocket teeth SP13B of the sprocket SP13 in FIG. 62 include at least one first tooth having the above-mentioned first axially maximum chain engagement width and at least one second tooth having the above-mentioned second axially maximum chain engagement width.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear hub assembly comprising:
a hub axle including an axle through-bore that has a minimum inner diameter equal to or larger than 13 mm;
a hub body rotatably mounted on the hub axle about a rotational center axis of the bicycle rear hub assembly, the hub body being rotatable relative to the hub axle; and
a sprocket support body rotatably mounted on the hub axle about the rotational center axis, wherein
the sprocket support body includes at least one external spline tooth configured to engage with a bicycle rear sprocket assembly,
the at least one external spline tooth includes a plurality of external spline teeth including a plurality of external-spline driving surfaces to receive a driving rotational force from the bicycle rear sprocket assembly during pedaling,
the plurality of external-spline driving surfaces each includes
a radially outermost edge,
a radially innermost edge, and
a radial length defined from the radially outermost edge to the radially innermost edge, and
a total of the radial lengths of the plurality of external-spline driving surfaces is equal to or larger than 7 mm.

2. The bicycle rear hub assembly according to claim 1, wherein the minimum inner diameter of the axle through-bore is equal to or larger than 14 mm.

3. The bicycle rear hub assembly according to claim 1, wherein
the minimum inner diameter of the axle through-bore is equal to or smaller than 21 mm.

4. The bicycle rear hub assembly according to claim 1, wherein
the hub axle has a maximum outer diameter that is equal to or larger than 17 mm.

5. The bicycle rear hub assembly according to claim 4, wherein
the maximum outer diameter of the hub axle is equal to or larger than 20 mm.

6. The bicycle rear hub assembly according to claim 4, wherein
the maximum outer diameter of the hub axle is equal to or smaller than 23 mm.

7. The bicycle rear hub assembly according to claim 1, wherein
the sprocket support body includes at least ten external spline teeth configured to engage with the bicycle rear sprocket assembly, each of the at least ten external spline teeth having the external-spline driving surface and an external-spline non-driving surface.

8. The bicycle rear hub assembly according to claim 7, wherein
a total number of the at least ten external spline teeth is equal to or larger than 20.

9. The bicycle rear hub assembly according to claim 7, wherein
a total number of the at least ten external spline teeth is equal to or larger than 25.

10. The bicycle rear hub assembly according to claim 7, wherein
a total number of the at least ten external spline teeth is equal to or larger than 28.

11. The bicycle rear hub assembly according to claim 7, wherein
at least one of the at least ten external spline teeth has an axial spline-tooth length that is equal to or smaller than 27 mm.

12. The bicycle rear hub assembly according to claim 11, wherein
the axial spline-tooth length is equal to or larger than 22 mm.

13. The bicycle rear hub assembly according to claim 7, wherein
the at least ten external spline teeth have a first external pitch angle and a second external pitch angle different from the first external pitch angle.

14. The bicycle rear hub assembly according to claim 7, wherein
at least two external spline teeth of the at least ten external spline teeth are circumferentially arranged at a first external pitch angle with respect to the rotational center axis, and
the first external pitch angle ranging from 5 degrees to 36 degrees.

15. The bicycle rear hub assembly according to claim 14, wherein
the first external pitch angle ranges from 10 degrees to 20 degrees.

16. The bicycle rear hub assembly according to claim 15, wherein
the first external pitch angle is equal to or smaller than 15 degrees.

17. The bicycle rear hub assembly according to claim 7, wherein
at least one of the at least ten external spline teeth is circumferentially symmetric with respect to a reference line extending from the rotational center axis to a circumferential center point of a radially outermost end of the at least one of the at least ten external spline teeth in a radial direction with respect to the rotational center axis.

18. The bicycle rear hub assembly according to claim 17, wherein
at least one surface of the plurality of external-spline driving surfaces has a first external-spline-surface angle defined between the external-spline driving surface and a first radial line extending from a rotational center axis of the bicycle rear hub assembly to the radially outermost edge of the external-spline driving surface, and
the first external-spline-surface angle is equal to or smaller than 6 degrees.

19. The bicycle rear hub assembly according to claim 18, wherein
at least one of the external-spline non-driving surfaces has a second external-spline-surface angle defined between the external-spline non-driving surface and a second radial line extending from the rotational center axis of the bicycle rear hub assembly to a radially outermost edge of the external-spline non-driving surface, and
the second external-spline-surface angle is equal to or smaller than 6 degrees.

20. The bicycle rear hub assembly according to claim 7, wherein
at least one of the at least ten external spline teeth has an axial spline-tooth length that is equal to or smaller than 27 mm.

21. The bicycle rear hub assembly according to claim 7, wherein
a total number of the at least ten external spline teeth ranges from 22 to 24.

22. The bicycle rear hub assembly according to claim 13, wherein
the first external pitch angle ranges from 13 degrees to 17 degrees, and
the second external pitch angle ranges from 28 degrees to 32 degrees.

23. The bicycle rear hub assembly according to claim 13, wherein
the first external pitch angle is half of the second external pitch angle.

24. The bicycle rear hub assembly according to claim 14, wherein
the first external pitch angle ranges from 13 degrees to 17 degrees.

25. The bicycle rear hub assembly according to claim 1, wherein
the at least one external spline tooth has an external-spline major diameter that is equal to or smaller than 34 mm.

26. The bicycle rear hub assembly according to claim 25, wherein the external-spline major diameter is equal to or smaller than 33 mm.

27. The bicycle rear hub assembly according to claim 25, wherein the external-spline major diameter is equal to or larger than 29 mm.

28. The bicycle rear hub assembly according to claim 1, wherein
the at least one external spline tooth has an external-spline minor diameter that is equal to or smaller than 32 mm.

29. The bicycle rear hub assembly according to claim 28, wherein
the external-spline minor diameter is equal to or smaller than 31 mm.

30. The bicycle rear hub assembly according to claim 28, wherein
the external-spline minor diameter is equal to or larger than 28 mm.

31. The bicycle rear hub assembly according to claim 1, wherein
the total of the radial lengths is equal to or larger than 10 mm.

32. The bicycle rear hub assembly according to claim 1, wherein
the total of the radial lengths is equal to or larger than 15 mm.

33. The bicycle rear hub assembly according to claim 1, wherein
the total of the radial lengths is equal to or smaller than 36 mm.

34. The bicycle rear hub assembly according to claim 1, wherein
the hub body includes:
a first spoke-mounting portion having a first axially outermost part;
a second spoke-mounting portion having a second axially outermost part; and
a first axial length defined between the first axially outermost part of the first spoke-mounting portion and the second axially outermost part of the second spoke-mounting portion in an axial direction with respect to the rotational center axis of the bicycle rear sprocket assembly, the first axial length being equal to or larger than 55 mm.

35. The bicycle rear hub assembly according to claim 34, wherein
the first axial length is equal to or larger than 60 mm.

36. The bicycle rear hub assembly according to claim 34 wherein
the first axial length is equal to or larger than 65 mm.

37. The bicycle rear hub assembly according to claim 1, wherein
the hub axle includes:
a first axial frame abutment surface configured to abut against a first part of a bicycle frame in an axial direction with respect to the rotational center axis of the bicycle rear sprocket assembly in a state where the bicycle rear hub assembly is mounted to the bicycle frame;
a second axial frame abutment surface configured to abut against a second part of the bicycle frame in the axial direction in the state where the bicycle rear hub assembly is mounted to the bicycle frame; and
a second axial length defined between the first axial frame abutment surface and the second axial frame abutment surface in the axial direction, the second axial length being equal to or larger than 140 mm.

38. The bicycle rear hub assembly according to claim 37, wherein
the second axial length is equal to or larger than 145 mm.

39. The bicycle rear hub assembly according to claim 37, wherein
the second axial length is equal to or larger than 147 mm.

40. A bicycle rear hub assembly comprising:
a hub axle including an axle through-bore that has a minimum inner diameter equal to or larger than 13 mm;
a hub body rotatably mounted on the hub axle about a rotational center axis of the bicycle rear hub assembly;
a sprocket support body rotatably mounted on the hub axle about the rotational center axis; and
a freewheel structure including
    a first ratchet member including at least one first ratchet tooth, and
    a second ratchet member including at least one second ratchet tooth configured to engage with the at least one first ratchet tooth in a torque transmitting manner, wherein
the first ratchet member is configured to engage with one of the hub body and the sprocket support body in a torque transmitting manner,
the second ratchet member is configured to engage with the other of the hub body and the sprocket support body in a torque transmitting manner, and
at least one of the first ratchet member and the second ratchet member is movable relative to the hub axle in an axial direction with respect to the rotational center axis.

41. The bicycle rear hub assembly according to claim 40, wherein
the at least one first ratchet tooth is disposed on an axial facing surface of the first ratchet member,
the at least one second ratchet tooth is disposed on an axial facing surface of the second ratchet member, and
the axial facing surface of the second ratchet member faces the axial facing surface of the first ratchet member.

42. The bicycle rear hub assembly according to claim 40, wherein
the sprocket support body has an outer peripheral surface having a first helical spline, and
the first ratchet member is configured to engage with the sprocket support body in a torque transmitting manner and includes a second helical spline mating with the first helical spline.

43. The bicycle rear hub assembly according to claim 42, wherein
the outer peripheral surface of the sprocket support body has a guiding portion configured to guide the first ratchet member toward the hub body during coasting.

44. The bicycle rear hub assembly according to claim 43, wherein
the guiding portion guides the first ratchet member toward the hub body to release a meshing engagement between the at least one first ratchet tooth and the at least one second ratchet tooth during coasting.

45. The bicycle rear hub assembly according to claim 43, wherein
the guiding portion extends in at least a circumferential direction with respect to the sprocket support body.

46. The bicycle rear hub assembly according to claim 43, wherein
the guiding portion is arranged to define an obtuse angle with the first helical spline.

47. The bicycle rear hub assembly according to claim 40, wherein
each of the first ratchet member and the second ratchet member has an annular shape.

48. A bicycle rear hub assembly comprising:
a hub axle including an axle through-bore that has a minimum inner diameter equal to or larger than 13 mm;
a hub body rotatably mounted on the hub axle about a rotational center axis of the bicycle rear hub assembly;
a sprocket support body rotatably mounted on the hub axle about the rotational center axis; and
a brake-rotor support body including at least one additional external spline tooth configured to engage with a bicycle brake rotor, wherein
the at least one additional external spline tooth has an additional external-spline major diameter that is larger than the external-spline major diameter.

49. A bicycle rear hub assembly comprising:
a hub axle;
a hub body rotatably mounted on the hub axle about a rotational center axis of the bicycle rear hub assembly; and
a sprocket support body rotatably mounted on the hub axle about the rotational center axis, the sprocket support body including at least ten external spline teeth configured to engage with a bicycle rear sprocket assembly, each of the at least ten external spline teeth having an external-spline driving surface and an external-spline non-driving surface, at least one of the at least ten external spline teeth being circumferentially symmetric with respect to a reference line extending from the rotational center axis to a circumferential center point of a radially outermost end of the at least one of the at least ten external spline teeth in a radial direction with respect to the rotational center axis, wherein
the external-spline driving surfaces includes
    a radially outermost edge,
    a radially innermost edge, and
    a radial length defined from the radially outermost edge to the radially innermost edge, and
a total of the radial lengths of the external-spline driving surfaces is equal to or larger than 7 mm.

50. The bicycle rear hub assembly according to claim 49, wherein
a total number of the at least ten external spline teeth is equal to or larger than 28.

51. The bicycle rear hub assembly according to claim 49, wherein
at least one of the external-spline driving surfaces has a first external-spline-surface angle defined between the external-spline driving surface and a first radial line extending from a rotational center axis of the bicycle rear hub assembly to the radially outermost edge of the external-spline driving surface, and the first external-spline-surface angle is equal to or smaller than 6 degrees.

52. The bicycle rear hub assembly according to claim 51, wherein at least one of the external-spline non-driving surfaces has a second external-spline-surface angle defined between the external-spline non-driving surface and a second radial line extending from the rotational center axis of the bicycle rear hub assembly to a radially outermost edge of the external-spline non-driving surface, and the second external-spline-surface angle is equal to or smaller than 6 degrees.

53. The bicycle rear hub assembly according to claim 49, wherein at least one of the at least ten external spline teeth has an axial spline-tooth length that is equal to or smaller than 27 mm.

54. The bicycle rear hub assembly according to claim 49, wherein a total number of the at least ten external spline teeth ranges from 22 to 24.

55. The bicycle rear hub assembly according to claim 23, wherein the total of the radial lengths of the plurality of external-spline driving surfaces ranges from 11 mm to 14 mm.

\* \* \* \* \*